US012712478B2

(12) United States Patent
Hlavác et al.

(10) Patent No.: US 12,712,478 B2
(45) Date of Patent: Aug. 18, 2026

(54) EXCITER CIRCUIT FOR A SYNCHRONOUS MACHINE

(71) Applicant: BRUSH ELECTRICAL MACHINES LTD., Leicestershire (GB)

(72) Inventors: Pavel Hlavác, Plzen (CZ); Jirí Lepší, Plzen (CZ); Daniel Navratil, Plzen (CZ)

(73) Assignee: BRUSH ELECTRICAL MACHINES LTD., Ashby de la Zouch (GB)

(*) Notice: Subject to any disclaimer, the term of this patent is extended or adjusted under 35 U.S.C. 154(b) by 220 days.

(21) Appl. No.: 18/713,795

(22) PCT Filed: Dec. 2, 2022

(86) PCT No.: PCT/GB2022/053083

§ 371 (c)(1),
(2) Date: May 28, 2024

(87) PCT Pub. No.: WO2023/099923

PCT Pub. Date: Jun. 8, 2023

(65) Prior Publication Data

US 2025/0038691 A1 Jan. 30, 2025

(30) Foreign Application Priority Data

Dec. 2, 2021 (GB) ...................................... 2117427

(51) Int. Cl.
*H02P 27/06* (2006.01)

(52) U.S. Cl.
CPC .................................... *H02P 27/06* (2013.01)

(58) Field of Classification Search
CPC ....................................................... H02P 27/06
See application file for complete search history.

(56) References Cited

U.S. PATENT DOCUMENTS

| | | | | |
|---|---|---|---|---|
| 8,975,876 B2 | 3/2015 | Rozman et al. | | |
| 2007/0296275 A1* | 12/2007 | Joho | H02P 9/30 | 323/204 |
| 2011/0057631 A1* | 3/2011 | Dalessandro | H02P 9/305 | 322/60 |

FOREIGN PATENT DOCUMENTS

| | | | | |
|---|---|---|---|---|
| DE | 102017119271 A1 * | 2/2019 | H02H 7/0805 | |
| JP | 4 845889 B2 | 12/2011 | | |

* cited by examiner

*Primary Examiner* — Zoheb S Imtiaz
(74) *Attorney, Agent, or Firm* — CANTOR COLBURN LLP

(57) ABSTRACT

An exciter circuit for a synchronous machine, the exciter circuit comprising: at least one charge storage device configured to supply energy to a DC output coupled to the synchronous machine; and control circuitry configured to: receive a first signal indicative of an operating state of the synchronous machine, receive a second signal indicative of a control demand for the synchronous machine, and supply at least a portion of energy stored by the at least one charge storage device to satisfy the control demand indicated by the second signal when: the control demand indicated by the second signal exceeds a threshold capability of the synchronous machine that would otherwise exist if the at least one charge storage device was not present, and the synchronous machine is in an appropriate operating state as derived from the first signal.

14 Claims, 35 Drawing Sheets

Time constant is $$\tau_f = \frac{L_f}{R_f}$$

1604
1616
1694
-V11
L1
L2
1626a-b
-V4
1614
1622
$U_{C1}$ -C1
M
L-
1618a
-V1
V10B
1696b
1696a
V9B
-V2
1618b
1628b
$I_d$
16008
+
$U_d$
Lf
Rf
-
1628a
Ur
AVR
PWM UNIT
16006
16010
1698
16002
16004

1704
1716
17140
1724
1796d
1718e
1796c
1718c
-V6
-V5
-V9A
-V3
L+
$U_{C3}$
C3
-V11
V10A
L1
M
L2
-V1
V9B
-V4
$U_{C1}$
-C1
V10B
-V2
L-
$I_d$
+
$U_d$
Lf
Rf
-
17022
Ur
HDC ENABLE
AVR
$U_{C3}$ $U_{C1}$
PWM UNIT
17024
17020
17016
17018

EXCITER CIRCUIT FOR A SYNCHRONOUS MACHINE

TECHNICAL FIELD

The present disclosure relates to an exciter circuit for a synchronous machine (which may also be termed a synchronous machine system, and in either case is typically a synchronous generator, a synchronous motor or a synchronous condenser) and, in particular, to an exciter circuit generally configured to discharge at least one charge storage device to a DC output for the synchronous machine in response to power system demand requirements.

BACKGROUND

A generator excitation system normally operates to keep generator terminal voltage at a specified setpoint. Hence as load varies over time, the terminal voltage is maintained automatically—a control aspect known as steady state control. In addition, the control system responds to system disturbances, such as short circuit faults, which might occur in the power system to which the generator is connected. During such disturbances, the power system voltage is likely to be lower than normal and this causes the excitation system to deliver a strong forcing action to increase the generator field current. The low voltage disturbance also causes the generator rotor, together with any connected turbine rotor, to experience accelerating power because of the reduction in generated electrical power caused by the reduced voltage whilst the mechanical power from the turbine remains unchanged in the immediate short term. Fast forcing action by the excitation system can help to improve the stability of the generator rotor, thus reducing deviations in rotor speed and benefitting the wider power system.

It is therefore beneficial for a synchronous machine such as a synchronous generator to have a short response time to changes in electrical demand.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

According to a first aspect, there is provided an exciter circuit for a synchronous machine, the exciter circuit comprising:

at least one charge storage device configured to be discharged to a DC output; and control circuitry configured to:

receive a first signal indicative of an electrical output of the synchronous machine, receive a second signal indicative of an electrical demand from a load connected to the synchronous machine, and discharge the at least one charge storage device when the electrical demand indicated by the second signal exceeds the electrical output indicated by the first signal.

The exciter circuit may further comprise rectifier circuitry configured to convert an AC input to the DC output.

The control circuitry may be configured to:

receive a third signal indicative of an amount of charge stored by the at least one charge storage device; and initiate charging of the at least one charge storage device when the amount of stored charge indicated by the third signal is below a predefined threshold and the voltage output indicated by the first signal satisfies the voltage demand indicated by the second signal.

The control circuitry may be configured to initiate charging of the at least one charge storage device by the AC input.

The control circuitry may be configured to initiate charging of the at least one charge storage device by the load.

The control circuitry may be configured to discharge the at least one charge storage device when the electrical demand indicated by the second signal exceeds the electrical output indicated by the first signal by a predefined amount. The predefined amount may be an absolute or relative amount.

The control circuitry may be configured to discharge the at least one charge storage device when the electrical demand indicated by the second signal exceeds the electrical output indicated by the first signal for a predefined period of time.

The control circuitry may be configured to electrically isolate the at least one charge storage device from the DC output when the electrical output indicated by the first signal satisfies the electrical demand indicated by the second signal.

The DC output may be a positive or negative voltage. The AC input may be a three-phase signal or a single-phase signal.

The first signal may comprise one or more of a voltage output, current output and power output of the synchronous machine, the second signal may comprise one or more of a voltage demand, current demand, power demand, exciter field voltage demand, inductance demand and power factor from the load connected to the synchronous machine, and the load may comprise an electrical load or a mechanical load.

The control circuitry may comprise one or more transistors, and an automatic voltage regulator configured to control the one or more transistors to discharge the at least one charge storage device to the DC output.

The one or more transistors may be insulated-gate bipolar transistors.

The control circuitry may comprise a capacitor configured to protect the insulated-gate bipolar transistors from circuit inductance when the insulated-gate bipolar transistors are switched from an on-state to an off-state by the automatic voltage regulator.

The automatic voltage regulator may be configured to apply pulse width modulation to control the DC output.

The at least one charge storage device may comprise one or more capacitors, batteries or battery-capacitor hybrids.

According to a second aspect, there is provided an exciter for a synchronous machine comprising the exciter circuit of the first or fourth aspects, wherein the DC output is coupled to an exciter field coil of the exciter.

The exciter may be brushless AC exciter or a DC exciter.

According to a third aspect, there is provided a synchronous machine (or synchronous electrical machine) comprising the exciter of the second aspect. The synchronous machine may be a synchronous generator, a synchronous motor or a synchronous condenser.

The synchronous machine may further comprise a main generator, and a pilot exciter coupled to a rotor shaft of the main generator configured to provide the AC input.

The pilot exciter may comprise a permanent magnet generator.

According to a fourth aspect, there is provided an exciter circuit for a synchronous machine, the exciter circuit comprising:

at least one charge storage device configured to supply energy to a DC output coupled to the synchronous machine; and control circuitry configured to:

receive a first signal indicative of an operating state of the synchronous machine, receive a second signal indicative of a control demand for the synchronous machine, and supply at least a portion of energy stored by the at least one charge storage device to satisfy the control demand indicated by the second signal when:

the control demand indicated by the second signal exceeds a threshold capability of the synchronous machine that would otherwise exist if the at least one charge storage device was not present, and the synchronous machine is in an appropriate operating state as derived from the first signal.

The control circuitry may be configured to:

initiate charging of the at least one charge storage device by the DC output when the control demand indicated by the second signal is associated with a removal of energy from the synchronous machine.

The control circuitry may be configured to:

receive a third signal indicative of an amount of charge stored by the at least one charge storage device; and initiate charging of the at least one charge storage device when the amount of stored charge indicated by the third signal is below a predefined threshold and the operating state indicated by the first signal satisfies the control demand indicated by the second signal. Initiating charging may comprise charging by the AC input or the DC output.

The first signal may be indicative of a measured parameter of the operating state of the synchronous machine, wherein the control circuitry may be configured to supply at least a portion of energy stored by the at least one charge storage device when the operating state indicated by the first signal does not satisfy the control demand indicated by the second signal by a predefined amount.

The first signal may be indicative of a measured parameter of the operating state of the synchronous machine, wherein the control circuitry may be configured to supply at least a portion of energy stored by the at least one charge storage device when the operating state indicated by the first signal does not satisfy the control demand indicated by the second signal for a predefined period of time.

The control circuitry may be configured to electrically isolate the at least one charge storage device from the DC output to provide a pre-defined voltage ceiling at the DC output when the operating state indicated by the first signal satisfies the control demand indicated by the second signal.

The first signal may be indicative of a measured parameter of the operating state of the synchronous machine, the measured parameter comprising at least one of a voltage output, current output and power output of the synchronous machine, and one or more of a voltage demand, current demand, power demand, inductance demand and power factor from a load connected to the synchronous machine; and wherein the second signal may be indicative of a parameter requirement of the control demand for the synchronous machine, the parameter requirement comprising at least one of a field voltage and/or a field current of an exciter of the synchronous machine, an input, output and/or one or more internal values of an automatic voltage regulator configured to control the synchronous machine, a voltage and/or current provided by a generator of the synchronous machine, a real or complex inductance demand of the synchronous machine, and a power factor from a load connected to the synchronous machine.

The control circuitry may be configured to:

modulate the DC output based on a modulation signal; and set a polarity of the DC output.

The automatic voltage regulator may comprise a pulse width modulation unit configured to generate a pulse width modulation signal.

The one or more transistors may comprise:

a transistor configured to receive the pulse width modulation signal from the pulse width modulation unit to modulate the DC output; and a plurality of further transistors configured to set the polarity of the DC output.

The exciter circuit may further comprise rectifier circuitry configured to convert an AC input to the DC output, wherein the control circuitry may further comprise:

a first current pathway coupling a first terminal of the rectifier circuitry to a corresponding first terminal of the DC output via a first transistor;

a second current pathway coupling a second terminal of the rectifier circuitry to a corresponding second terminal of the DC output via a second transistor;

a third current pathway coupling a first point along the first current pathway to the first terminal of the DC output via a third transistor; and a fourth current pathway coupling a second point along the first current pathway to the first terminal of the DC output via a fourth transistor, wherein the at least one charge storage device is provided in parallel with the fourth transistor.

The automatic voltage regulator may be configured to:

supply at least a portion of energy stored by the at least one charge storage device to provide a positive voltage at the DC output by:

switching the first and fourth transistors on, switching the third transistor off, and supplying, via the pulse width modulation unit, a pulse width modulation signal to the second transistor, or switching the first and second transistors on, switching the third transistor off, and supplying, via the pulse width modulation unit, a pulse width modulation signal to the fourth transistor; or supply at least a portion of energy stored by the at least one charge storage device to provide a negative voltage at the DC output by:

switching the first, third and fourth transistors off, and supplying, via the pulse width modulation unit, a pulse width modulation signal to the second transistor, or switching the first, second and fourth transistors off, and supplying, via the pulse width modulation unit, a pulse width modulation signal to the third transistor.

The automatic voltage regulator may be configured to charge the at least one charge storage device by switching the first transistor on, and switching the second, third and fourth transistors off.

The automatic voltage regulator may be configured to:

isolate the at least one charge storage device and provide a positive voltage at the DC output by:

switching the first and third transistors on, switching the fourth transistor off, and supplying, via the pulse width modulation unit, a pulse width modulation signal to the second transistor; or isolate the at least one charge storage device and provide a negative voltage at the DC output by:

switching the first and fourth transistors off, switching the third transistor on, and supplying, via the pulse width modulation unit, a pulse width modulation signal to the second transistor.

The synchronous machine may comprise an exciter and a generator, wherein:

the DC output may be coupled to a field coil of the exciter;

the operating state may reflect an operating state of the generator;

the control demand may represent a required value of a field voltage generated by the exciter, wherein the generator is powered by the exciter based on the field voltage; and the control circuitry may be configured to supply at least a portion of energy stored by the at least one charge storage device when the operating state of the generator does not satisfy the required value of a field voltage, to increase a voltage across, and a corresponding rate of current change at, the field coil of the exciter.

The operating state of the generator may not satisfy the required value of a field voltage if a measured voltage provided by the generator deviates from an expected voltage provided by the generator, wherein the expected voltage is based on a field current generated by the field coil of the exciter.

The control circuitry may be configured to determine the deviation.

The corresponding rate of current change may be proportional to a voltage increase on a field circuit of the exciter and inversely proportional to an inductivity of the field circuit of the exciter.

Supplying at least a portion of energy stored by the at least one charge storage device may comprise a gradual or an immediate release of energy from the at least one charge storage device, and/or a full discharge of the at least one charge storage device.

The control circuitry may be configured to temporarily increase a voltage ceiling at the DC output, and boost an output of the synchronous machine, when the control demand indicated by the second signal exceeds a threshold capability of the synchronous machine that would otherwise exist if the at least one charge storage device was not present, and the synchronous machine is in an appropriate operating state as derived from the first signal.

The first signal may be configured to indicate that the synchronous machine is in an appropriate operating state, or the control circuitry is configured to derive the appropriate operating state from the first signal.

The appropriate operating state may be a state that enables use of the at least one charge storage device.

The threshold capacity may be based on an output voltage of an automatic voltage regulator configured to control the synchronous machine. The automatic voltage regulator may comprise a smoothing capacitor, wherein the threshold capacity may be limited by a voltage on the smoothing capacitor.

According to a fifth aspect, there is provided a method of using the exciter circuit of the first aspect, the method comprising:

receiving a first signal indicative of an electrical output of the synchronous machine;

receiving a second signal indicative of a electrical demand from a load connected to the synchronous machine; and discharging the at least one charge storage device when the electrical demand indicated by the second signal exceeds the electrical output indicated by the first signal.

According to a sixth aspect, there is provided a method of using the exciter circuit of the fourth aspect, the method comprising:

receiving a second signal indicative of a control demand for the synchronous machine; and supplying at least a portion of energy stored by the at least one charge storage device to satisfy the control demand indicated by the second signal when:

the control demand indicated by the second signal exceeds a threshold capability of the synchronous machine that would otherwise exist if the at least one charge storage device was not present, and the synchronous machine is in an appropriate operating state as derived from the first signal.

According to a seventh aspect, there is provided an apparatus comprising a processor and memory including computer program code, the memory and computer program code configured to, with the processor, enable the apparatus at least to perform the method of the fourth aspect.

According to an eighth aspect, there is provided an apparatus as substantially described herein with reference to, and as illustrated by, the accompanying drawings.

The optional features described in relation to the exciter circuit of the first or fourth aspects are also applicable to the exciter of the second aspect, the synchronous machine of the third aspect, the method of the fifth or sixth aspects, and/or the apparatus of the eighth aspect where compatible.

The steps of any method disclosed herein do not have to be performed in the exact order disclosed, unless explicitly stated or understood by the skilled person.

Corresponding computer programs for implementing one or more steps of the methods disclosed herein are also within the present disclosure and are encompassed by one or more of the described examples.

One or more of the computer programs may, when run on a computer, cause the computer to configure any apparatus, including a battery, circuit, controller, or device disclosed herein or perform any method disclosed herein. One or more of the computer programs may be software implementations, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

One or more of the computer programs may be provided on a computer readable medium, which may be a physical computer readable medium such as a disc or a memory device, or may be embodied as a transient signal. Such a transient signal may be a network download, including an internet download.

The present disclosure includes one or more corresponding aspects, examples or features in isolation or in various combinations whether or not specifically stated (including claimed) in that combination or in isolation. Corresponding means for performing one or more of the discussed functions are also within the present disclosure.

Throughout the present specification, descriptors relating to position, orientation or movement such as “left”, “right”, “up”, “down”, “horizontal” and “vertical”, as well as any adjective and adverb derivatives thereof, are used in the sense of the position, orientation or movement of the apparatus as presented in the drawings. However, such descriptors are not intended to be in any way limiting to an intended use of the described or claimed invention.

The above summary is intended to be merely exemplary and non-limiting.

BRIEF DESCRIPTION OF THE FIGURES

A description is now given, by way of example only, with reference to the accompanying schematic drawings, in which.

DETAILED DESCRIPTION

Figure 1A:
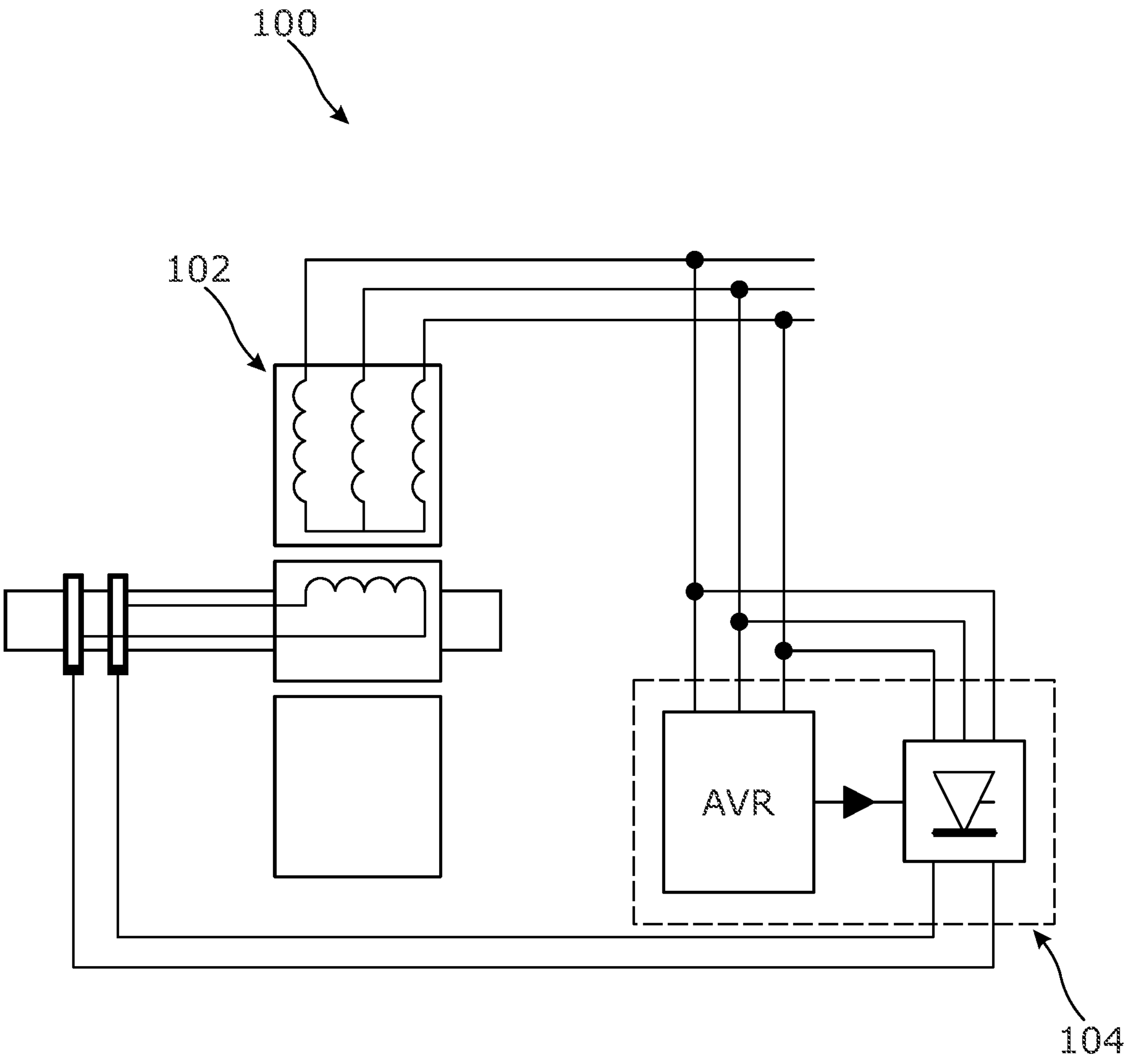
FIGS. 1*a-b* show different arrangements of synchronous generator systems.
Figure 1B:
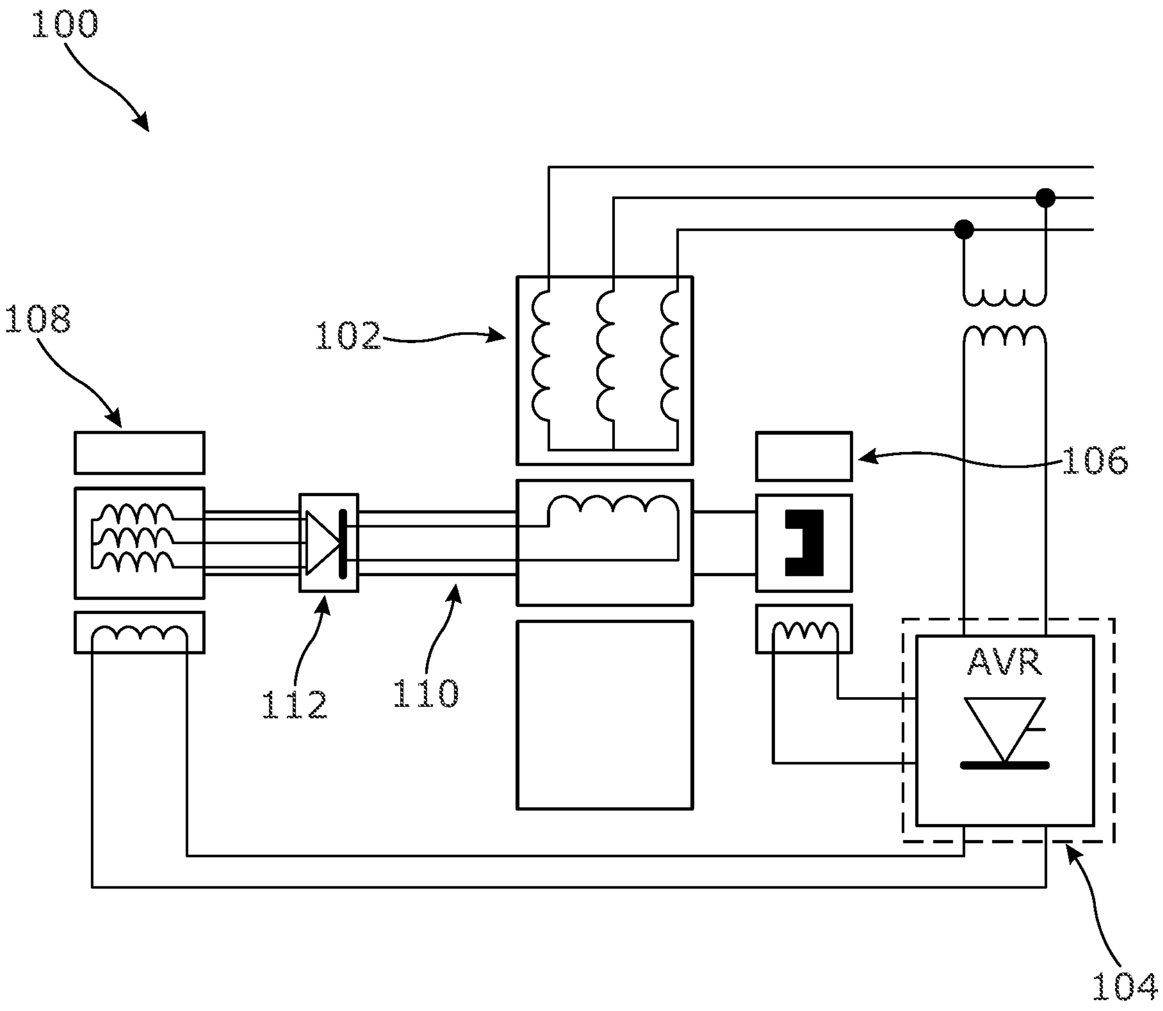

FIGS. 1*a-b* show in schematic form different arrangements of synchronous generator systems (synchronous generator excitation systems).

In FIG. 1*a*, a synchronous generator system 100 is illustrated comprising a generator 102, and an exciter circuit 104. The exciter circuit 104 is configured to sense—and receive a signal indicative of—the electrical output of the generator 102 (e.g., the power output or voltage output of the generator 102). In addition, the exciter circuit 104 is configured to receive a signal indicative of an electrical demand for the synchronous generator system (e.g., a voltage demand) and supply a rectified output to field windings of the generator 102 to provide a magnetising current for a rotor of the generator 102. Here, the rectified output is based on the sensed electrical output of the generator 102, the and the signal indicative of the electrical demand. In this way, the exciter circuit 104 may regulate the electrical output of the generator 102.

In FIG. 1*b*, a synchronous generator system 100 is illustrated comprising a generator 102, an exciter circuit 104, a pilot exciter 106 and a main exciter 108. The generator 102, exciter circuit 104, pilot exciter 106 and main exciter 108 are arranged and configured such that the pilot exciter 106 can act as a source of electrical power for the main exciter 108, the main exciter acting as a source of electrical power for excitation of the rotor of the generator 102.

More specifically, the exciter circuit 104 is configured to sense the electrical output of the generator 102 and to receive electrical power from the pilot exciter 106. In addition, the exciter circuit 104 is configured to supply a rectified output to the main exciter 108. Here, the rectified output is based on the sensed electrical output of the generator 102 and the signal indicative of the electrical demand. In this way, the exciter circuit 104 may regulate the electrical output of the generator 102.

The pilot exciter 106 is implemented as a dedicated AC generator with a permanent magnet generator mounted on the shaft 110 of the synchronous generator system 100. The main exciter 108 is an AC exciter comprising an armature (rotor) mounted on the shaft 110 of the synchronous generator system 100 and a stator. The rectified output of the exciter circuit 104 is provided to exciter field windings on the stator of the main exciter 108 to generate electrical power. This electrical power is rectified by diodes 112 on the shaft of the synchronous generator system 100 to provide an exciting current for the generator 102.

The synchronous generator system 100 of FIG. 1*a* may use a static excitation system. The synchronous generator system 100 of FIG. 1*b* may use a brushless excitation system.

Figure 2:
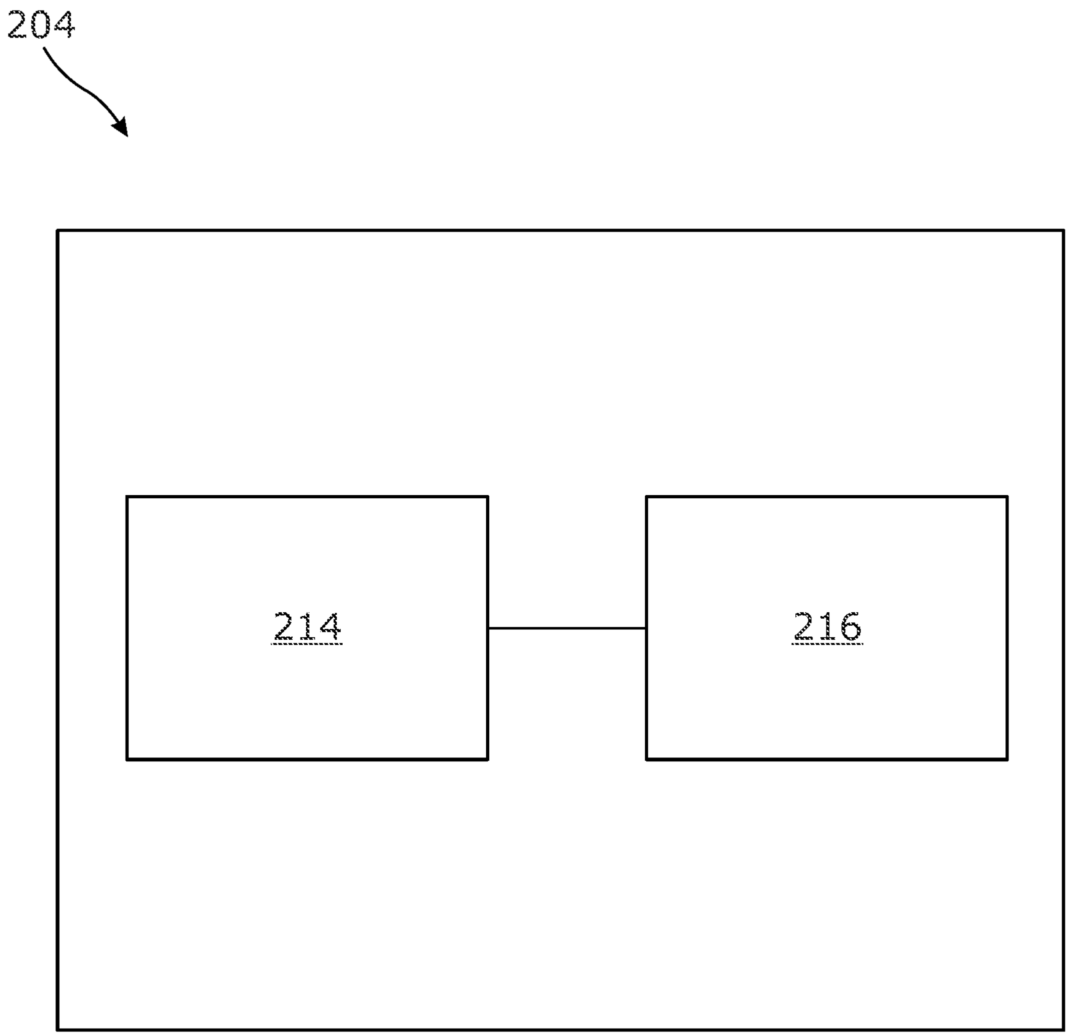
FIG. 2 shows in schematic form an example exciter circuit.

FIG. 2 shows in schematic form an example exciter circuit 204 for a synchronous machine, for example the synchronous generator system of FIG. 1*a* or 1*b*. The example exciter circuit 204 comprises rectifier circuitry 214 configured to convert an AC input to a direct current, DC output, and control circuitry 216 configured to: receive a first signal indicative of an electrical output of the synchronous machine, receive a second signal indicative of an electrical demand from a load connected to the synchronous machine, and control the DC output based on the electrical demand indicated by the second signal and the electrical output indicated by the first signal.

The exciter circuit 204 is thus configured to regulate the electrical output of a synchronous machine, as may be appreciated from the earlier discussion of FIGS. 1*a-b*.

In some examples the rectifier circuitry 214 and control circuity 216 may be implemented as modules of the exciter circuit 200. With reference to FIGS. 1*a-b*, the exciter circuit 200 may comprise, or be implemented as, an automatic voltage regulator, AVR.

Figure 3:
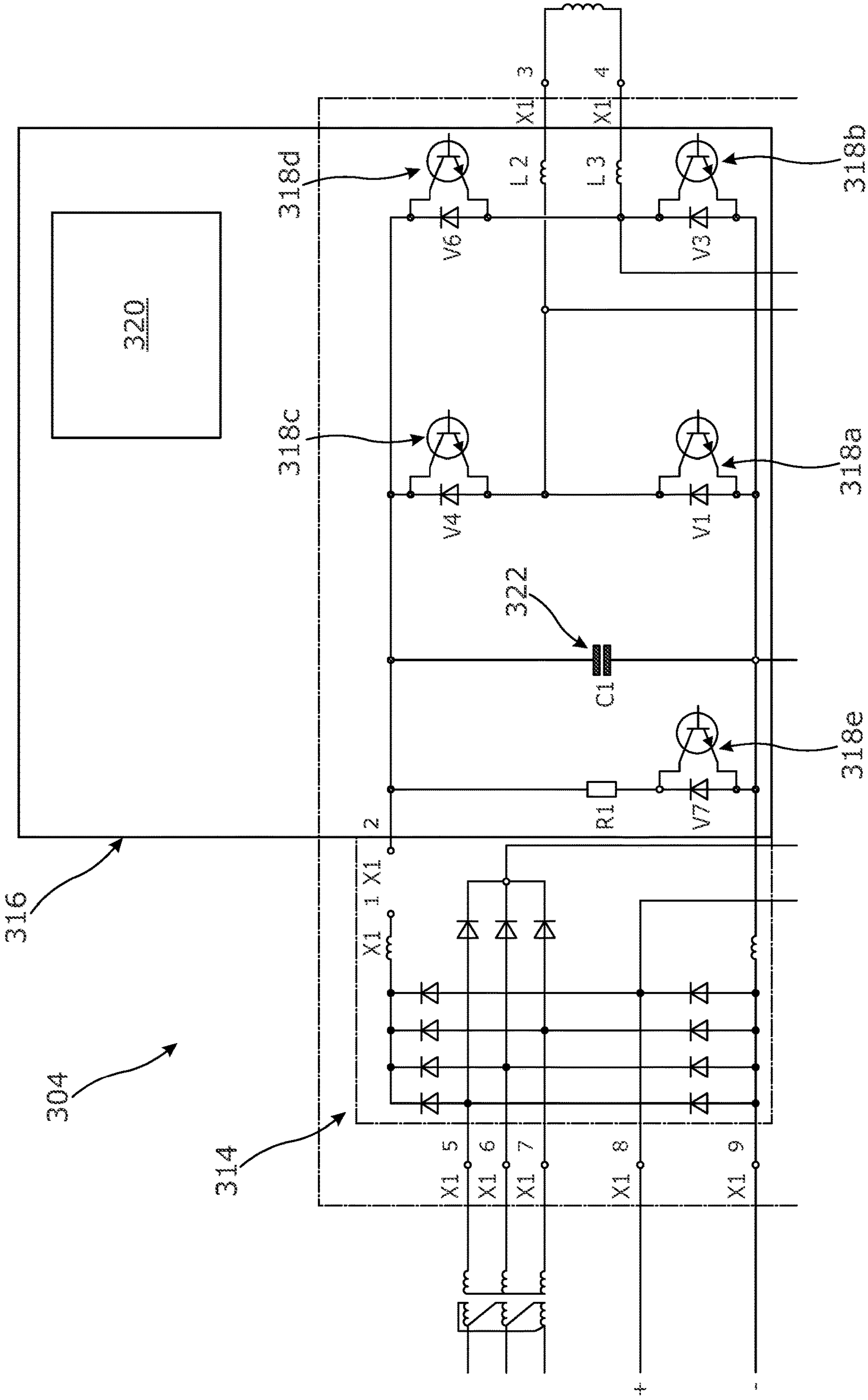
FIG. 3 shows an example exciter circuit.

FIG. 3 shows an example exciter circuit 304 for a synchronous machine that corresponds to the exciter circuit of FIG. 2. In particular, the exciter circuit 300 comprises rectifier circuitry 314 configured to convert an alternating current, AC, input to a direct current, DC output, and control circuitry 316 configured to: receive a first signal indicative of an electrical output of the synchronous machine, receive a second signal indicative of an electrical demand from a load connected to the synchronous machine, and adjust the DC output based on the electrical demand indicated by the second signal and the electrical output indicated by the first signal.

The control circuitry 316 further comprises one or more insulated-gate bipolar transistors, IGBTs, 318*a-e*, and an automatic voltage regulator 320 configured to control the one or more IGBTs 318*a-e* to adjust the DC output of the rectifier circuitry 314.

The control circuitry 316 further comprises a capacitor 322 configured to protect the one or more IGBTs, 318*a-e* from circuit inductance when the IGBTs are switched from an on-state to an off-state by the automatic voltage regulator 320. That is, the capacitor 322 enables the one or more IGBTs, 318*a-e* to turn off or "commutate" without damage. The capacitor 322 is selected to withstand the applied voltage and to be capable of storing the required charge to provide commutation.

The layout of the exciter circuit 304 may therefore be representative of an IGBT H-bridge.

As described earlier, the electrical output of a synchronous machine is regulated to meet the electrical demand of a load. In circumstances where the electrical output exceeds the electrical demand of the load, the synchronous machine should be responsive enough to quickly reduce its electrical output to avoid overloading and damaging the load. Similarly, when the electrical demand of the load exceeds the electrical output, the synchronous machine should be responsive enough to quickly increase the electrical output to avoid the load functioning incorrectly (or, in more severe cases, a brownout or blackout).

Such responsiveness may be hampered by the inherent characteristics of a synchronous generator system, including the circuit inductance of the main exciter. This is because this circuit inductance can give rise to a relatively long time constant for response.

Figure 4:
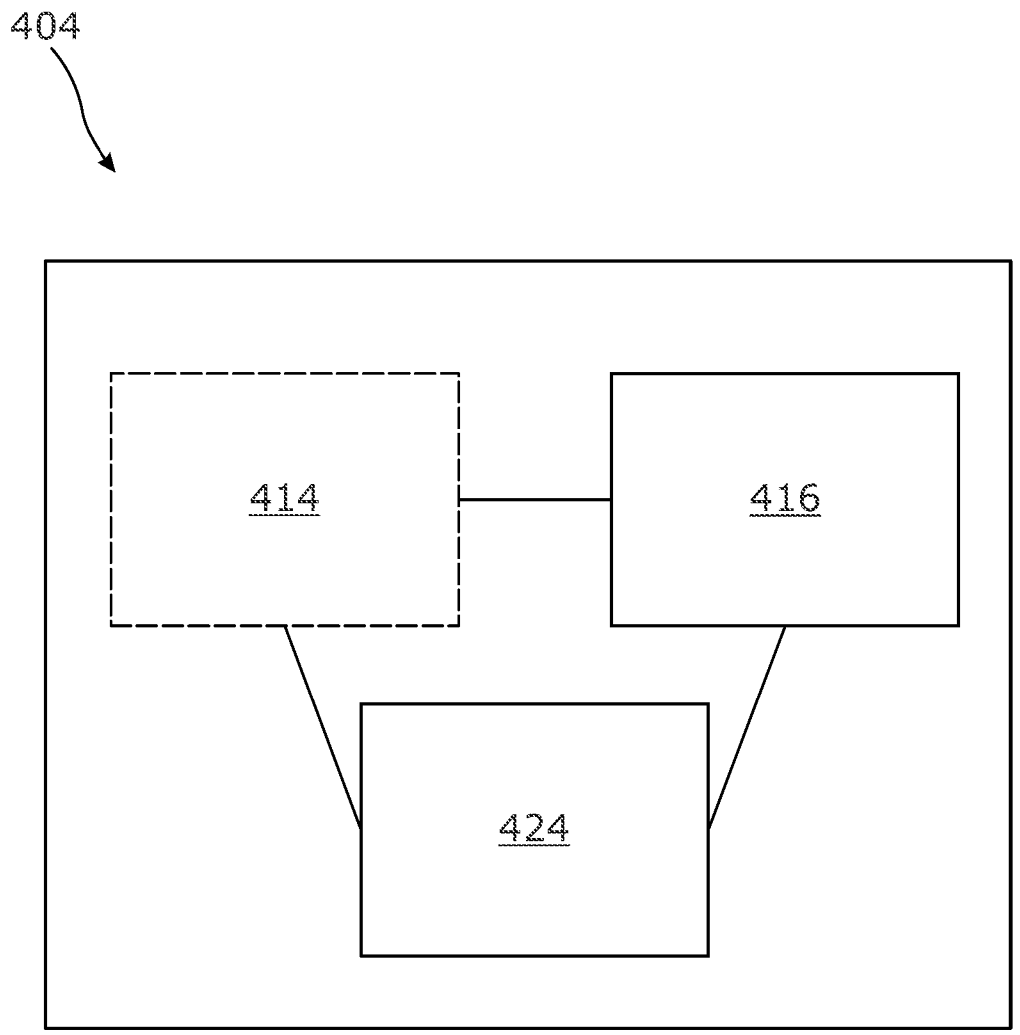
FIG. 4 shows in schematic form another example exciter circuit.

FIG. 4 shows in schematic form another example exciter circuit 404 for a synchronous machine. The synchronous machine (or synchronous electrical machine) may be a synchronous generator, a synchronous motor or a synchronous condenser. Like the exciter circuit of FIGS. 2 and 3, the exciter circuit 404 of FIG. 4 comprises, albeit as an optional feature, rectifier circuitry 414 configured to convert an AC input to a DC output coupled to the synchronous machine, and control circuitry 416. Unlike the earlier exciter circuits, the exciter circuit of FIG. 4 comprises at least one charge storage device 424 configured to supply energy to the DC output, wherein the control circuitry 416 is configured to: receive a first signal indicative of an operating state of the synchronous machine, receive a second signal indicative of a control demand for the synchronous machine, and supply at least a portion of energy stored by the at least one charge storage device 424 to satisfy the control demand indicated by the second signal when the control demand indicated by the second signal exceeds a threshold capability of the synchronous machine that would otherwise exist if the at least one charge storage device was not present, and the synchronous machine is in an appropriate operating state as derived from the first signal.

The first signal may be indicative of a measured parameter of the operating state of the synchronous machine, or a control or command signal (e.g., to enable the use of the at least one charge storage device) for the exciter circuit, and the second signal may be indicative of a parameter requirement of the control demand for the synchronous machine.

The exciter circuit may or may not comprise rectifier circuitry configured to convert an AC input to the DC output. For example, in the unusual situation where an AC input (supply signal) from a permanent magnet generator is unavailable, the system could operate from a DC input (supply signal) thereby removing the need for the rectifier circuitry. In another example, the system may comprise DC and AC power supplies and the exciter circuit may comprise the rectifier circuitry. In this scenario, the DC power supply may be used as a standby power supply in the event that the AC power supply (e.g., from a permanent magnet generator) becomes unavailable.

Accordingly, an exciter circuit for a synchronous machine comprises at least one charge storage device configured to supply energy to a DC output coupled to the synchronous machine, and control circuitry configured to: receive a first signal indicative of an operating state of the synchronous machine, receive a second signal indicative of a control demand for the synchronous machine, and supply at least a portion of energy stored by the at least one charge storage device to satisfy the control demand indicated by the second signal when: the control demand indicated by the second signal exceeds a threshold capability of the synchronous machine that would otherwise exist if the at least one charge storage device was not present, and the synchronous machine is in an appropriate operating state as derived from the first signal.

In an example, an exciter circuit for a synchronous machine may comprise at least one charge storage device configured to be discharged to a DC output, and control circuitry configured to: receive a first signal indicative of an electrical output of the synchronous machine, receive a second signal indicative of an electrical demand from a load connected to the synchronous machine, and discharge the at least one charge storage device when the electrical demand indicated by the second signal exceeds the electrical output indicated by the first signal.

The electrical output may be a voltage output, current output or power output of the synchronous machine. The electrical demand may be a voltage demand, a current demand, an exciter field voltage demand, a power demand, or a demand characterised by an inductance (real or complex) of the load coupled to the synchronous machine. The electrical demand may be represented as a parameter indicative of electrical demand (e.g., power factor). The load may comprise an electrical load or a mechanical load. Where the load comprises a mechanical load, the exciter circuit and/or the synchronous machine may comprise means to translate the mechanical load into a signal indicative of an electrical demand.

As discussed in more detail below, by virtue of the at least one charge storage device 422 and the control circuitry 416, the exciter circuit 404 of FIG. 4 may advantageously achieve a higher and more dynamic DC output ceiling compared to the exciter circuits of FIGS. 2-3. The exciter circuit 404 of FIG. 4 may therefore improve the ability of a synchronous machine to respond to changes in load demand.

In at least one example, the control circuitry 404 may be further configured to: receive a third signal indicative of an amount of charge stored by the at least one charge storage device 424, and initiate charging of the at least one charge storage device 424 when the amount of stored charge indicated by the third signal is below a predefined threshold and the power output indicated by the first signal satisfies the power demand indicated by the second signal. The power output indicated by the first signal may be a generator power output. In this way the control circuitry 404 may be seen to prepare the at least one charge storage 424 for discharge without placing an undue demand on the synchronous machine.

The control circuitry may be configured to initiate charging of the at least one charge storage device by the AC input and/or load (exciter field winding in this example). The AC input may be provided by an AC supply, such as a pilot exciter (e.g. a permanent magnet generator) of a synchronous generator system.

In at least one example, the first signal may be indicative of a measured parameter of the operating state of the synchronous machine, and the control circuitry 404 may be further configured to discharge the at least one charge storage device 424 when the electrical demand indicated by the second signal exceeds the electrical output indicated by the first signal by a predefined amount, which may be an absolute or relative amount. Similarly, in at least one example the first signal may be indicative of a measured parameter of the operating state of the synchronous machine, and the control circuitry 404 may be configured to discharge the at least one charge storage device 424 when the electrical demand indicated by the second signal exceeds the electrical output indicated by the first signal for a predefined period of time; for example, 0.05 s, 0.1 s, 0.5 s or 1 s.

As such, the control circuitry 404 may be configured such that transient load variations (and/or minor fluctuations in the magnitude of the load) do not cause discharge of the at least one charge storage device 424.

In at least one example, the control circuitry 404 may be configured to electrically isolate the at least one charge storage device 424 from the DC output when the electrical output indicated by the first signal satisfies the electrical demand indicated by the second signal.

In at least one example, the DC output may be a positive or negative voltage. The AC input may be a three-phase signal or a single-phase signal.

In at least one example, the first signal comprises a voltage, current and/or power output of the synchronous machine, the second signal comprises a voltage, current, power, and/or inductance (real or complex) demand and/or reflects a power factor from the load connected to the synchronous machine, and the load comprises an electrical load or a mechanical load.

Figure 5A:
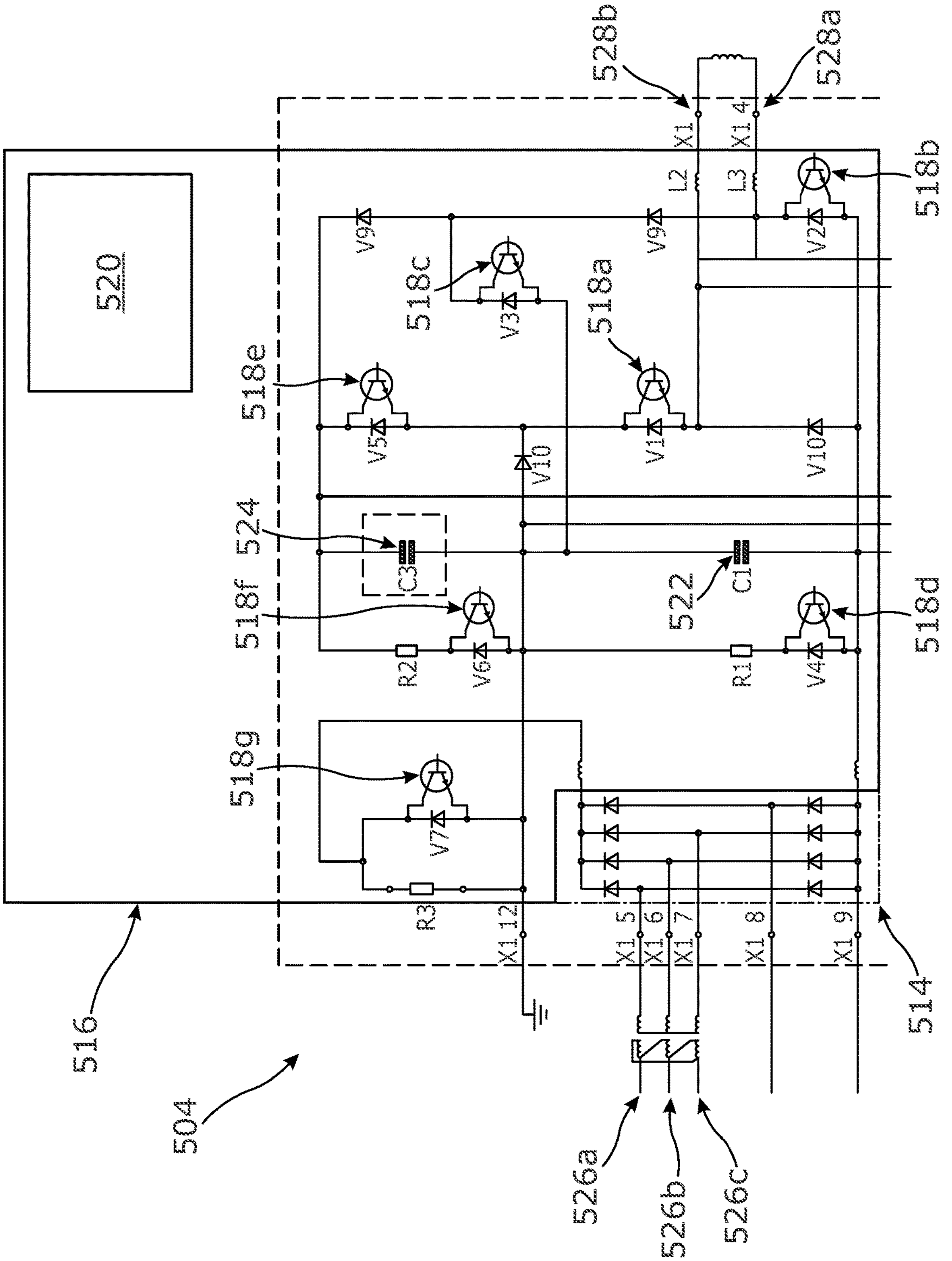
FIGS. 5*a-b* show another example exciter circuit.
Figure 5B:
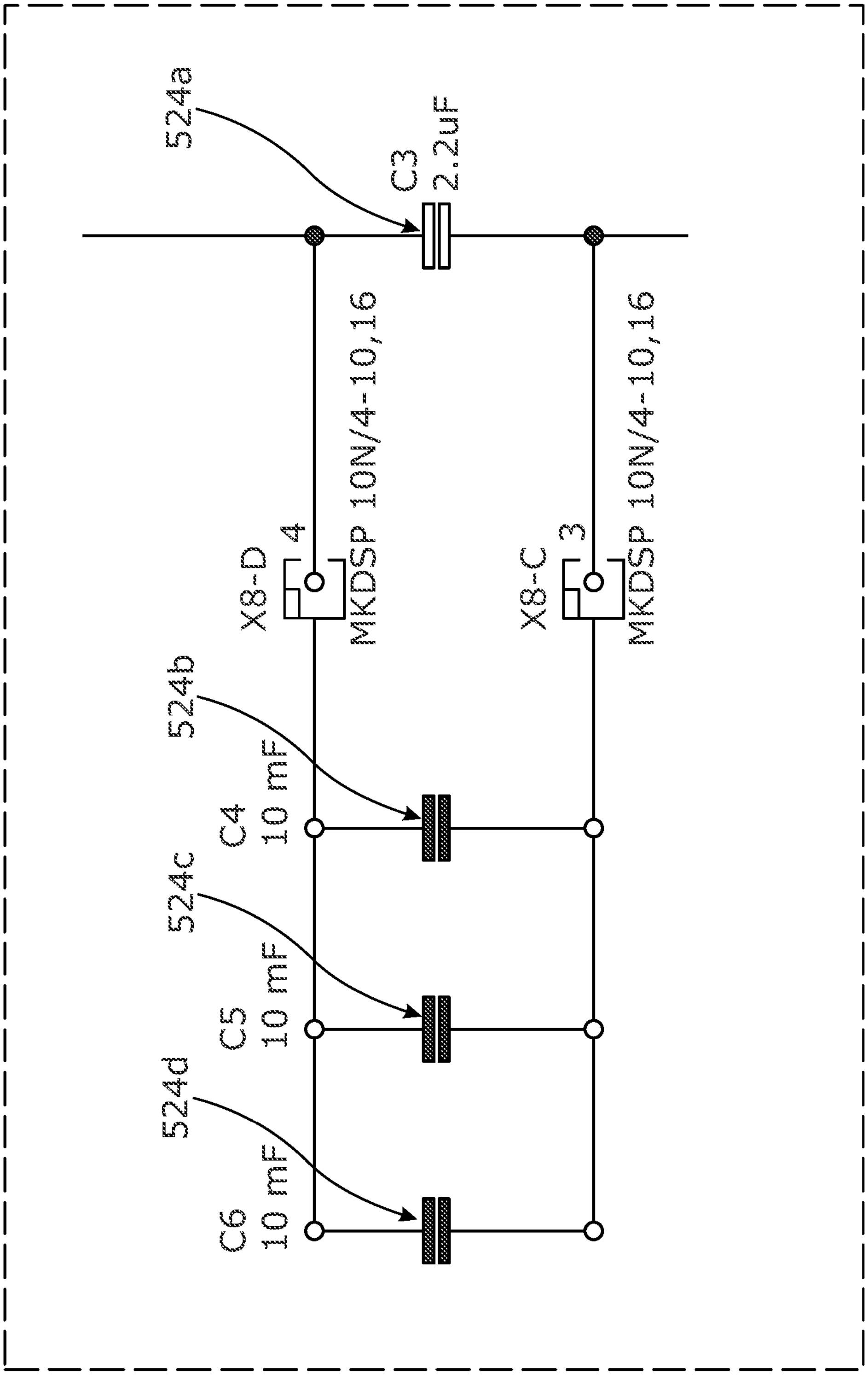

FIGS. 5*a-b* show an example exciter circuit 504 for a synchronous machine that corresponds to the exciter circuit of FIG. 4. FIG. 5*a* shows the exciter circuit 504 comprising rectifier circuitry 514 configured to convert an AC input to a DC output, at least one charge storage device 524 configured to supply energy to the DC output, and control circuitry 516 configured to: receive a first signal indicative of an operating state of the synchronous machine, receive a second signal indicative of a control demand for the synchronous machine, and supply at least a portion of energy stored by the at least one charge storage device 524 to satisfy the control demand indicated by the second signal when the control demand indicated by the second signal exceeds a threshold capability of the synchronous machine that would otherwise exist if the at least one charge storage device was not present, and when the synchronous machine is in an appropriate operating state as derived from the first signal.

The control circuitry 516 further comprises one or more IGBTs 518*a-g*, and an automatic voltage regulator 520 configured to control the one or more IGBTs 518*a-g* to provide the DC output from the voltage on a capacitor 522, if needed, in combination with the voltage from the at least one charge storage device 524. More generally, the automatic voltage regulator 520 is configured to control the one or more insulated-gate bipolar transistors 518*a-g* to adjust the polarity (positive or negative) of the DC output.

The control circuitry 516 further comprises a capacitor 522 configured to protect the IGBTs from circuit inductance when the IGBTs are switched from an on-state to an off-state by the automatic voltage regulator 520.

The transistor and capacitor example shown in FIG. 5*a* is not intended to limit the extent of the disclosure. That is, the one or more IGBTs 518*a-g* may in some examples be implemented as one or more transistor devices, with or without a capacitor configured to protect the one or more transistors from circuit inductance during switching. For example, the one or more transistor devices may be field-effect transistor amplifiers or metal-oxide-semiconductor field-effect transistors. Alternatively, one or more thyristors may be used.

In at least one example, the at least one charge storage device 524 comprises one or more capacitors, batteries or battery-capacitor hybrids 322. Suitable component ratings for the at least one charge storage device 524 may include: a capacitance of 50 mF, a maximum operating voltage of 500V, a maximum rated leakage current of 6 mA, and a maximum ripple current of 20 A. The use of a limited energy reservoir, such as a capacitor, over a continuous energy source may prevent damage to the generator or main exciter of a synchronous generator system since the risk of voltage overload is reduced.

Also shown in FIG. 5*a* are AC input terminals 526*a-c* and DC output terminals 528*a-b*, which may be comprised by the exciter circuit 504. Respectively, the AC input terminals 526*a-c* and DC output terminals 528*a-b* may be configured to receive a fraction of the alternating current, AC, power output of a pilot exciter and provide a DC output to exciter field windings on the stator of the main exciter, as discussed above with respect to FIG. 1*b*.

FIG. 5*b* shows in expanded view an optional implementation of the at least one charge storage device 524 in which four charge storage devices 524*a-d* are connected in parallel. Whether all four charge storage devices (or one, two or three charge storage devices) 524*a-d* are present in the exciter circuit 504 is dependent upon the specifications and requirements of the synchronous machine within which the exciter circuit is used. While all four charge storage devices 524*a-d* might be needed for a larger synchronous machine, a smaller synchronous machine may only require one or two charge storage devices, for example. Of course, alternative applications may require more than four charge storage devices.

Figure 6:
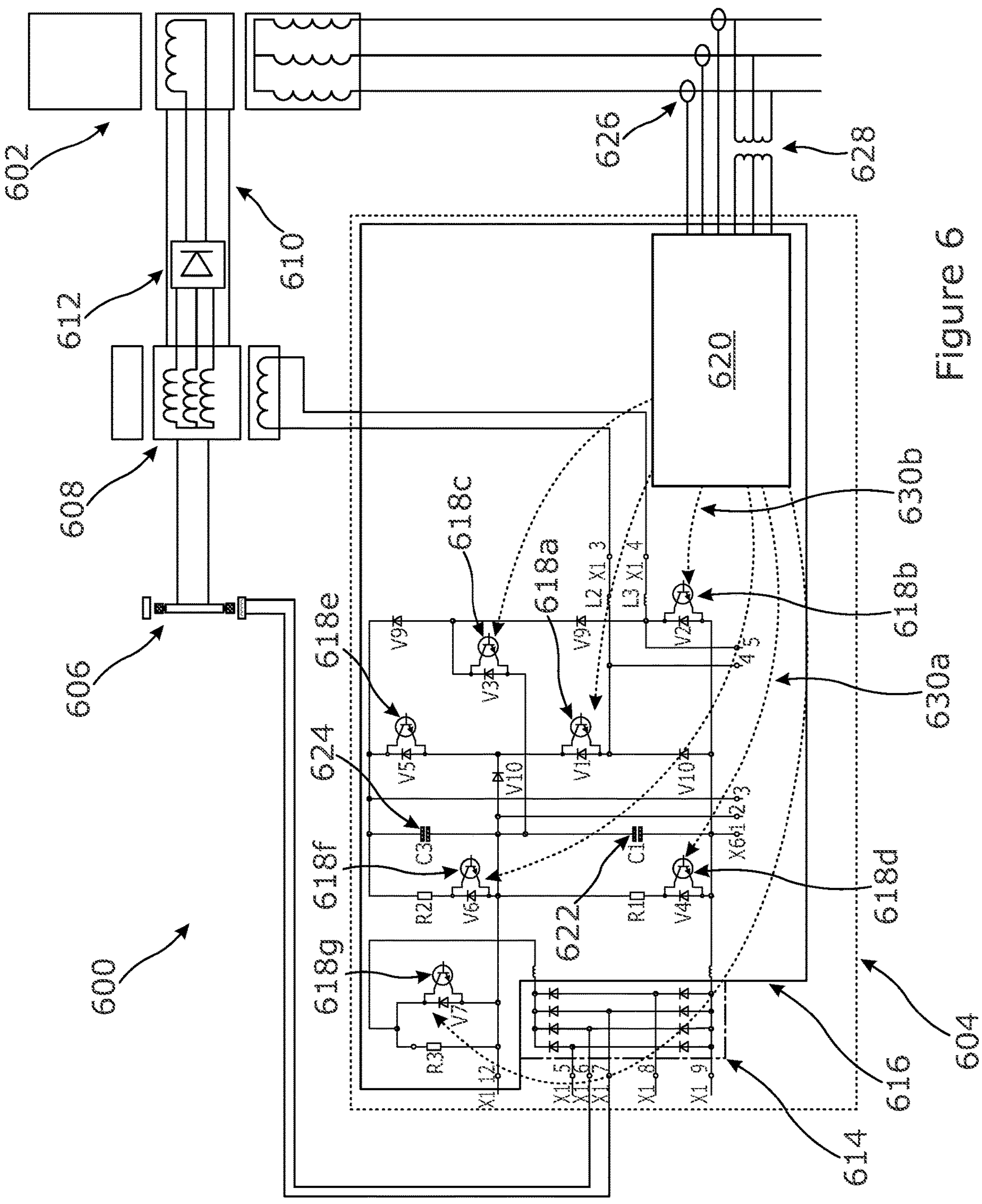
FIG. 6 shows a synchronous generator system comprising the exciter circuit of FIG. 5.

FIG. 6 shows a synchronous generator system 600, as an example of a synchronous machine, comprising the exciter circuit of FIG. 5. The synchronous generator system 600 comprises a generator 602, an exciter circuit 604, a pilot exciter 606, a main exciter 608, a shaft 610 and one or more diodes (e.g., a diode rectifier) 612 mounted on the shaft 610. The synchronous generator system 600 further comprises current sensors 626 and voltage sensors 628 coupled to the generator 602 and the exciter circuit 604.

The exciter circuit 604 comprises rectifier circuitry 614 and control circuitry 616, the control circuitry 616 comprising one or more insulated-gate bipolar transistors 618*a-g*, an automatic voltage regulator 620, a capacitor 622, and at least one at least one charge storage device 624.

The general principles of operation of the synchronous generator system 600 and the exciter circuit 604 are as described with respect to FIGS. 1*b* and 5. As additional detail, the control circuitry 616 can be understood to receive a first signal indicative of an electrical output of the synchronous generator system via current sensors 626 and/or voltage sensors 628. Similarly, the automatic voltage regulator 620 can be understood to control the one or more insulated-gate bipolar transistors 618*a-g* by means of control signals, e.g., control signals 630*a-b*.

To further appreciate the working principles of the exciter circuit of FIG. 5, FIGS. 7*a-e* show part of the control circuitry according to five modes of operation. More specifically, FIGS. 7*a-e* draw attention to the operation modes of the one or more insulated-gate bipolar transistors, IGBTs, 718*a-e*, the capacitor 722 and the at least one charge storage device 724, and the DC output terminals 728*a-b*. The presence of the remaining components of the exciter circuit of FIG. 5 is implicit.

Figure 7A:
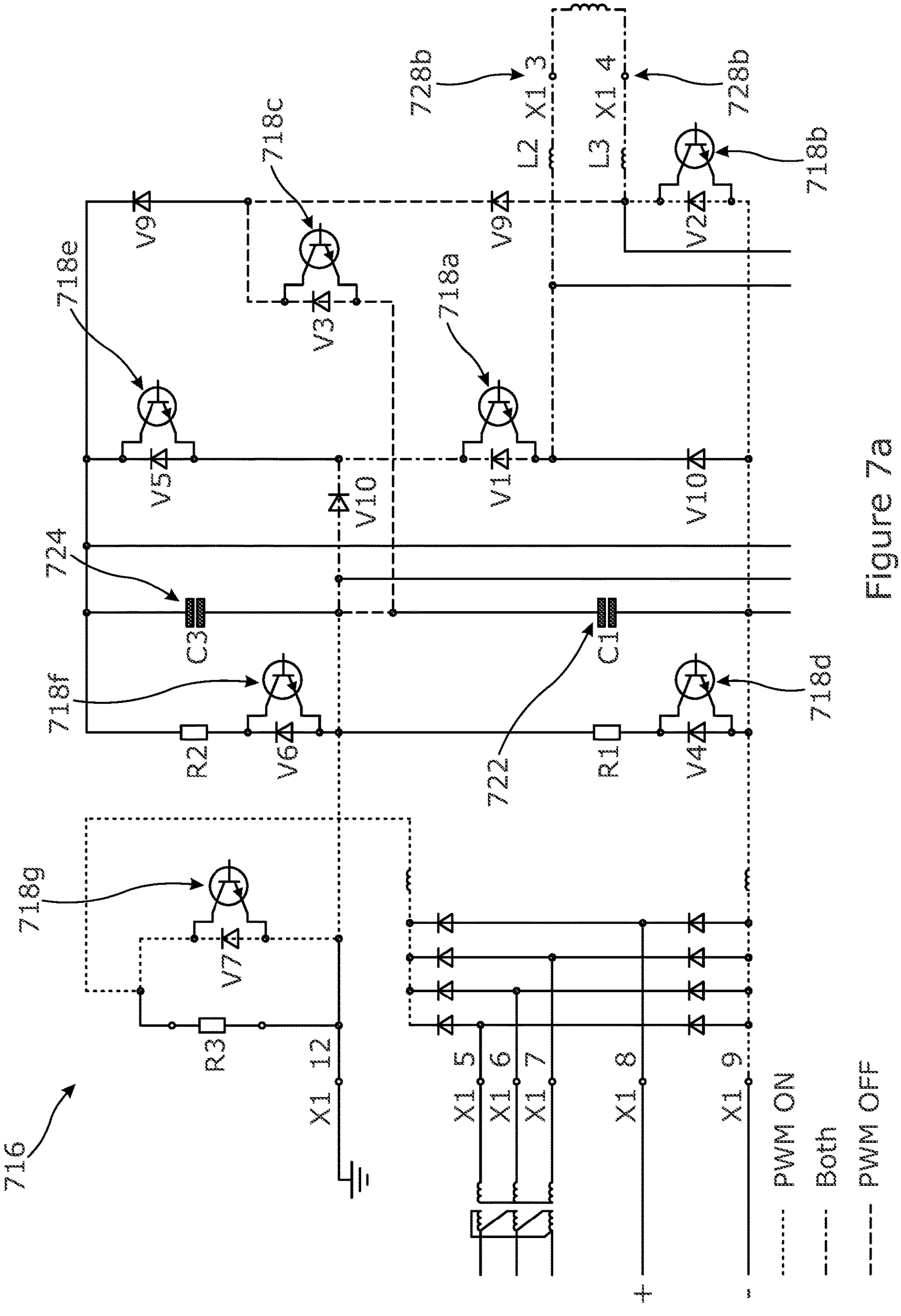
FIG. 7*a* shows the exciter circuit of FIG. 5 in a first mode of operation.

FIG. 7*a* shows part of the control circuitry 716 in a first mode of operation, one that provides a positive DC output voltage, via DC output terminals 728*a-b*, onto the exciter field of the main exciter. This is the mode the exciter circuit operates in during steady state operation of the generator, i.e., a normal mode. The DC output voltage can vary between 0 and the rectified input supply voltage. In this mode, V1, V3 and V7 (i.e., the IGBTs with reference signs 718*a*, 718*c*, and 718*g*) are permanently on and V5 (i.e., the IGBT with reference sign 718*e*) is permanently off. V2 (i.e., the IGBT with reference sign 718*b*) is driven by a pulse width modulation, PWM, signal from the automatic voltage regulator to control the DC output voltage to the exciter field. Current flow through the control circuitry follows the yellow/orange (first/second hatching) path when V2 (i.e., the IGBT with reference sign 718*b*) is on and the pink/orange (third/second hatching) path when V2 (i.e., the IGBT with reference sign 718*b*) is off.

Figure 7B:
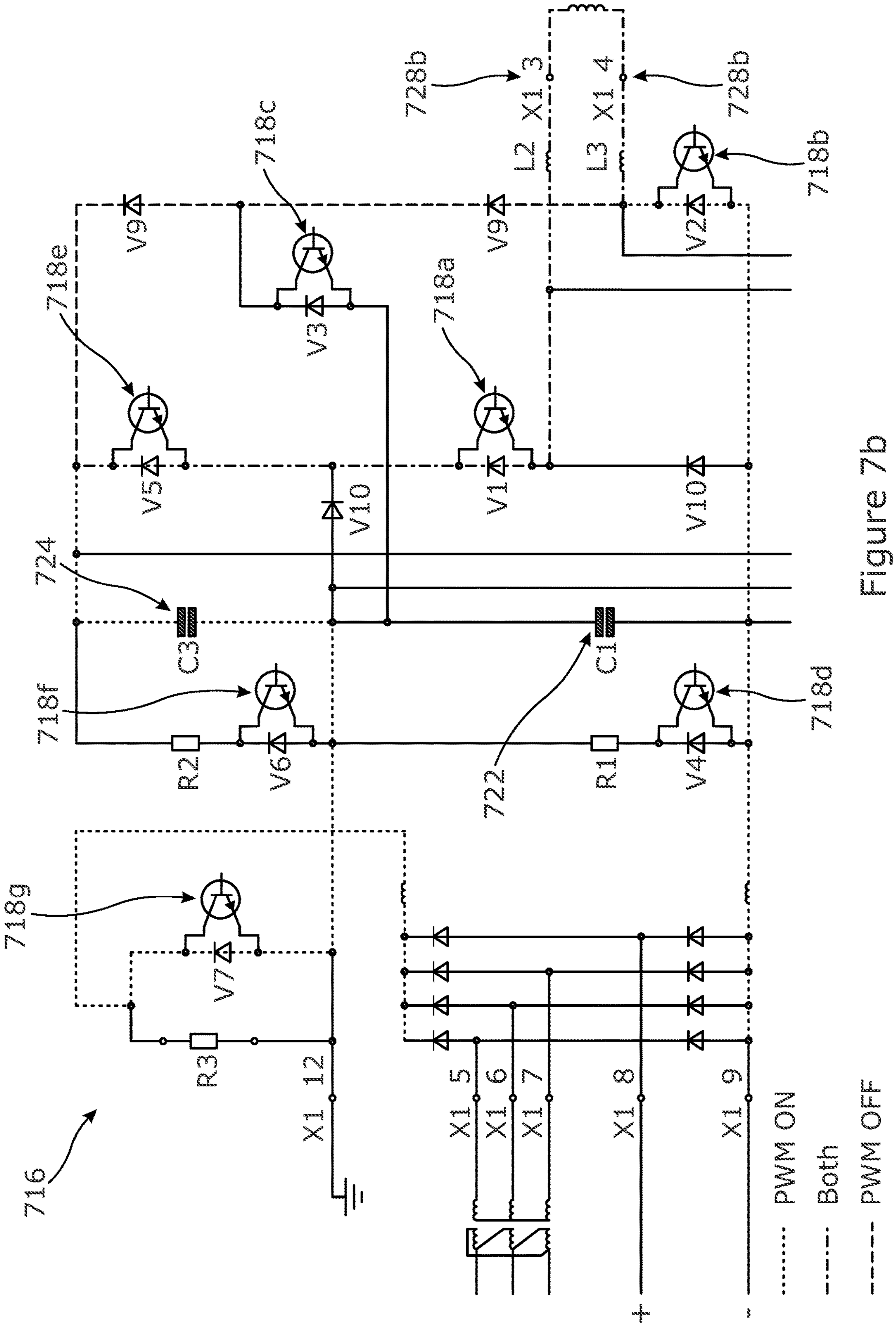
FIG. 7*b* shows the exciter circuit of FIG. 5 in a second mode of operation.

FIG. 7*b* shows part of the control circuitry 716 in a second mode of operation, one that provides a positive DC voltage, via DC output terminals 728*a-b*, onto the exciter field of the main exciter. In this mode, the at least one charge storage device 724 is switched by the control circuitry to discharge to the DC output to provide a larger positive voltage than is possible in the first mode of operation (i.e., a higher DC voltage ceiling is achieved, even after taking the capacitor 722 into consideration). The voltage provided to the DC output terminals 728*a-b* can vary between zero voltage and the input supply voltage plus the voltage provided by the at least one charge storage device 724.

In the second mode, V1, V5 and V7 (i.e., the IGBTs with reference signs 718*a*, 718*e*, and 718*g*) are permanently on and V3 (i.e., the IGBT with reference sign 718*c*) is permanently off. V2 (i.e., the IGBT with reference sign 718*b*) is driven by a PWM signal to control the voltage to the exciter field. The current in the exciter field follows the yellow/orange (first/second hatching) path when V2 (i.e., the IGBT with reference sign 718*b*) is on and the pink/orange (third/second hatching) path when V2 (i.e., the IGBT with reference sign 718*b*) is off.

Figure 7C:
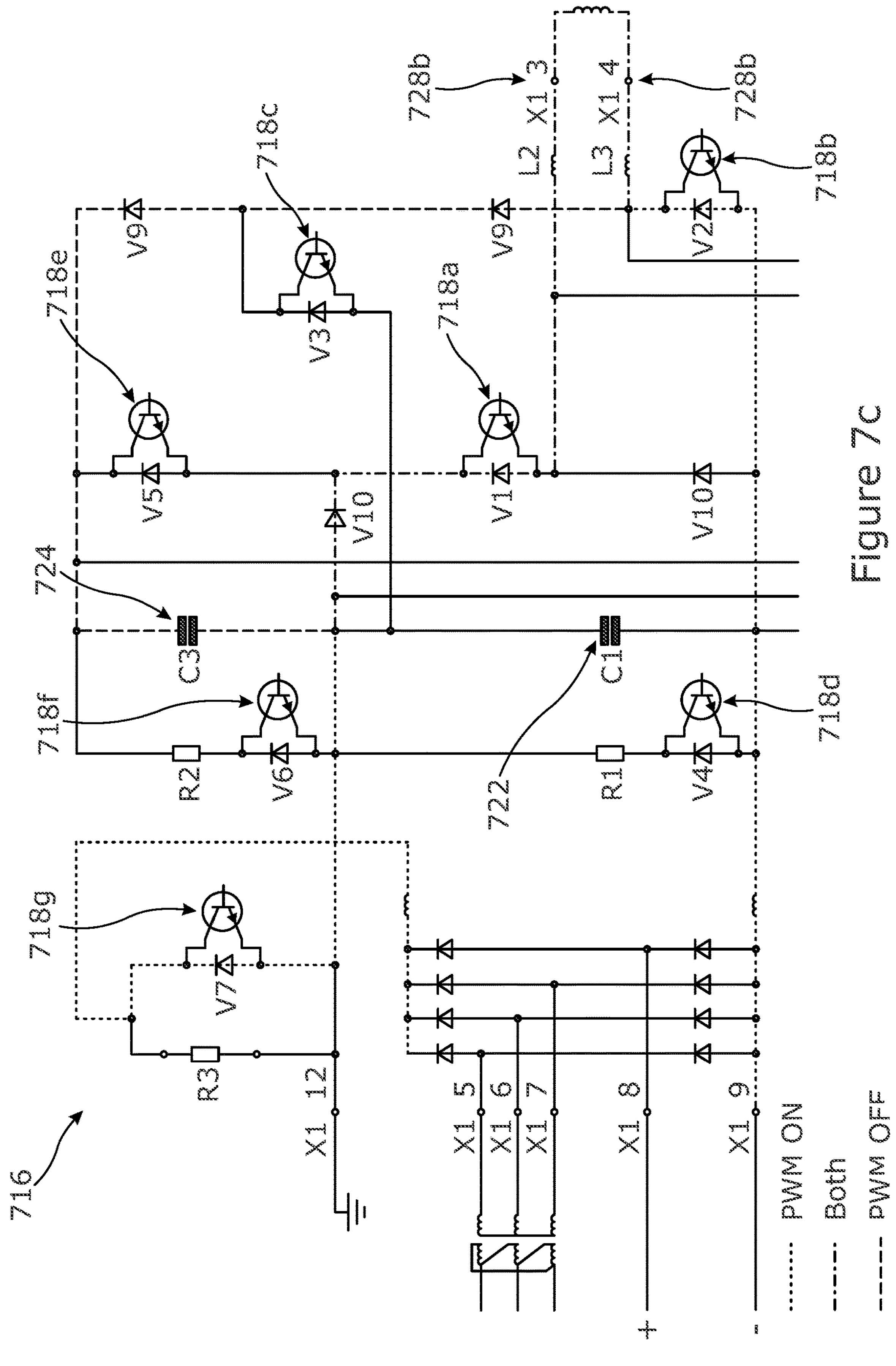
FIG. 7*c* shows the exciter circuit of FIG. 5 in a third mode of operation.

FIG. 7*c* shows part of the control circuitry 716 in a third mode of operation, one that provides a positive DC voltage, via DC output terminals 728*a-b*, onto the exciter field of the main exciter. This mode provides the same voltage range to the exciter field as the first mode of operation; that is, the voltage provided can vary between 0 and the input supply voltage. However, the freewheeling current when V2 (i.e., the IGBT with reference sign 718*b*) is off is switched to charge the at least one charge storage device 724. That is, a path for decay of current though an inductive load is otherwise provided elsewhere through the control circuitry 716. The voltage to which the at least one charge storage device 724 is charged to may be determined by a programmable setting in the control circuitry, which may be implemented via the automatic voltage regulator.

In the third mode, V1 and V7 (i.e., the IGBTs with reference signs 718*a* and 718*g*) are permanently on, V3 and V5 (i.e., the IGBTs with reference signs 718*c* and 718*e*) are permanently off. V2 (i.e., the IGBT with reference sign 718*b*) is driven by a PWM signal to control the voltage to the exciter field via DC output terminals 728*a-b*. The current in the exciter field follows the yellow/orange (first/second hatching) path when V2 (i.e., the IGBT with reference sign 718*b*) is on and the pink/orange (third/second hatching) path when V2 (i.e., the IGBT with reference sign 718*b*) is off. Thus, and in at least one example, the control circuitry 716 is configured to charge the at least one charge storage device 724 using the load (exciter field winding in this example) connected to the synchronous machine.

Figure 7D:
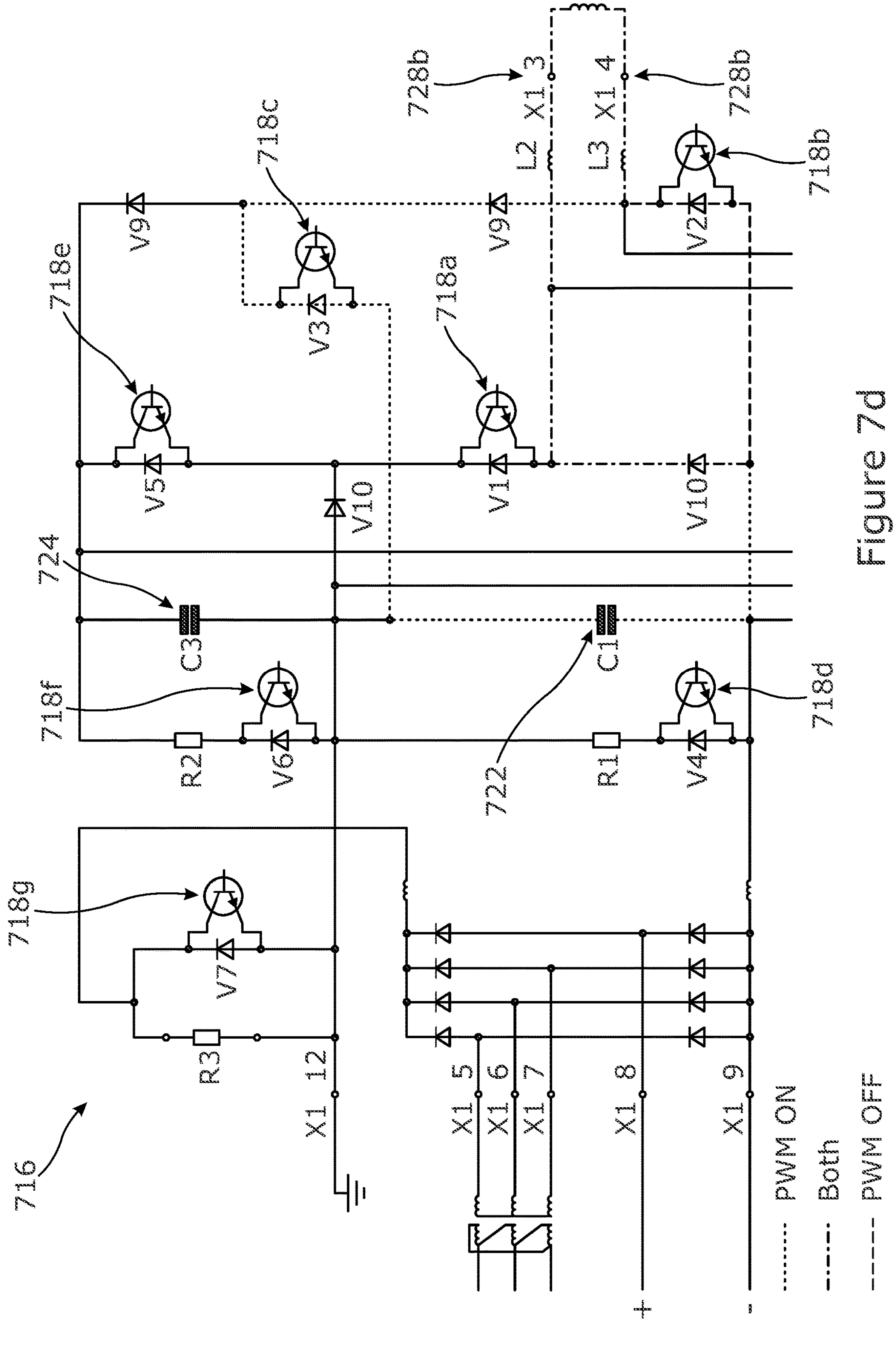
FIG. 7*d* shows the exciter circuit of FIG. 5 in a fourth mode of operation.

FIG. 7*d* shows part of the control circuitry 716 in a fourth mode of operation, one that provides a negative DC voltage, via DC output terminals 728*a-b*, onto the exciter field of the main exciter. The voltage provided can vary between zero volts and the negative input supply voltage. In this mode the capacitor 722 is charging via the yellow (first hatching) highlighted path.

In the fourth mode, V3 and V7 (i.e., the IGBTs with reference signs 718*c* and 718*g*) are permanently on, V1 and V5 (i.e., the IGBTs with reference signs 718*a* and 718*e*) are permanently off. V2 (i.e., the IGBT with reference signs 718*b*) is driven by a PWM signal to control the voltage to the exciter field. The current in the exciter field follows the pink/orange (third/second hatching) path when V2 (i.e., the IGBT with reference signs 718*b*) is on and the yellow/orange path (first/second hatching) when V2 (i.e., the IGBT with reference signs 718*b*) is off.

Figure 7E:
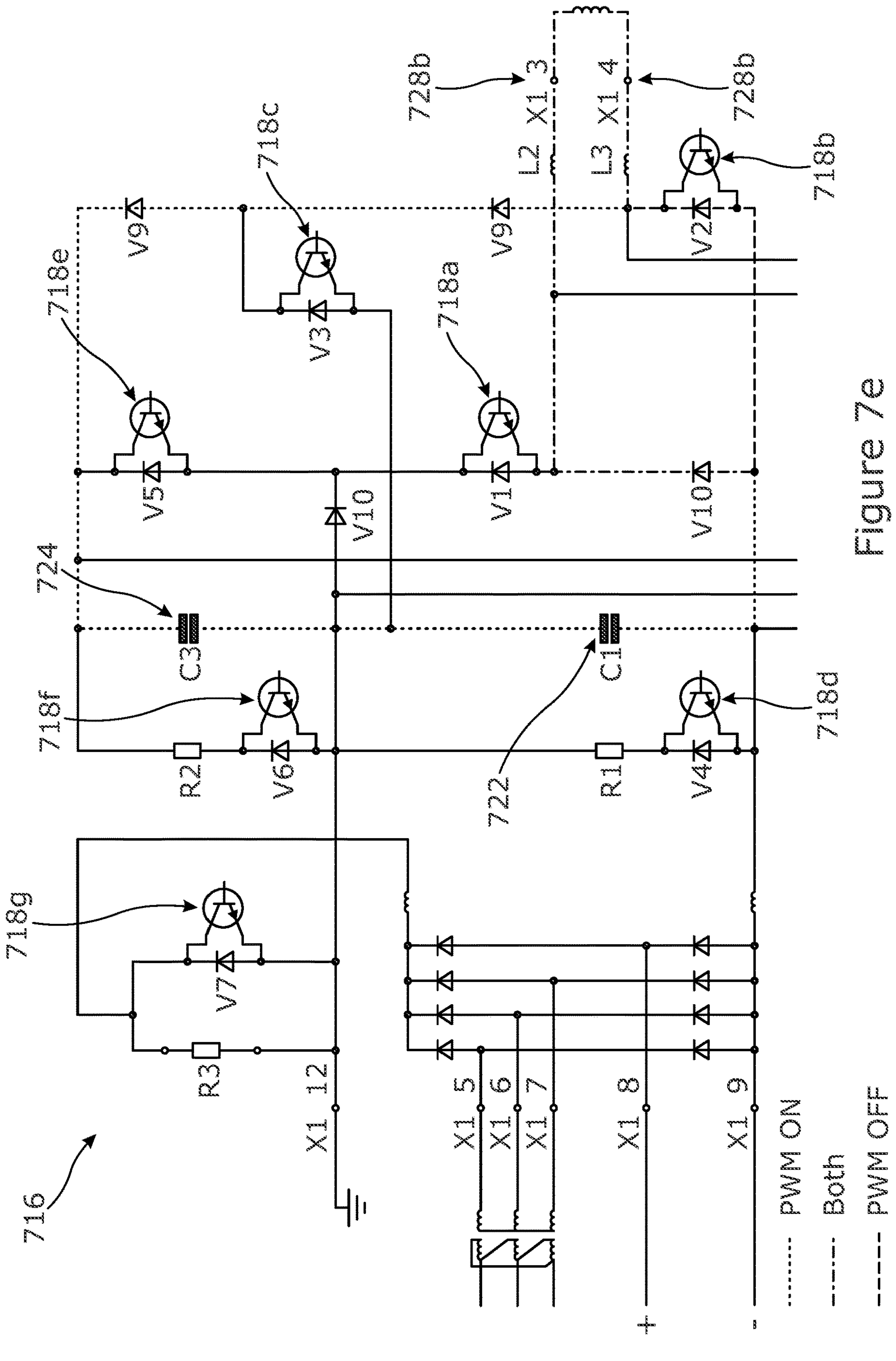
FIG. 7*e* shows the exciter circuit of FIG. 5 in a fifth mode of operation.

FIG. 7*e* shows part of the control circuitry 716 in a fifth mode of operation, one that provides a negative DC boost voltage, via DC output terminals 728*a-b*, onto the exciter field of the main exciter. In this mode, the at least one charge storage device 724 is switched by the control circuitry to the DC output to provide a larger negative voltage than is possible in the fourth mode of operation (i.e., even after taking the capacitor 722 into consideration). The voltage provided to the DC output terminals 728*a-b* can vary between zero volts and the negative input supply voltage (provided by the capacitor 722) plus the negative voltage provided by the at least one charge storage device 724. In this mode the capacitor 722 and the at least one charge storage device 724 are charging via the yellow (first hatching) highlighted path.

In the fifth mode, V7 (i.e., the IGBT with reference signs 718*g*) is permanently on, V1, V3 and V5 (i.e., the IGBTs with reference signs 718*a*, 718*c* and 718*e*) are permanently off. V2 (i.e., the IGBT with reference signs 718*b*) is driven by a PWM signal to control the voltage to the exciter field. The current in the exciter field follows the pink/orange (third/second hatching) path when V2 (i.e., the IGBT with reference signs 718*b*) is on and the yellow/orange path (first/second hatching) when V2 (i.e., the IGBT with reference signs 718*b*) is off.

Accordingly, in at least one example the automatic voltage regulator may be configured to apply pulse width modulation to control the DC output of the exciter circuit.

The first, normal mode of operation therefore corresponds to the control circuit electrically isolating the at least one charge storage device 724 from the DC output when the electrical output indicated by the first signal satisfies the electrical demand indicated by the second signal, as introduced above. Similarly, the second mode of operation corresponds to the control circuit discharging the at least one charge storage device 724 to the DC output when the electrical demand indicated by the second signal exceeds the electrical output indicated by the first signal, thereby providing a DC output 'boost'. The third mode of operation corresponds to the control circuit receiving a third signal indicative of an amount of charge stored by the at least one charge storage device 724, and initiating charging of the at least one charge storage device 724 when the amount of stored charge indicated by the third signal is below a predefined threshold and the electrical output indicated by the first signal satisfies the electrical demand indicated by the second signal.

The negative DC voltages provided by the fourth and fifth modes of operation allow the control circuit to reduce a 'forced' positive DC voltage onto the synchronous machine (cf. the first and second modes) to avoid a current spike overloading the system. As with the second mode of operation, the fifth mode of operation provides a larger DC voltage ceiling—albeit with a negative polarity—to effect faster reduction of a forced positive voltage.

FIG. 8 shows simulated responses of an exciter comprising the exciter circuit of FIG. 3 or FIG. 5. The responses were simulated by means of LTspice® under a DC feeding voltage 300V, a load 7Ω and an inductance of 14 H to represent the resistance and inductance respectively of a brushless exciter field winding. For the exciter circuit of FIG. 5, a capacitance of 10 mF for the at least one charge storage device 724 was assumed.

Figure 8A:
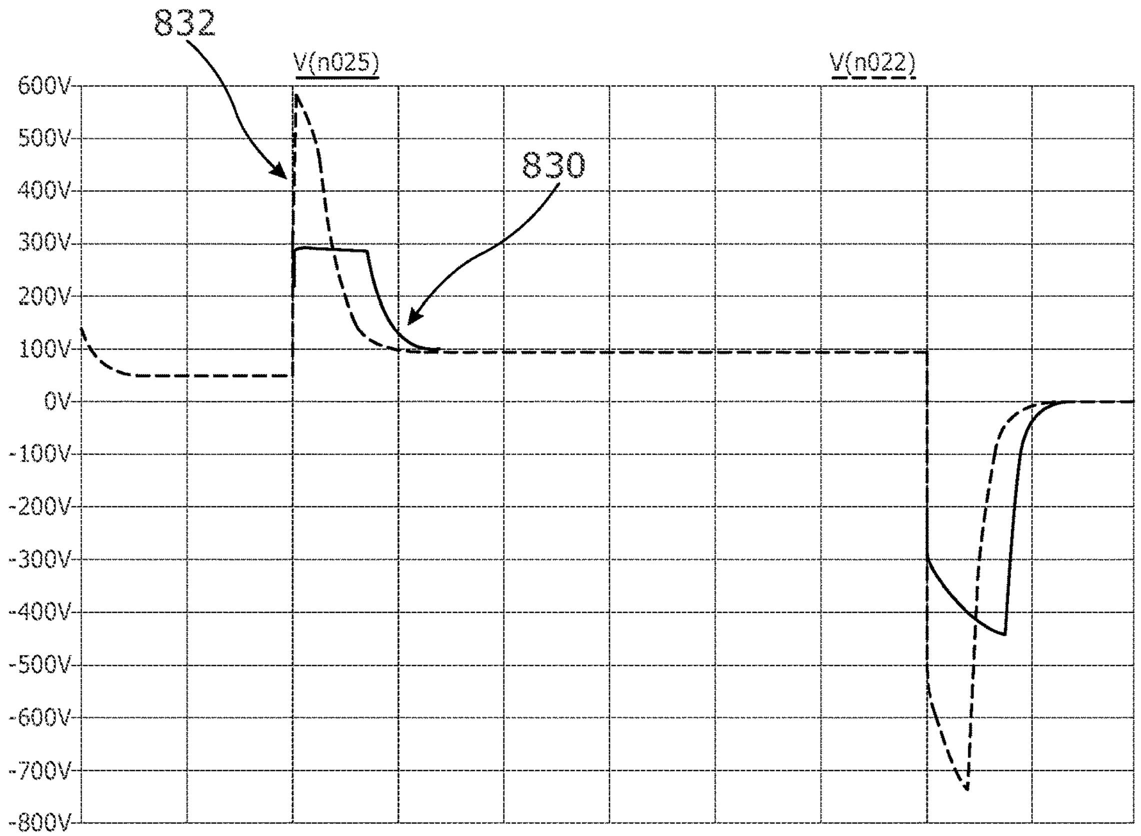
FIG. 8 shows simulated responses of the exciter circuits of FIGS. 3 and 5.
Figure 8B:
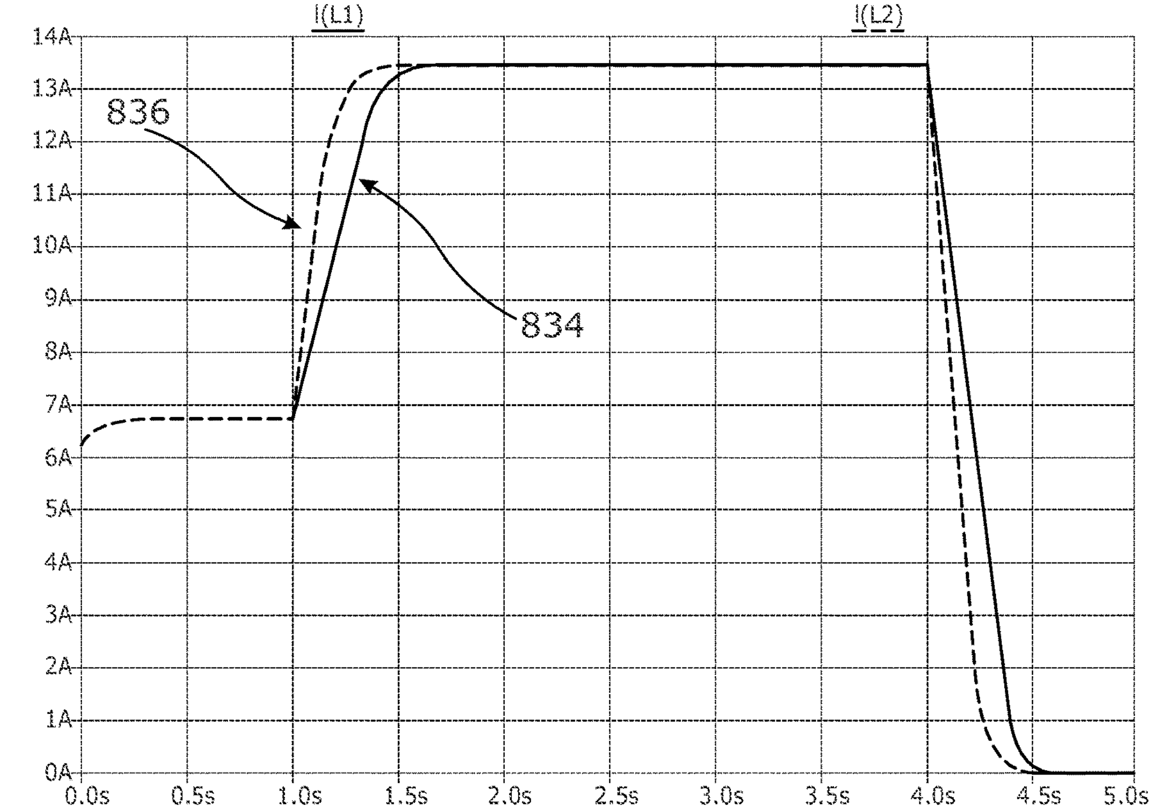

In the top panel, FIG. 8*a*, the voltage response of the exciter circuit of FIG. 3 (the trace 830 indicated by the red or solid line) is compared to the voltage response of the exciter circuit of FIG. 5 (the trace 832 indicated turquoise or dashed line) under the simulation conditions indicated above. The bottom panel, FIG. 8*b*, shows corresponding current responses: the exciter circuit of FIG. 3 (the trace 834 indicated by the green or solid line) and the voltage response of the exciter circuit of FIG. 5 (the trace 836 indicated by the blue or dashed line). As can be seen, the exciter circuit of FIG. 5 provides a voltage 'boost' compared to the exciter circuit of FIG. 3 when switching, as well as a faster rise and fall time to steady-state current.

Figure 9A:
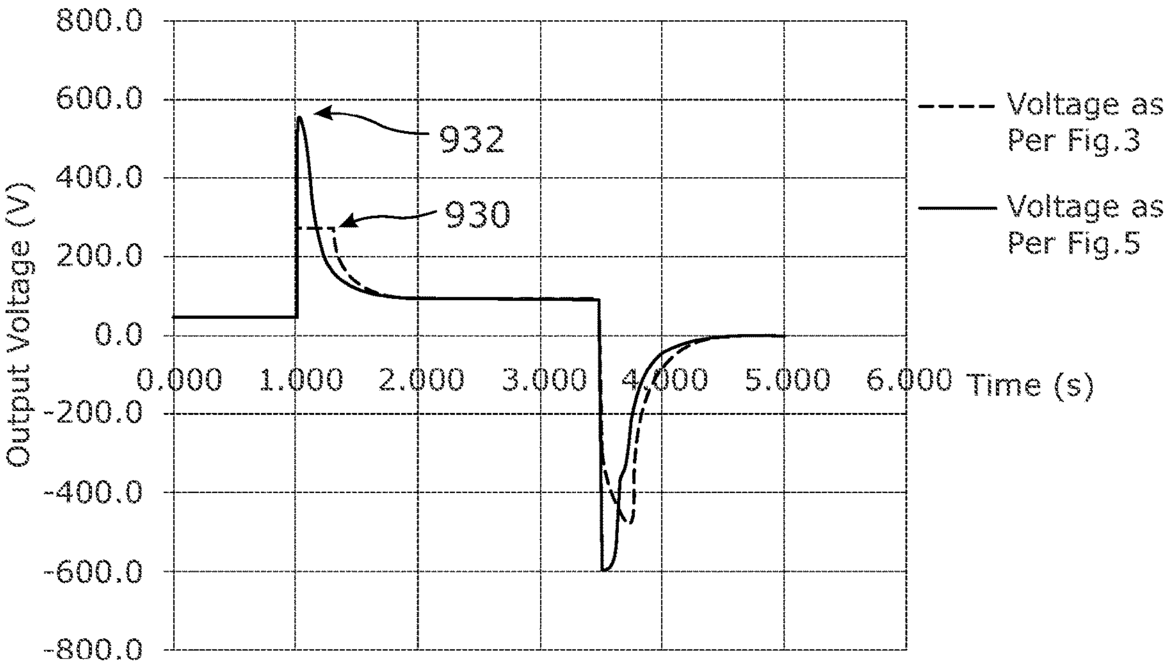
FIG. 9 shows measured responses of the exciter circuits of FIGS. 3 and 5.
Figure 9B:
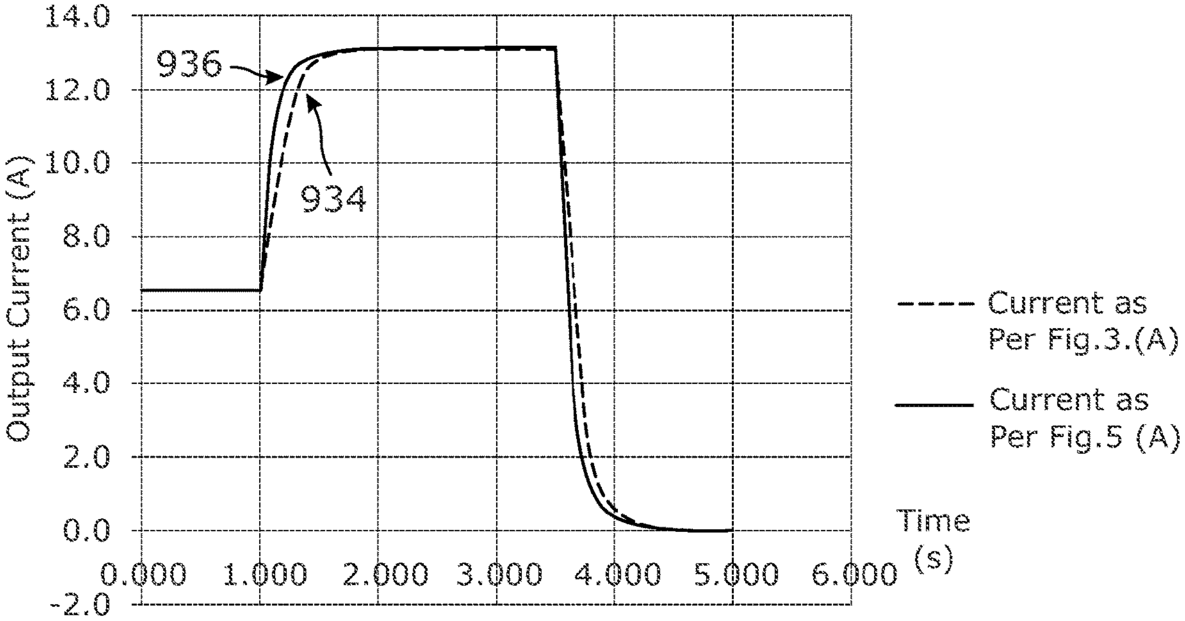

FIG. 9 shows measured responses of an exciter comprising the exciter circuit of FIG. 3 or FIG. 5 under conditions matched to those considered for the simulations (a step of requested exciter field current from 6.5 A to 13 A at time 1 s and from 13 A to 0 A at 3.5 s). The top panel, FIG. 9*a*, shows the voltage response 930 of the exciter circuit of FIG. 3 (indicated by the red or dashed line) and the voltage response 932 of the exciter circuit of FIG. 5 (indicated by the blue or solid line). The bottom panel, FIG. 9*b*, shows the current responses: the exciter circuit of FIG. 3 (the trace 934 indicated by the red or dashed line) and the current response of the exciter circuit of FIG. 5 (the trace 936 indicated by the blue or solid line).

Figure 10A:
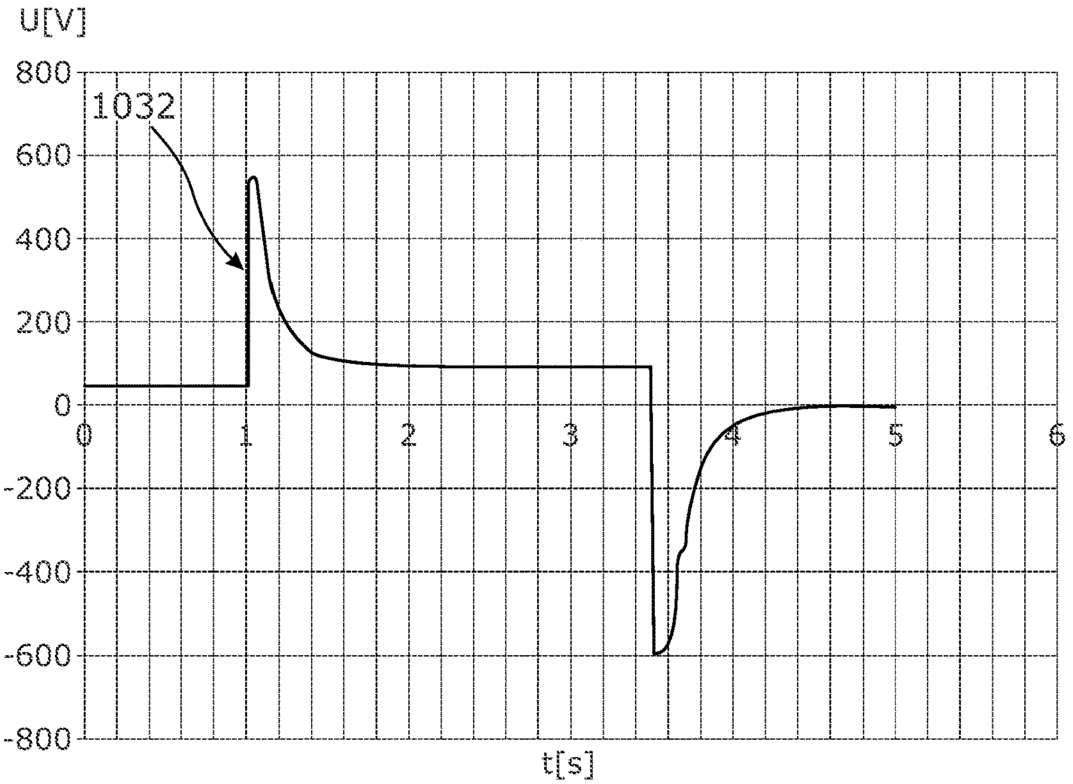
FIG. 10 shows further measured responses of the exciter circuits of FIGS. 3 and 5.
Figure 10B:
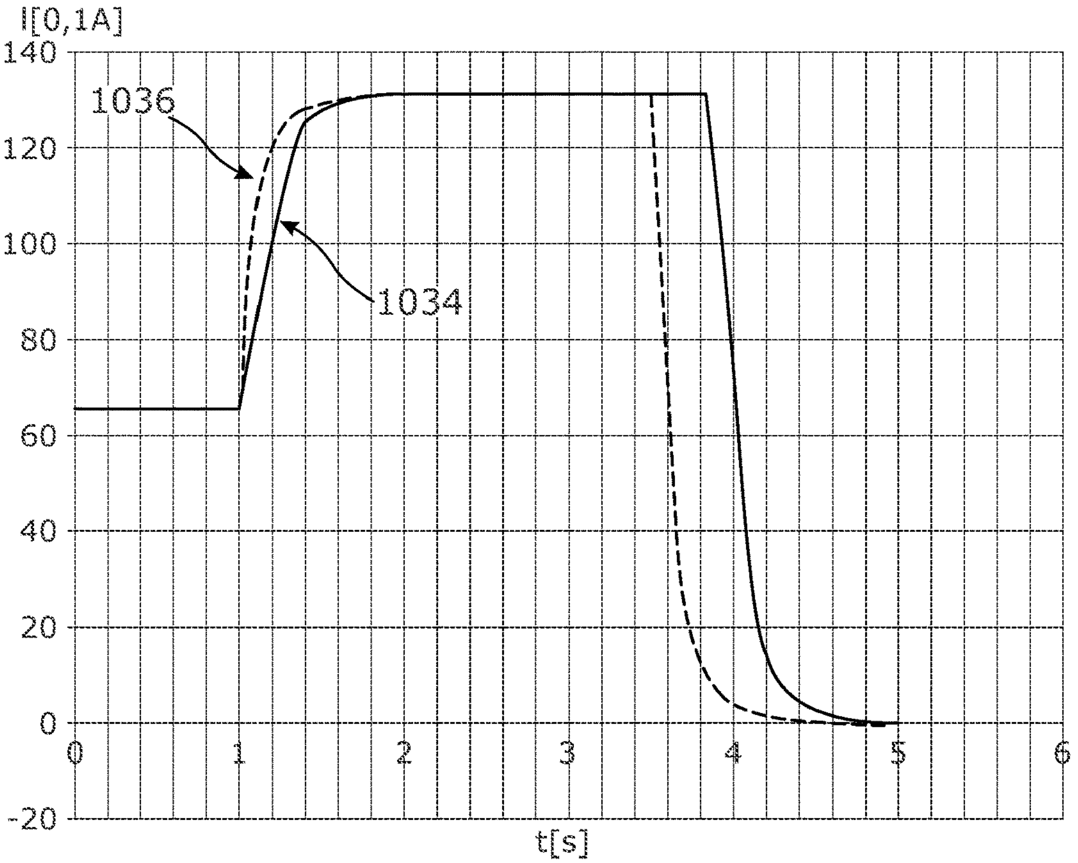

FIG. 10 shows further measured responses of the exciter circuits of FIGS. 3 and 5 under conditions matched to those considered for the simulations. The top panel, FIG. 10*a*, shows the voltage response 1032 of the exciter circuit of FIG. 5. The bottom panel, FIG. 10*b*, shows the current responses: the exciter circuit of FIG. 3 (the trace 1034 indicated by the red or solid line) and the current response the exciter circuit of FIG. 5 (the trace 1036 indicated by the blue or dashed line).

The measured responses shown in FIGS. 9 and 10 are close to the simulated responses shown in FIG. 8, validating the advantageous characteristics of the exciter circuit of FIG. 5 over the exciter circuit of FIG. 3.

Figure 11:
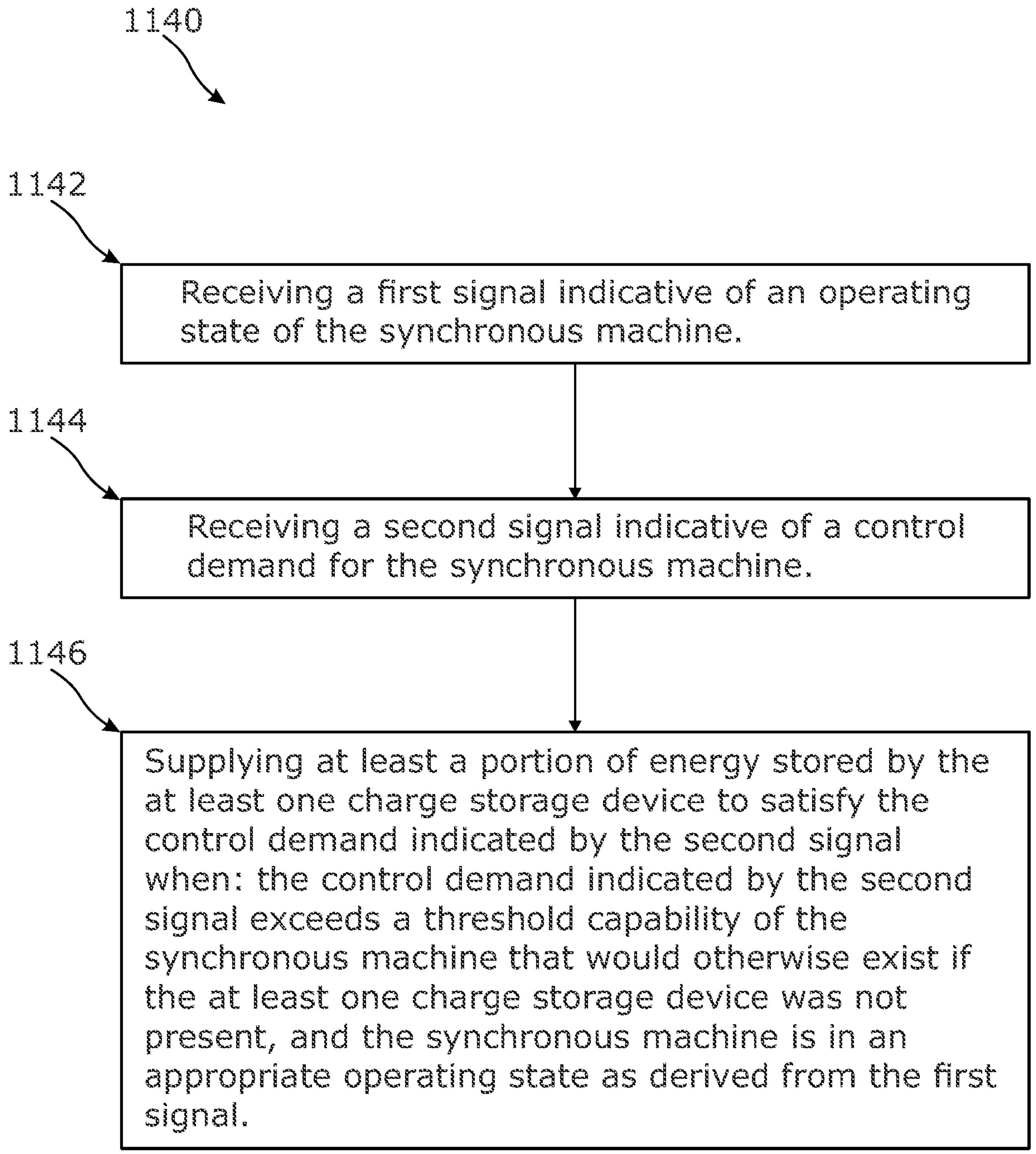
FIG. 11 shows a method of operating the exciter circuit of FIG. 5.

FIG. 11 shows a method 1140 of operating the exciter circuit of FIG. 5. The method, which is also applicable to operating the exciter circuits according to FIGS. 4, 7, 12, 13 and 17, comprises: receiving 1142 a first signal indicative of an operating state of the synchronous machine; receiving 1144 a second signal indicative of a control demand for the synchronous machine; and supplying 1146 at least a portion of energy stored by the at least one charge storage device to satisfy the control demand indicated by the second signal when: the control demand indicated by the second signal exceeds a threshold capability of the synchronous machine that would otherwise exist if the at least one charge storage device was not present, and the synchronous machine is in an appropriate operating state as derived from the first signal.

The first signal may be indicative of a measured parameter of the operating state of the synchronous machine, the measured parameter comprising at least one of a voltage output, current output and power output of the synchronous machine, and one or more of a voltage demand, current demand, power demand, inductance demand and power factor from a load connected to the synchronous machine; and wherein the second signal may be indicative of a parameter requirement of the control demand for the synchronous machine, the parameter requirement comprising at least one of a field voltage and/or a field current of an exciter of the synchronous machine, an input, output and/or one or more internal values of an automatic voltage regulator configured to control the synchronous machine, a voltage and/or current provided by a generator of the synchronous machine, a real or complex inductance demand of the synchronous machine, and a power factor from a load connected to the synchronous machine.

Figure 12:
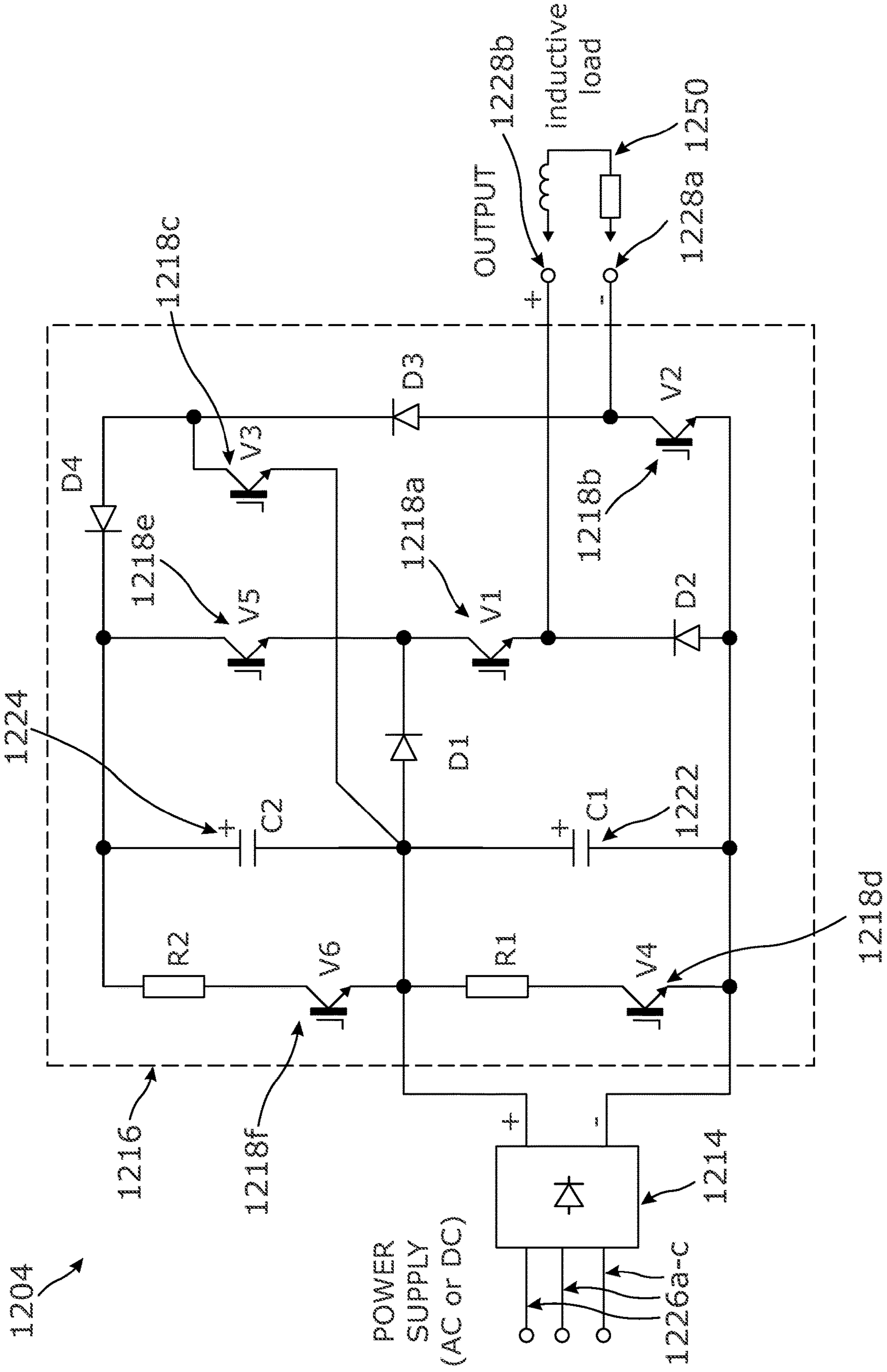
FIG. 12 shows another example exciter circuit.

FIG. 12 shows an example exciter circuit 1204 for a synchronous machine that corresponds to the exciter circuits shown in FIGS. 4-6 and 7*a-e*. In particular, the exciter circuit 1204 comprises rectifier circuitry 1214, at least one charge storage device 1224 (exemplified as capacitor 'C2', which may otherwise be termed a boosting capacitor) and control circuitry 1216, the control circuitry comprising one or more transistors 1218*a-f*, and a capacitor 1222 (exemplified as capacitor 'C1'). As shown, the exciter circuitry 1204 further comprises input terminals 1226*a-c* and DC output terminals 1228*a-b* and may be connected to an inductive load 1250.

The exciter circuit 1204 (which may otherwise be termed a converter) can be supplied by AC three phase or one phase voltage. It is possible to use AC voltage and DC voltage as a standby power supply.

The rectifier circuitry 1214 supplies the capacitor 1222. The at least one charge storage device 1224 is used for boosting and it is charged by switching off transistors V2, V3 (i.e., the transistors with reference signs 1218*b*, and 1218*c*) and the inductive load 1250. The at least one charge storage device 1224 is used only temporarily when it is necessary to increase the electrical output of a synchronous machine to a maximum electrical output and if a rapid increase of electrical output is required. The capacitor 1222 is charged to a predefined value during a normal mode of operation.

The one or more transistors 1218*a-f* may comprise IGBT transistors, however a person skilled in the art will appreciate that it can use another type of switching device if required. The one or more transistors 1218*a-f* may be controlled by an AVR (not shown) implementing (or comprising) the exciter circuit 1204. Based on voltage measurements and other quantities, the AVR may control the one or more transistors 1218*a-f* via the control circuitry 1216.

The exciter circuit 1204 is applicable in excitation systems of brushless synchronous generators, synchronous motors or synchronous compensators where a high initial electrical output response is required. The exciter circuit 1204 can, nonetheless, also be used in alternative applications with similar requirements. The exciter circuit 1204 discharges the at least one charge storage device 1224 to temporarily increase the electrical output of an excitation system. This allows for a significantly accelerated increase in electrical output to an inductive load compared to existing solutions. The exciter circuit 1204 may also charge the at least one charge storage device 1224 without the use of any additional power supply to a synchronous machine. The exciter circuit 1204 may also facilitate fast deexciting of an inductive load.

Accordingly, an exciter circuit in accordance with FIG. 4-6, 7*a-e* or 12 may improve the dynamic behaviour of a whole circuit (i.e., a synchronous machine comprising the example exciter circuit and an inductive load). An additional benefit of using at least one charge storage device over a dedicated charge supply is that the former is self-limiting; once discharged, there is no longer a risk of overloading a synchronous machine.

For example, an exciter circuit as described with FIG. 4-6, 7*a-e* or 12 may be comprised by a synchronous generator system comprising a main generator and a pilot exciter (e.g., a permanent magnet generator) coupled to a rotor shaft of the main generator and configured to provide the AC input. An output terminal of the permanent magnet generator, or any other component of a synchronous machine capable of supplying the AC input, may be coupled to an input terminal of the rectifier circuitry, thereby providing an AC supply for charging the at least one charge storage device. Advantageously, this avoids the need for any separate external power supply for charging the at least one charge storage device.

To further appreciate the working principles of the exciter circuit of FIG. 12, FIGS. 13*a-e* show part of the control circuitry 1316 according to five modes of operation. More specifically, FIGS. 13*a-e* draw attention to the operation modes of the one or more transistors 1318*a-e*, the capacitor 1322, the at least one charge storage device 1324, the DC output terminals 1328*a-b* and the inductive load 1350. The presence of the remaining components of the exciter circuit of FIG. 12 is implicit.

Figure 13A:
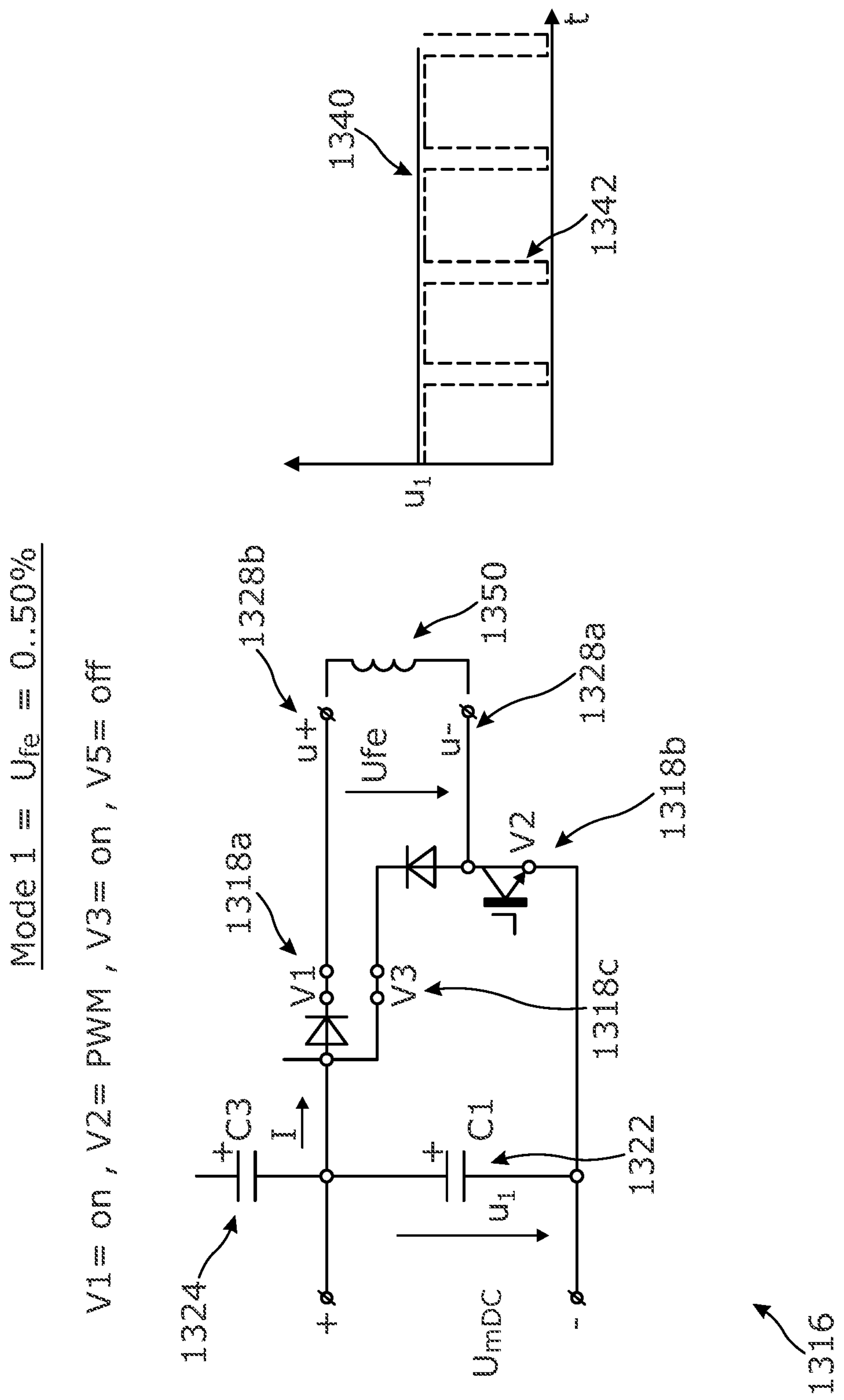
FIG. 13*a* shows the exciter circuit of FIG. 12 in a first mode of operation.

FIG. 13*a* shows part of the control circuitry 1316 in a first, excitation, mode of operation—one that provides a positive output voltage in the range from zero to a positive voltage determined by the capacitor 1322. The output voltage at the DC output terminals 1328*a-b* can be steady-state (i.e., notionally ‘permanent’ during normal operation).

The operation of the one or more transistors 1318*a-e* in the first mode of operation is as follows: V1 (i.e., the transistor with reference sign 1318*a* and represented schematically as a switch) is switched on; V2 (i.e., the transistor with reference sign 1318*b*) is used for PWM that determines the output voltage; V3 (i.e., the transistor with reference sign 1318*c* and represented schematically as a switch) is switched on; V5 (not shown) is switched off.

The expected output voltage over time at the DC output terminals 1328*a-b* during the first mode of operation is shown by the red or solid trace 1340 representing a steady-state output voltage (at the DC output terminal indicated with reference sign 1328*b*), and by the green or dashed trace 1342 represented a pulse width modulated output voltage (at the DC output terminal indicated with reference sign 1328*a*).

Figure 13B:
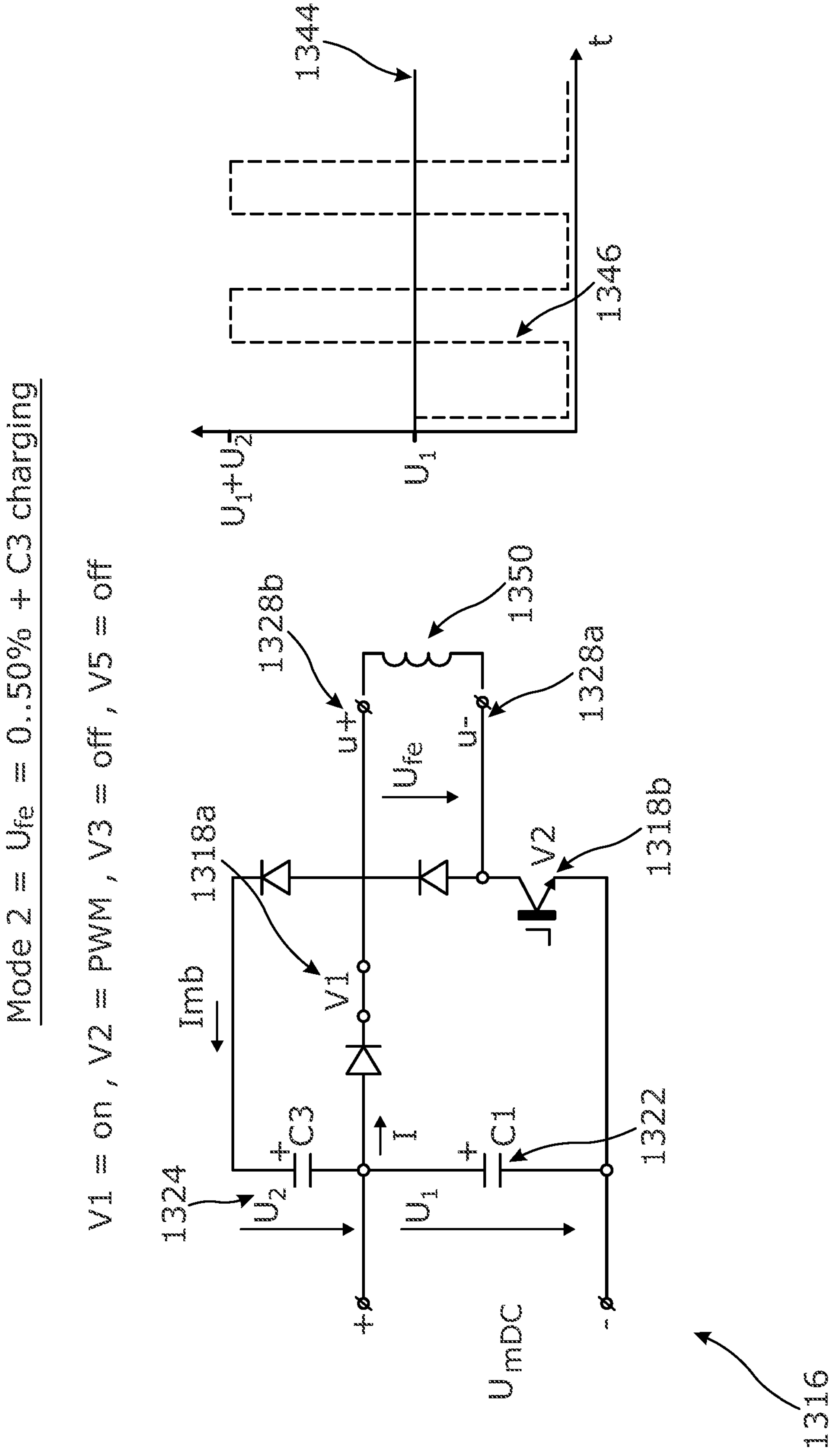
FIG. 13*b* shows the exciter circuit of FIG. 12 in a second mode of operation.

FIG. 13*b* shows part of the control circuitry 1316 in a second, excitation with charging, mode of operation—one that provides a positive output voltage in the range from zero to a voltage determined by the capacitor 1322. This output voltage can be steady state, as discussed in relation to the first mode of operation. In addition, the at least one charge storage device 1324 is charged. After the at least one charge storage device 1324 is charged to a required level, it is left in this state.

The operation of the one or more transistors 1318*a-e* in the second mode of operation is as follows: V1 (i.e., the transistor with reference sign 1318*a* and represented schematically as a switch) is switched on; V2 (i.e., the transistor with reference sign 1318*b*) is used for PWM that determines the output voltage; V3 (not shown) is switched off; V5 (not shown) is switched off.

The expected output voltage over time at the DC output terminals 1328*a-b* during the second mode of operation is shown by the red or solid trace 1344 representing a steady-state output voltage (at the DC output terminal indicated with reference sign 1328*b*), and by the green or dashed trace 1346 represented a pulse width modulated output voltage (at the DC output terminal indicated with reference sign 1328*a*).

Figure 13C:
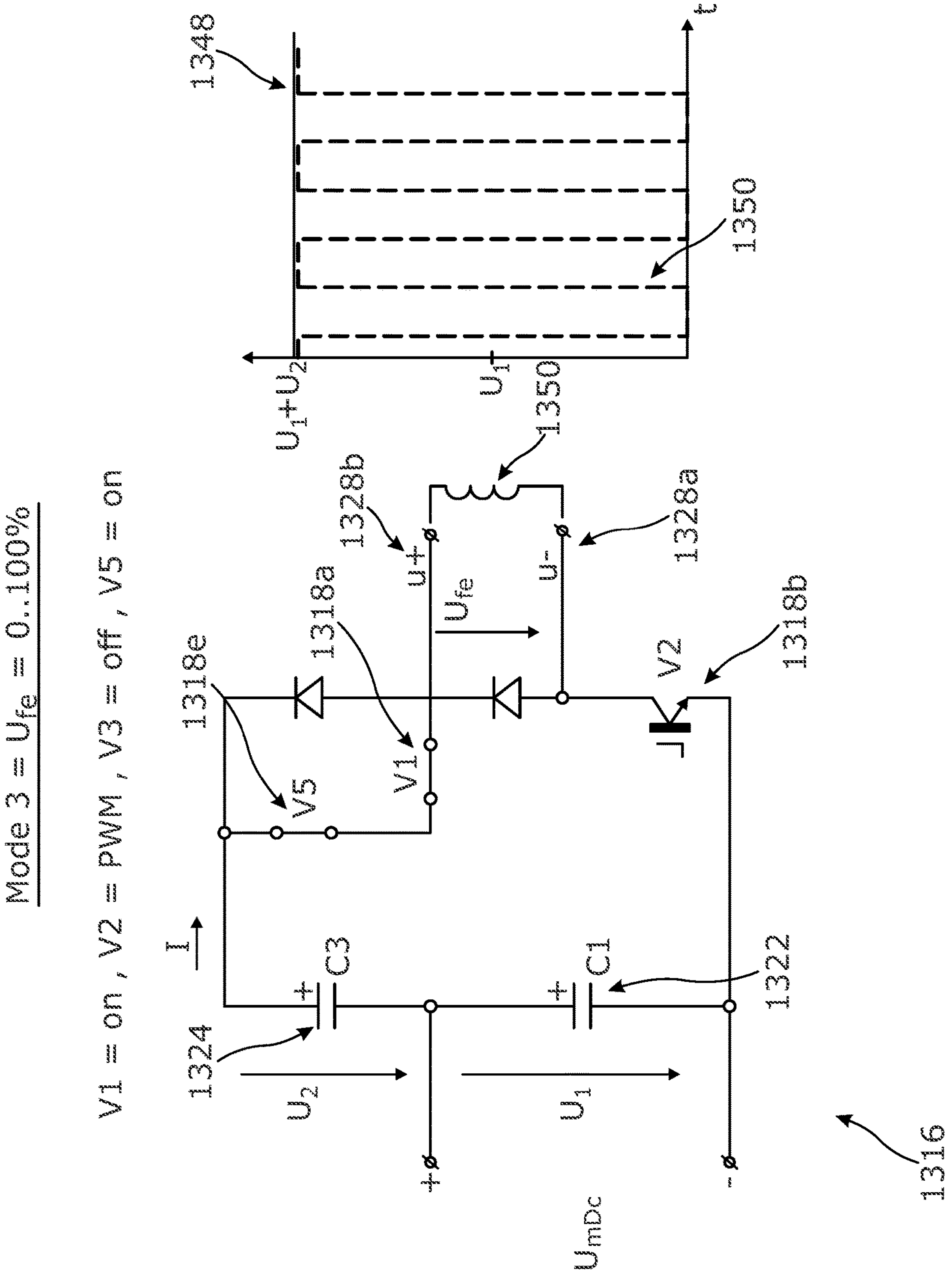
FIG. 13*c* shows the exciter circuit of FIG. 12 in a third mode of operation.

FIG. 13*c* shows part of the control circuitry 1316 in a third, excitation with boosting, mode of operation—one that provides an output voltage in the range from zero to a voltage determined by the capacitor 1322 and the at least one charge storage device 1324. This output voltage can only be delivered during a period in which the at least one charge storage device 1324 is discharged.

The operation of the one or more transistors 1318*a-e* in the third mode of operation is as follows: V1 (i.e., the transistor with reference sign 1318*a* and represented schematically as a switch) is switched on; V2 (i.e., the transistor with reference sign 1318*b*) is used for PWM that determines the output voltage; V3 (not shown) is switched off; V5 (i.e., the transistor with reference sign 1318*e* and represented schematically as a switch) is switched off.

The expected output voltage over time at the DC output terminals 1328*a-b* during the third mode of operation is shown by the red or solid trace 1348 representing a steady-state output voltage (at the DC output terminal indicated with reference sign 1328*b*), and by the green or dashed trace

1350 represented a pulse width modulated output voltage (at the DC output terminal indicated with reference sign 1328*a*).

Figure 13D:
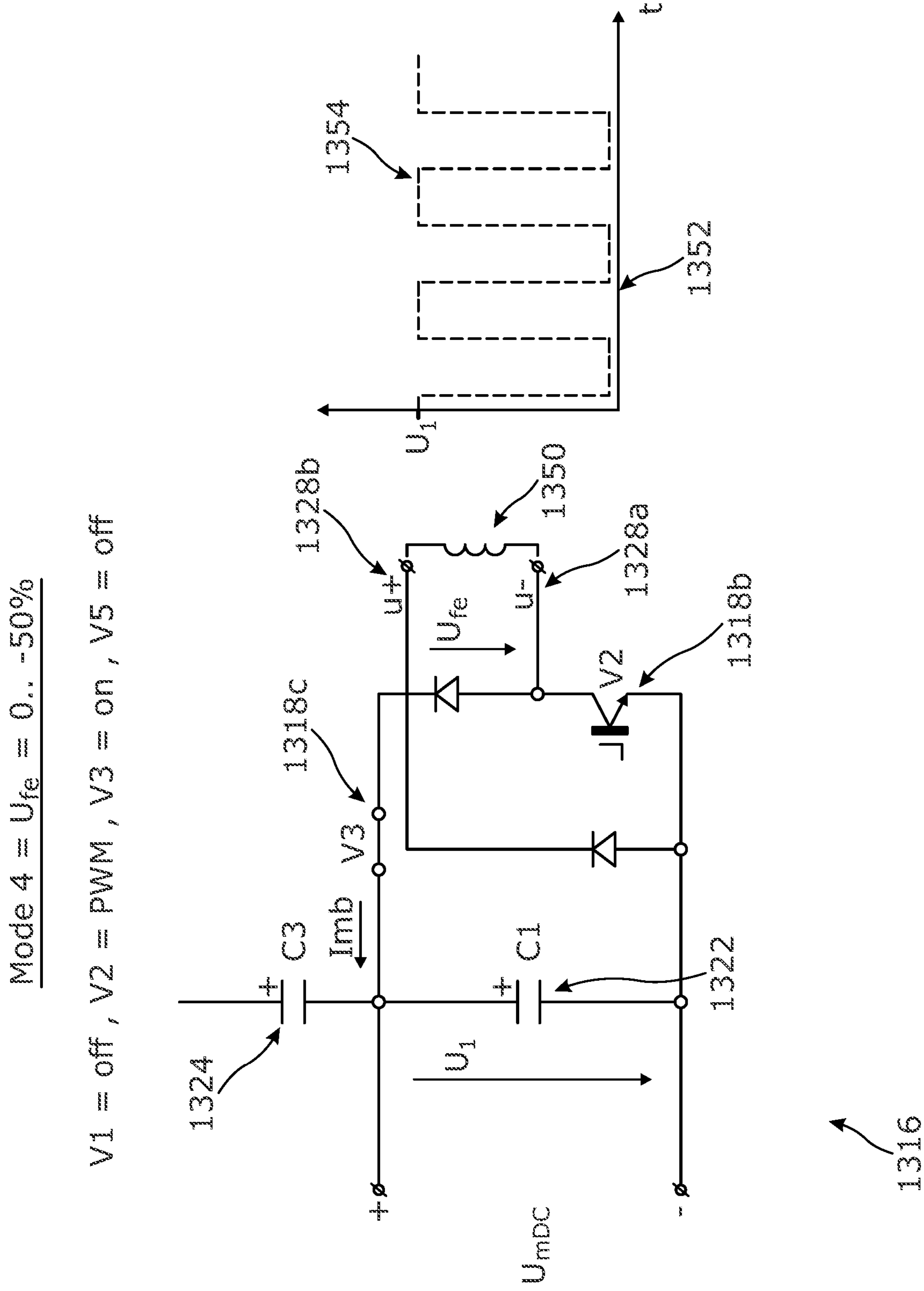
FIG. 13*d* shows the exciter circuit of FIG. 12 in a fourth mode of operation.

FIG. 13*d* shows part of the control circuitry 1316 in a fourth, deexcitation, mode of operation—one that provides a negative output voltage, so long as positive current flows to the inductive load 1350. The output voltage range is from zero to a negative voltage determined by the capacitor 1322. If the voltage across the capacitor 1322 reaches the allowed maximum voltage, transistor V4 (compare with the transistor with reference sign 1218*d* in FIG. 12) is switched on to provide an additional path for current flow (e.g., over a resistor connected in parallel to the capacitor 1322). Thus, switching transistor V4 on facilitates reducing the voltage across the capacitor 1322.

The operation of the one or more transistors 1318*a-e* in the fourth mode of operation is as follows: V1 (not shown) is switched off; V2 (i.e., the transistor with reference sign 1318*b*) is used for PWM that determines the output voltage; V3 (i.e., the transistor with reference sign 1318*c* and represented schematically as a switch) is switched on; V5 (not shown) is switched off; V4 (not shown) is switched on if the voltage across the capacitor 1322 reaches the allowed maximum voltage.

The expected output voltage over time at the DC output terminals 1328*a-b* during the fourth mode of operation is shown by the red or solid trace 1352 representing a steady-state output voltage (at the DC output terminal indicated with reference sign 1328*b*), and by the green or dashed trace 1354 represented a pulse width modulated output voltage (at the DC output terminal indicated with reference sign 1328*a*).

Figure 13E:
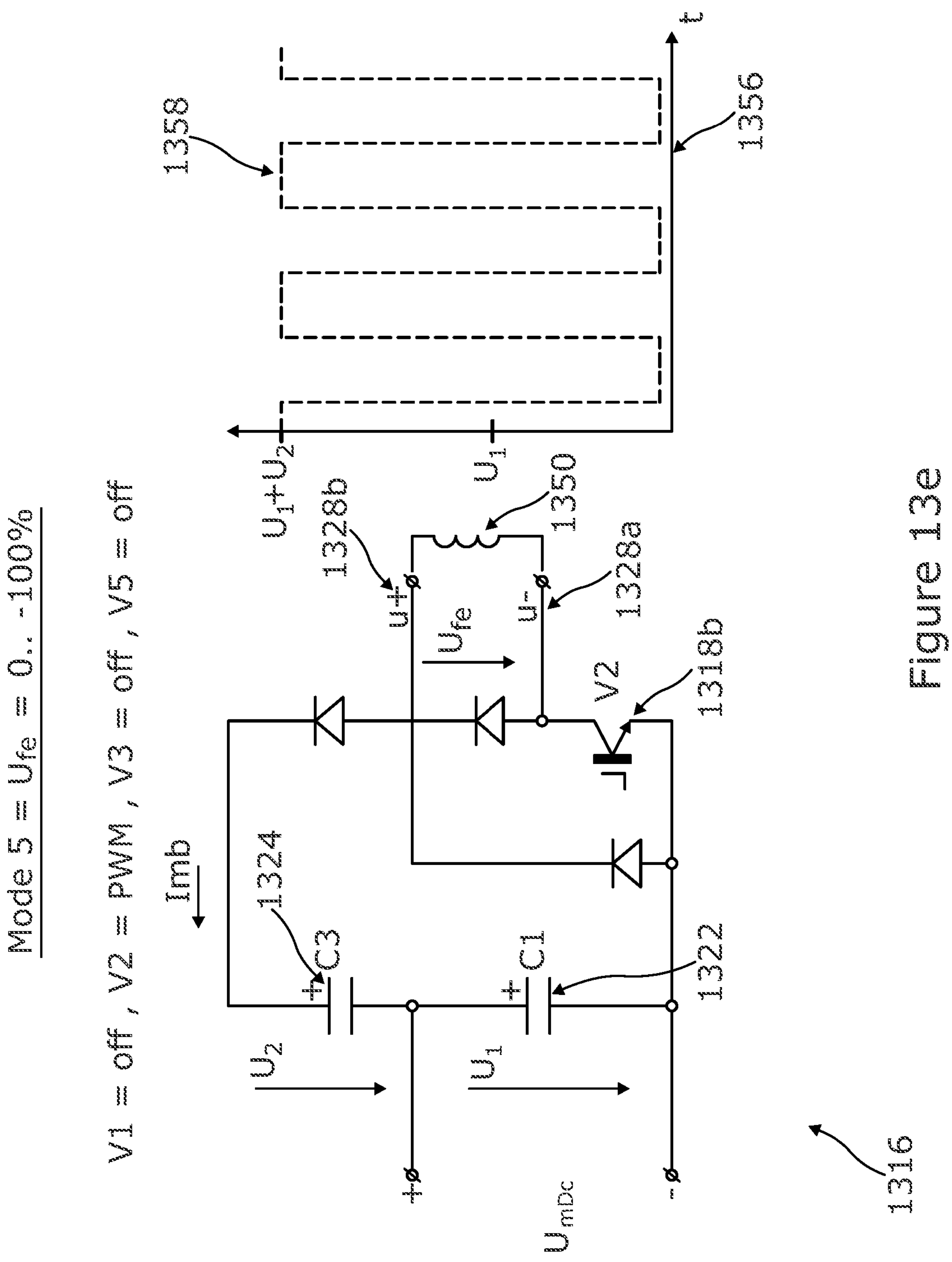
FIG. 13*e* shows the exciter circuit of FIG. 12 in a fifth mode of operation.

FIG. 13*e* shows part of the control circuitry 1316 in a fifth, rapid deexcitation, mode of operation—one that also provides a negative output voltage, so long as positive current flows to the inductive load 1350. The output voltage range is from zero to a negative voltage determined by the capacitor 1322 and the at least one charge storage device 1324. If the voltage across the capacitor 1322 or the at least one charge storage device 1324 reaches the allowed maximum voltage, transistor V4 (compare with the transistor with reference sign 1218*d* in FIG. 12) or transistor V6 (compare with the transistor with reference sign 1218*f* in FIG. 12) is switched on to provide an additional path for current flow (e.g., over a resistor connected in parallel to the capacitor 1322 or in parallel to the at least one charge storage device 1324). Thus, switching transistor V4 or transistor V6 on facilitates reducing the voltage across the capacitor 1322 or the at least one charge storage device 1324, respectively.

The operation of the one or more transistors 1318*a-e* in the fifth mode of operation is as follows: V1 (not shown) is switched off; V2 (i.e., the transistor with reference sign 1318*b*) is used for PWM that determines the output voltage; V3 (not shown) is switched on; V5 (not shown) is switched off; V4 (not shown) is switched on if the voltage across the capacitor 1322 reaches the allowed maximum voltage; V6 (not show) is switched on if the voltage across the at least one charge storage device 1324 reaches the allowed maximum voltage.

The expected output voltage over time at the DC output terminals 1328*a-b* during the fourth mode of operation is shown by the red or solid trace 1356 representing a steady-state output voltage (at the DC output terminal indicated with reference sign 1328*b*), and by the green or dashed trace 1358 represented a pulse width modulated output voltage (at the DC output terminal indicated with reference sign 1328*a*).

Transistors V4 and V6 (compare with the transistors with reference sign 1218*d* and 1218*f* in FIG. 12) may be termed, or otherwise function as, 'chopper' transistors. In at least one example, the control circuitry may comprise a seventh transistor (compare with the IGBT with reference sign 518*g* in FIG. 5*a*) configured to function as a soft switch for the exciter circuit, reducing peak current on start-up.

Figure 14:
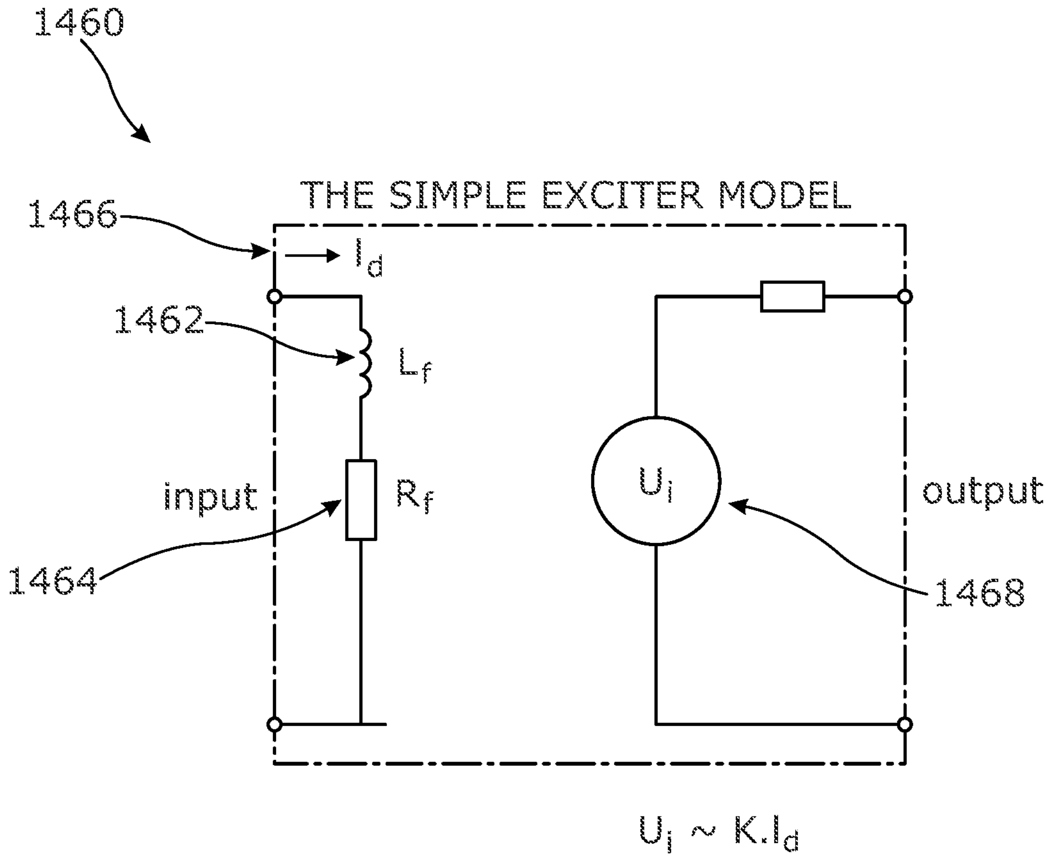
FIG. 14 shows a simple exciter model.

FIG. 14 shows a simple exciter model 1460 to support the understanding of a technical effect of one or more example exciter circuits disclosed herein. The simple exciter model 1460 comprises an inductor, $L_f$, 1462 and a resistor, $R_f$, 1464 that represent an inductivity of the field-circuit of an exciter and resistance of the field-circuit of the exciter, respectively. Exciter field current is represented by $I_d$, 1466, and exciter output voltage is represented by $U_i$, 1468. The exciter output voltage, $U_i$, 1448 is approximately proportional to the exciter field current $I_d$, 1466.

The time constant of the exciter is defined as $T_f=L_f/R_f$ and is physically associated with the exciter field winding. When a DC voltage, $U_d$, is applied to the exciter field winding, the exciter field current 1466 (and thus also the exciter output voltage 1468) changes at a rate $dI_d/dt=Ud/L_f$. An increase in the applied voltage $U_d$ therefore increases a corresponding rate of current change at the field coil of the exciter.

Accordingly, an example exciter circuit as described with reference to FIGS. 4, 7, 12, 13 and 17 may provide for a temporary increase in applied voltage $U_d$, with a corresponding shortening (or improvement) of the exciter response. For example, the temporary increase may follow (or be realised by) the control circuitry being configured to supply at least a portion of energy stored by the at least one charge storage device when the operating state of the generator indicated by the first signal does not satisfy the required value indicated by the second signal, which increases a voltage across, and a corresponding rate of current change at, the field coil of the exciter. The first and second signals may be voltage signals.

Further understanding of this technical effect may be found in "IEEE Recommended Practice for Excitation System Models for Power System Stability Studies," in IEEE Std 421.5-2016 (Revision of IEEE Std 421.5-2005), pp. 1-207, 26 Aug. 2016. In particular, the discussion of excitation system model type AC5A and automatic voltage regulator model AC7.

Figure 15:
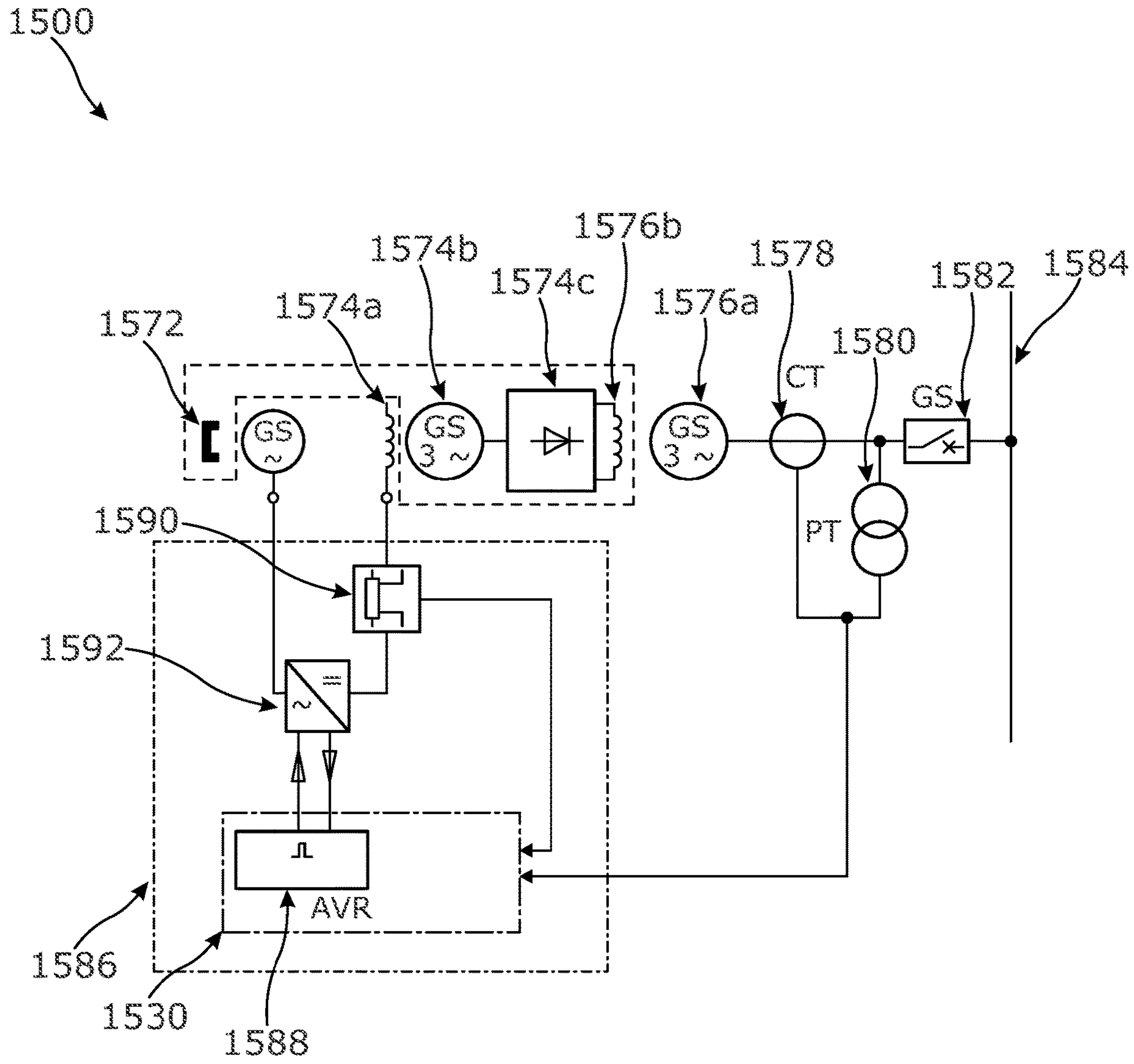
FIG. 15 shows an example arrangement of a synchronous generator system with a brushless excitation system.

FIG. 15 shows an example arrangement of a synchronous generator system 1500 with a brushless excitation system. The synchronous generator system 1500 comprises a permanent magnet generator (PMG) 1572, a brushless exciter comprising an exciter field winding (stator) 1574*a*, an exciter armature winding (rotor) 1574*b* and a rotating rectifier 1574*c*, a synchronous generator comprising a synchronous generator armature 1576*a* and a synchronous generator field winding 1576*b*, current and voltage sensing transformers 1578, 1580 (situated, in this example in the generator power outlet), and a generator switch 1582. In this example, the synchronous generator system 1500 is connected to a grid 1584 via the generator switch 1582.

The synchronous generator system 1500 further comprises an excitation circuit, which may also be termed an exciter circuit, 1586 which is typically powered by the permanent magnet generator 1572. The excitation circuit comprises an automatic voltage regulator 1530 with pulse power converter control 1588, a shunt 1590 and a power converter 1592.

The automatic voltage regulator 1530 is configured to receive (via the current and voltage sensing transformers 1578, 1580) signals indicative of electrical generator quantities, and (via the shunt 1590) signals indicative of the exciter field current. Based on the received signals, the automatic voltage regulator 1530 controls the power converter 1592 to maintain an adequate voltage on the generator field winding.

The synchronous generator system 1500 shown in FIG. 15 may have widespread application. The excitation system may be provided as a rotating exciter (e.g., as a brushless exciter, as described above), a system with a DC exciter or a system with an AC exciter and stationary diode rectifier.

In excitation systems comprising a rotating exciter, the rotating exciter is situated between the power converter 1592 and the synchronous generator field winding 1576*b* and has a non-negligible time constant (as defined with reference to the simple exciter model shown in FIG. 14). Consequently, the rotating exciter may contribute a significant delay to the time between a change in output voltage of the power converter 1592 and a change in the voltage on the synchronous generator field winding 1576*b*.

When the generator switch 1582 is in an 'on' position, for generator stability it is important that the generator field voltage corresponds to the voltage demand from a load coupled to the generator, not only in steady state operation but also during transient states caused by disturbances in electrical demand.

Figure 16A:
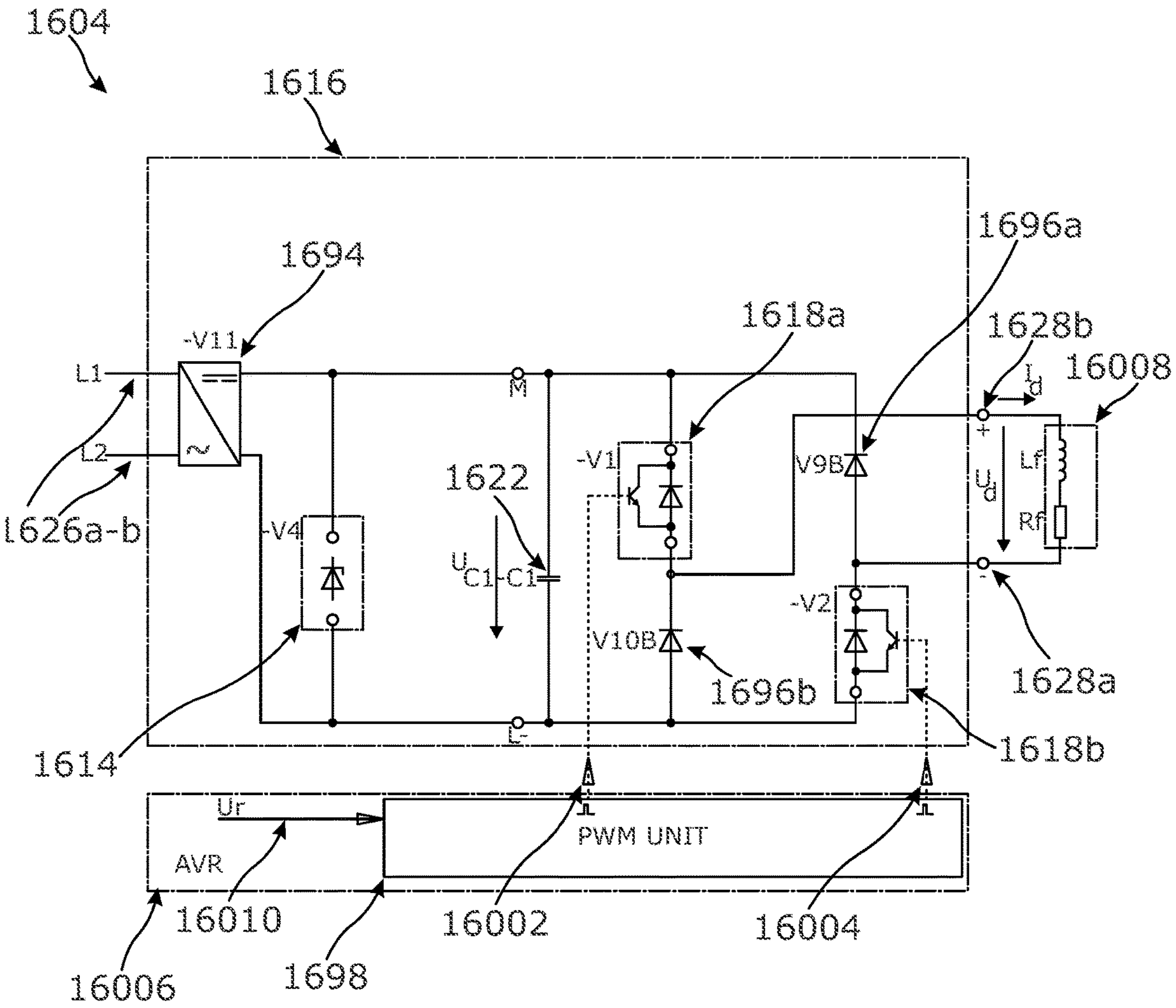
FIG. 16*a* shows in schematic form another example exciter circuit.

FIG. 16*a* shows in schematic form another example exciter circuit 1604. The exciter circuit 1616 is based on a two-quadrant power converter—half controlled IGBT H-bridge and comprises input terminals 1626*a-b* and, as control circuitry 1616, a rectifier 1694, a smoothing capacitor 1622, and an overvoltage protection circuit 1614. The input terminals 1626*a-b* are configured to receive a feeding voltage from, e.g., a permanent magnet generator, a transformer fed from a generator armature, an auxiliary bus, or a station battery. The feeding voltage is rectified by the rectifier 1694 and smoothed by the smoothing capacitor 1622. The overvoltage protection circuit 1614 is provided in parallel with the smoothing capacitor 1622 and is configured to protect the smoothing capacitor 1622 against an overvoltage or a voltage of reverse polarity.

The control circuitry 1616 further comprises electronic switches (IGBT transistors, MOSFET transistors) 1618*a-b* and diodes 1696*a-b* that determine the internal voltage across the smoothing capacitor 1622 by way of control signals from a pulse width modulation (PWM) unit 1698. Specifically, the PWM unit 1698 is configured to control the internal voltage through control signals to the electronic switches 1618*a-b* carried over PWM unit outputs 16002, 16004.

The exciter circuit 1604 further comprises output terminals 1628*a-b* and an AVR 16006. In use, the voltage across the output terminals is coupled to a field winding of an exciter 16008 and is proportional to the feeding voltage and an output voltage, $U_r$, 16010 provided to the PWM unit 1698.

Figure 16B:
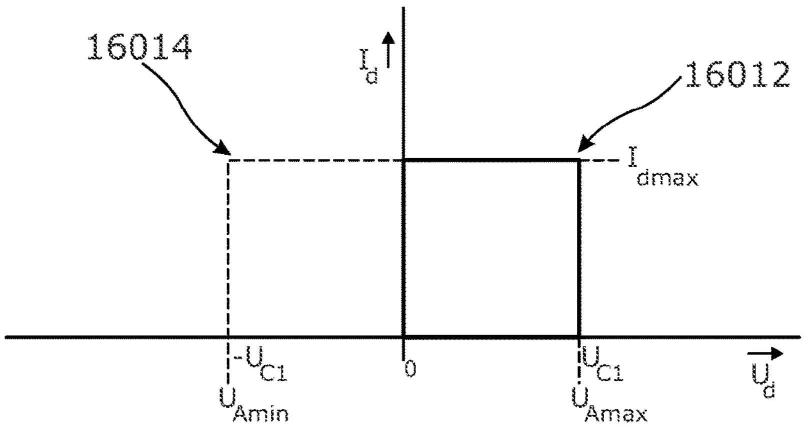
FIG. 16*b* shows load characteristics of the example exciter circuit of FIG. 16*a*.

FIG. 16*b* shows load characteristics of the example exciter circuit of FIG. 16*a*. According to these load characteristics output current is limited to one polarity only, in the range from 0 A to a value, $I_{d\ max}$, limited by the voltage across the smoothing capacitor 1622, $U_{C1}$ divided by the resistance of the exciter field winding 16008 together with any interconnection wiring.

Output voltage—i.e., the voltage across the output terminals 1628*a-b*—may have a positive polarity or a negative polarity. The maximum possible mean value of output voltage corresponds approximately to the voltage on the smoothing capacitor 1622.

The load characteristic having a positive output voltage corresponds to a mode of normal operation 16012 of the exciter circuit. The load characteristic having a negative output voltage corresponds to a mode of temporary operation 16014 of the exciter circuit, used when current through the exciter field winding is reducing, i.e., energy is removed from the exciter field winding.

Further aspects of supplying at least a portion of energy stored by the at least one charge storage device to satisfy the control demand indicated by the second signal—as described with reference to FIG. 11—will now be described, it being understood that these aspects may be realised, in their various combinations, by the example exciter circuits shown schematically in FIGS. 4, 5, 7, 12 and 13.

Figure 17A:
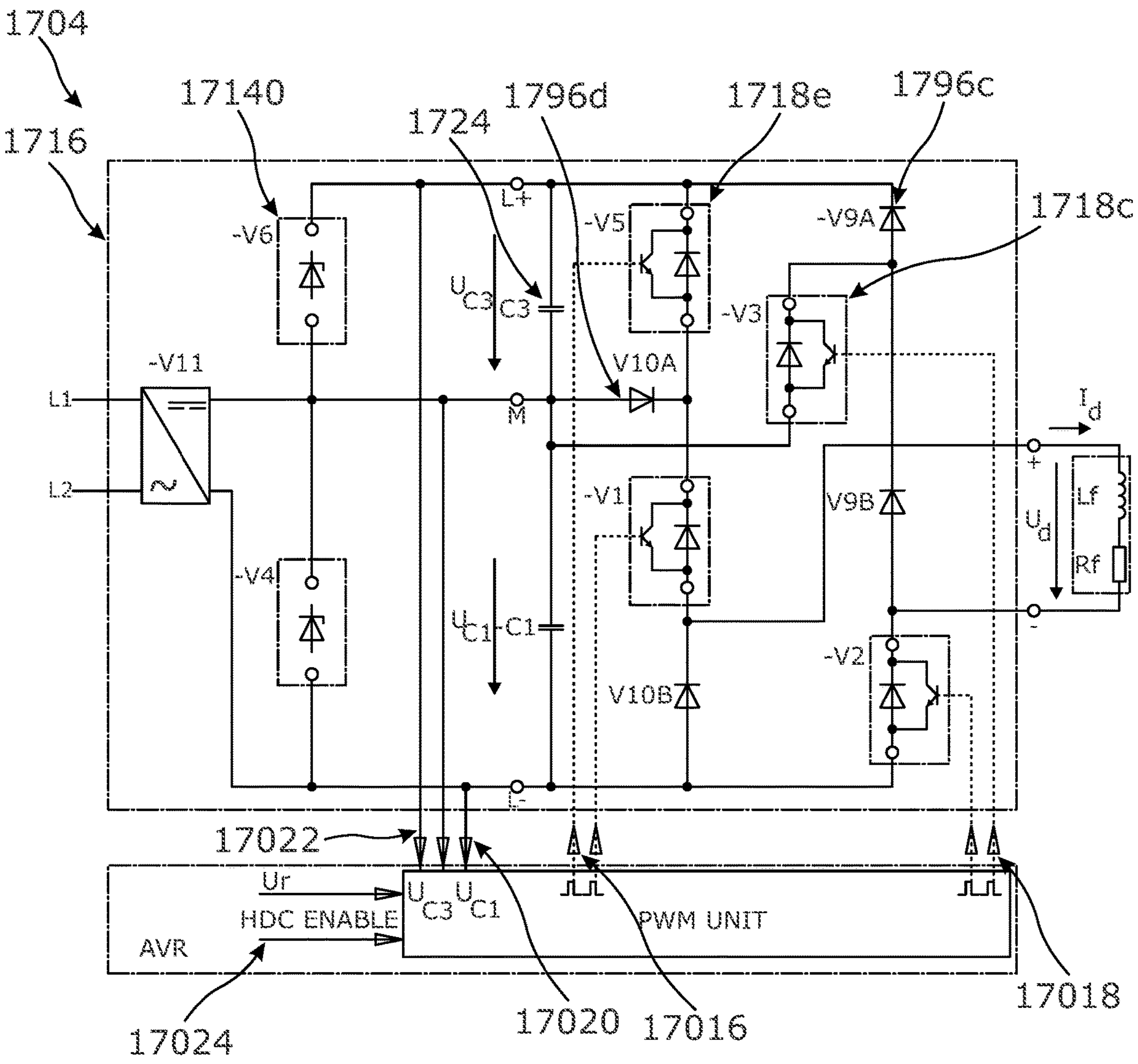
FIG. 17*a* shows in schematic form another example exciter circuit.

FIG. 17*a* shows in schematic form another example exciter circuit 1704 that corresponds to the example exciter circuits shown schematically in FIGS. 4, 5, 7, 12 and 13. Relative to the example exciter circuit shown schematically in FIG. 16, the discussion of like features is omitted for brevity.

Additional features of the control circuitry 1716 over the control circuitry shown in FIG. 16 are electronic switches 1718*c*, 1718*e*, diodes 1796*c-d*, at least one charge storage device 1724, and a diode 17140 configured to provide additional overvoltage protection to the exciter circuit.

Additional features of the PWM unit include outputs 17016, 17018 that provide control signals to the additional electronic switches 1718*c*, 1718*e*, and inputs 17020, 17022 for sensing the voltage across the smoothing capacitor and the at least one charge storage device 1724, respectively. The PWM unit is also further configured to receive a control signal, HDC ENABLE, 17024.

The control signal 17024 may be indicative of an operating state of the generator and may be used to further the control functionality of the PWM unit to provide additional (boosting) operation modes of the exciter circuit 1704. The inputs 17020, 17022 of the PWM unit are used for linearisation of control characteristics and for smooth switching between these operation modes.

The control signal 17024 can be derived from a position of a generator switch (e.g., that corresponds to the generator being connected to a grid) or from a minimum level of generator output. Alternatively, the control signal 17024 can be independent of the operating state of the generator (i.e., the control signal 17024 is always active).

Both the output voltage 16010 and the control signal 17024 are voltage signals. While the control signal 17024, enables boosting functionality of the exciter circuit 1716, any requirements of the exciter circuit 1716 on input power (as determined by the power provided by the PMG) are unchanged over the example exciter circuit shown in FIG. 16.

The output voltage 16010 may be indicative of a required value of a field voltage generated by the field coil of the exciter. The output voltage 16010 is an output of the automatic voltage regulator and may depend on required generator voltage, real generator voltage, generator output current, exciter field current gain and integral gain of the automatic voltage regulator, and may be influenced by an output of a power system stabilizer and/or activity of a limiter comprised by the automatic voltage regulator.

Figure 17B:
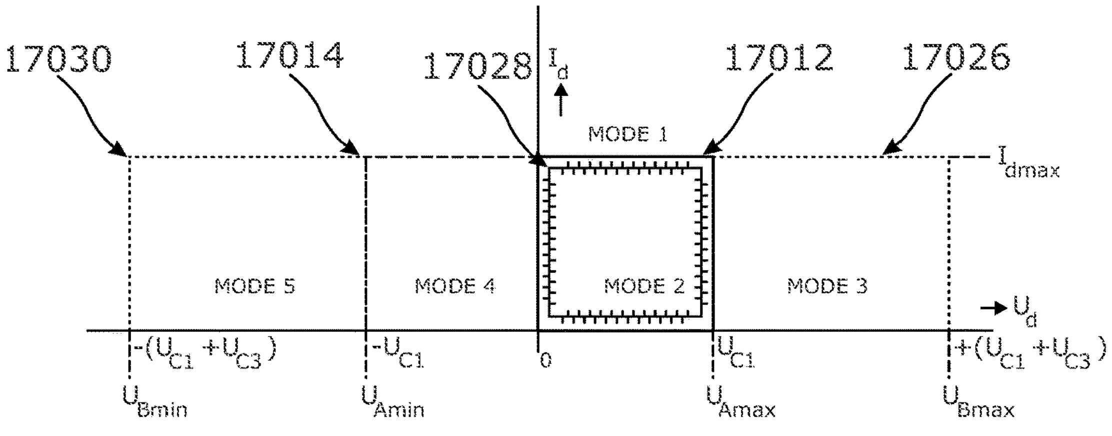
FIG. 17*b* shows load characteristics of the example exciter circuit of FIG. 17*a*.

FIG. 17*b* shows load characteristics 17012, 17014, 17026-17030 of the example exciter circuit of FIG. 17*a*. As with the load characteristics of the example exciter circuit shown in FIG. 16, output current is limited to one polarity only, in the range from 0 A to a value $I_{d\ max}$ ($I_{d\ max}$ as defined above). The output voltage may have a positive polarity or a negative polarity. Also, when the control signal 17024 is not in use (i.e., is 'off') the maximum possible mean value of output voltage corresponds approximately to the voltage on the smoothing capacitor.

In contrast with the load characteristics of the example exciter circuit shown in FIG. 16, when the control signal 17024 is in use (i.e., is 'on') the maximum possible mean value of output voltage corresponds approximately to the voltage on the smoothing capacitor and the voltage on the at least one charge storage device 1724.

In other words, the exciter circuit 1704 may operate in the following modes:

A mode (first mode) of normal operation 17012 with positive output voltage.

A mode (second mode) of charging operation 17028 that is similar to the mode of normal operation 17012 but includes simultaneous pre-charging of the at least one charge storage device 1724 to a pre-set value.

A mode (third mode) of short time operation 17026 with an increased (boosted) positive output voltage.

A mode (fourth mode) of temporary operation 17014 with negative output voltage, used when current through the exciter field winding is reducing, i.e., energy is removed from the exciter field winding.

A mode (fifth) of short time operation 17030 with a boosted (more negative) negative output voltage, used for reducing current through the exciter field winding at a faster rate than in the second mode of operation.

According to this numbering scheme, the second and third modes correspond to the third and second modes described with reference to FIGS. 7*c* and 7*b* respectively.

Thus, the third and fifth modes reflect exemplary operating states of an exciter circuit according to FIGS. 4, 5, 7, 12, 13 and 17 that follow from suppling at least a portion of energy stored by the at least one charge storage device to satisfy the control demand indicated by the second signal when the control demand indicated by the second signal exceeds a threshold capability of the synchronous machine that would otherwise exist if the at least one charge storage device was not present, and when the synchronous machine is in an appropriate operating state as derived from the first signal.

For example, where a synchronous machine comprises an exciter and a generator, the DC output may be coupled to a field coil of the exciter, the operating state (as indicated by the first signal) may reflect an operating state of the generator, and the control demand (as indicated by the second signal) may represent a required value of a field voltage generated by the exciter (that powers the generator based on the field voltage). Furthermore, the control circuitry may be configured to supply at least a portion of energy stored by the at least one charge storage device when the operating state of the generator indicated by the first signal does not satisfy the required value indicated by the second signal, to increase a voltage across, and a corresponding rate of current change at, the field coil of the exciter. Here the corresponding rate of current change may be proportional to a voltage increase on a field circuit of the exciter and inversely proportional to an inductivity of the field circuit of the exciter.

The operating state of the generator indicated by the first signal may not satisfy the required value indicated by the second signal if a measured voltage provided by the generator deviates from an expected voltage provided by the generator, wherein the expected voltage is based on a field current generated by the field coil of the exciter. The measured voltage may deviate from the expected voltage if a difference between the measured voltage and the expected voltage meets a threshold condition (e.g., the difference meets or exceeds one or more of: a threshold voltage difference; a threshold voltage difference for a threshold period; and a predetermined feature in voltage difference data). The control circuitry (e.g., an automatic voltage regulator comprised by the control circuitry) may be configured to determine the deviation.

Figure 18:
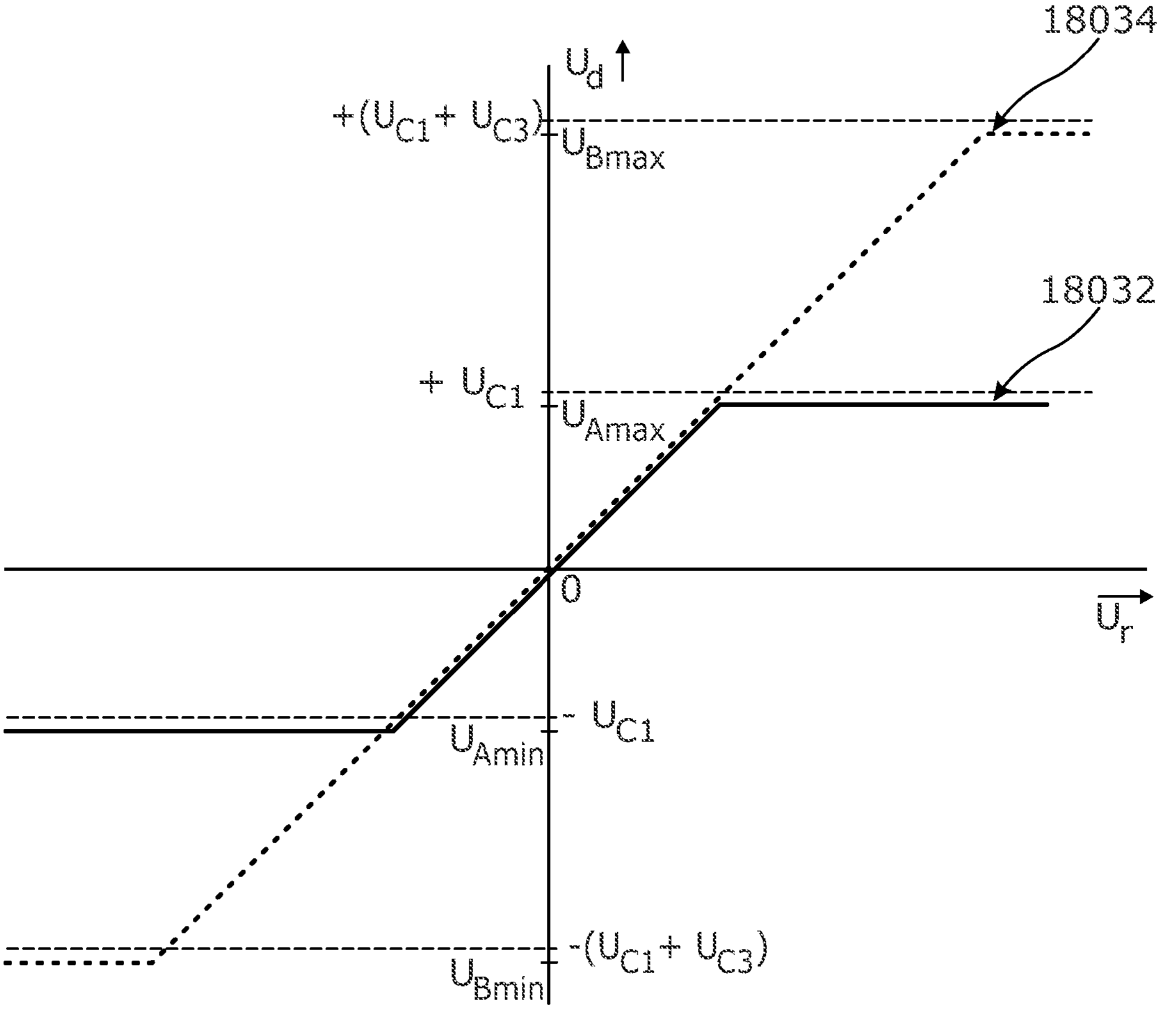
FIG. 18 shows output characteristic curves for the example exciter circuit of FIG. 17*a*.

FIG. 18 shows output characteristic curves for the example exciter circuit of FIG. 17*a*. When the control signal 17024 is 'off', the output characteristics 18032 correspond to those of the example exciter circuit shown in FIG. 16*a*. When the control signal 17024 is 'on', the second, third and fifth modes of operating the exciter circuit are available and the output characteristics 18034 are extended, thereby enabling an improvement of excitation response. The extended output characteristics remain linear through the range of output voltages, Ur, however, so that known techniques of tuning the automatic voltage regulator remain applicable.

The five modes of operation of the exciter circuit of FIG. 17*a* are discussed further with reference to the following figures. For clarity and brevity, like features from the example exciter circuit of FIG. 17*a* are either omitted or represented by an outline.

Figure 19A:
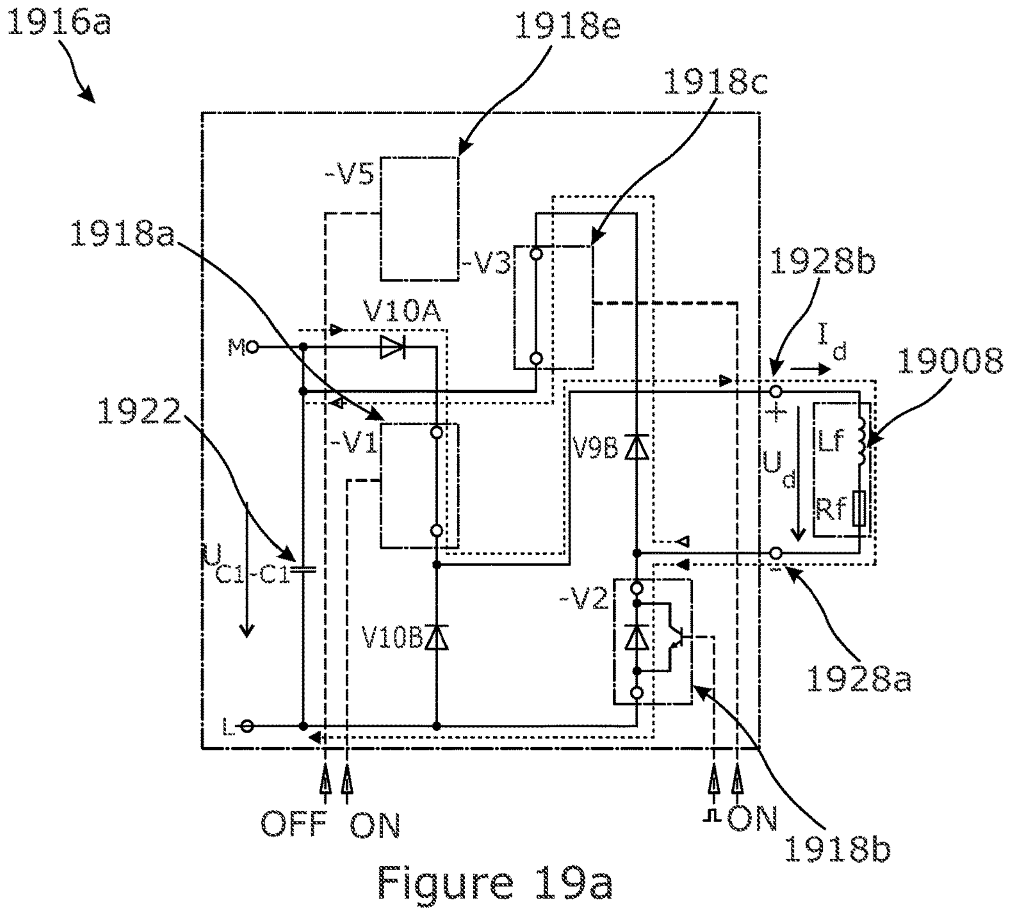
FIGS. 19*a-b* show part of the example exciter circuit of FIG. 17*a* in a first mode of operation.
Figure 19B:
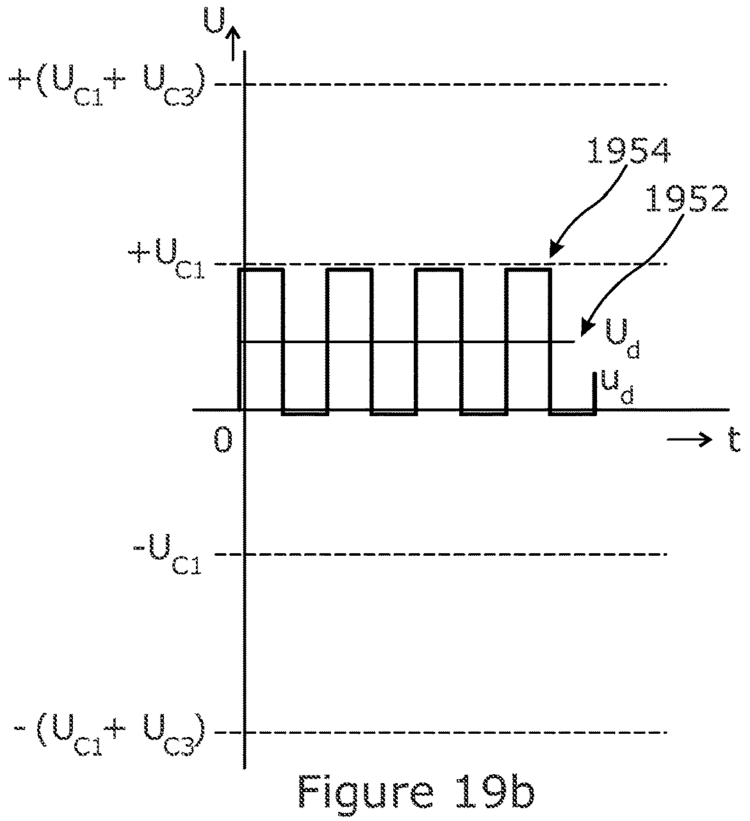

FIGS. 19*a-b* show part 1916*a* of the control circuitry of FIG. 17*a* in the first mode of operation, one that provides a positive DC output voltage, via DC output terminals 1928*a-b*, onto the exciter field winding 19008 of the main exciter.

The first mode of operation corresponds to the exciter circuit operating during steady state operation of the generator, i.e., a normal mode wherein the at least one charge storage device is electrically isolated and a positive voltage is provided at the DC output. The DC output voltage can vary between 0 and the rectified input supply voltage $U_{C1}$ (i.e., the voltage on the smoothing capacitor 1922). In this first mode, V1, V3 (i.e., the IGBTs with reference signs 1918*a* and 1918*c*) are permanently on and V5 (i.e., the IGBT with reference sign 1918*e*) is permanently off. V2 (i.e., the IGBT with reference sign 1918*b*) is driven by a pulse width modulation (PWM) signal from the PWM unit to control the DC output voltage to the exciter field winding. Current flow through the exciter circuit follows a path expressed by dotted lines: the path is designated with black arrows when V2 (i.e., the IGBT with reference sign 1918*b*) is on; with white arrows when V2 (i.e., the IGBT with reference sign 1918*b*) is off; and with black/white arrows when this path does not matter on state of V2 (i.e., the IGBT with reference sign 1918*b*).

Alternatively, in the first mode of operation, V2 (i.e., the IGBT with reference sign 1918*b*) is permanently on and V1 (i.e., the IGBT with reference sign 1918*a*) is driven by PWM modulation.

FIG. 19*b* shows the output voltage over time at the DC output terminals 1928*a-b* during the first mode of operation. The trace with reference sign 1954 represents immediate voltage values (i.e., a pulse width modulated output voltage), while the trace with reference sign 1952 represents a steady-state output voltage.

Figure 20A:
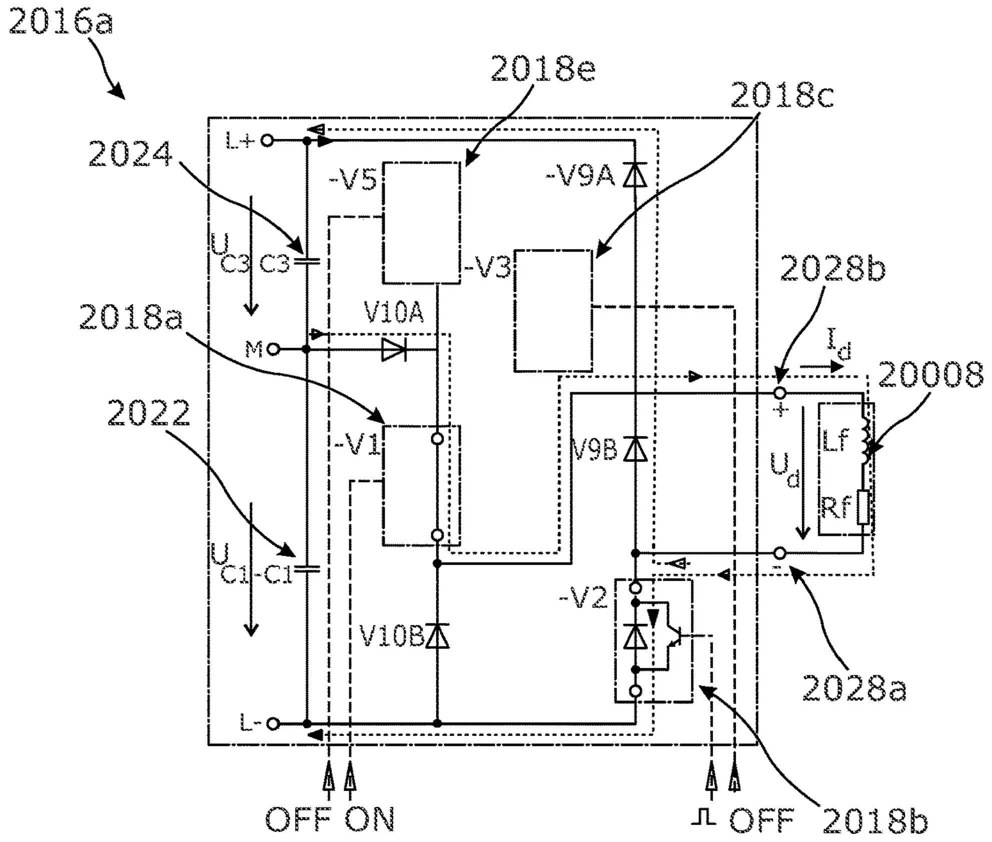
FIGS. 20*a-b* show part of the example exciter circuit of FIG. 17*a* in a second mode of operation.
Figure 20B:
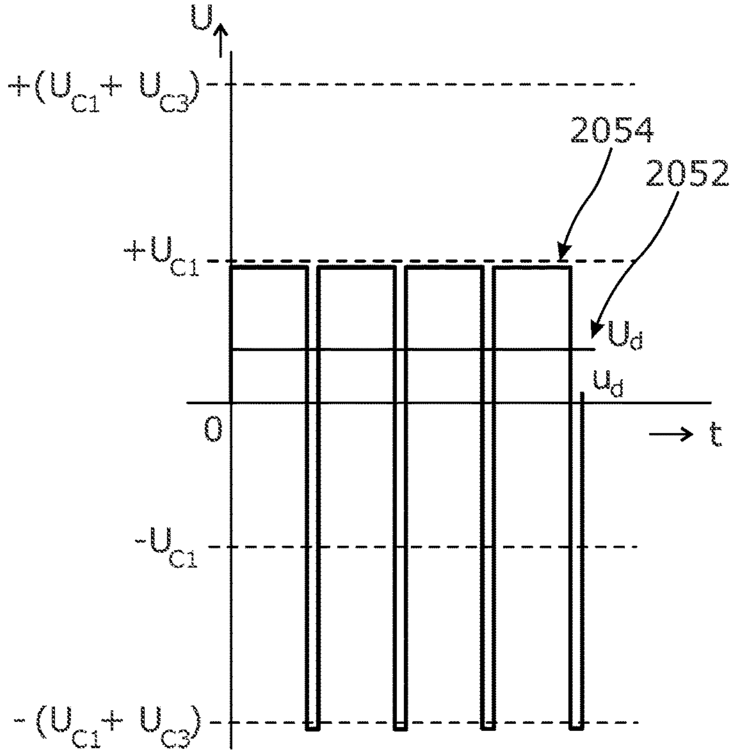

FIGS. 20*a-b* show part 2016*a* of the control circuitry of FIG. 17*a* in the second mode of operation, one that provides a positive DC output voltage, via DC output terminals 2028*a-b*, onto the exciter field winding 20008 of the main exciter. This mode provides the same voltage range to the exciter field as the first mode of operation; that is, the voltage provided can vary between 0 and the rectified input supply voltage $U_{C1}$ (i.e., the voltage on the smoothing capacitor 2022). However, the freewheeling current when V2 (i.e., the IGBT with reference sign 2018*b*) is off is switched to charge the at least one charge storage device 2024. That is, a path for decay of current though an inductive load is otherwise provided as described with reference to the control circuitry shown in FIG. 7*c*.

In this second mode, V1 (i.e., the IGBT with reference signs 2018*a*) is permanently on and V3 and V5 (i.e., the IGBTs with reference signs 2018*c* and 2018*e*) are permanently off. V2 (i.e., the IGBT with reference sign 2018*b*) is driven by a pulse width modulation (PWM) signal from the PWM unit to control the DC output voltage to the exciter field winding. Current flow through the control circuitry follows a path expressed by dotted lines: the path is designated with black arrows when V2 (i.e., the IGBT with reference sign 1918*b*) is on; with white arrows when V2 (i.e., the IGBT with reference sign 1918*b*) is off; and with black/white arrows when this path does not matter on state of V2 (i.e., the IGBT with reference sign 1918*b*).

FIG. 20*b* shows the output voltage over time at the DC output terminals 2028*a-b* during the second mode of operation. The trace with reference sign 2054 represents immediate voltage (i.e., a pulse width modulated output voltage), while the trace with reference sign 2052 represents a mean output voltage.

FIGS. 21*a-d* show part 2116*a* of the control circuitry of FIG. 17*a* in the third mode of operation, one that provides a positive boosted DC voltage, via DC output terminals 2128*a-b*, onto the exciter field winding 21008 of the main exciter (i.e., at least a portion of energy stored by the at least one charge storage device is supplied to the DC output to provide a larger positive voltage at the DC output). In this mode, the at least one charge storage device 2124 is switched by the control circuitry to supply energy to the DC output to provide a larger positive voltage than is possible in the first mode of operation (i.e., a higher DC voltage ceiling is achieved, even after taking the smoothing capacitor 2122 into consideration). The voltage provided to the DC output terminals 2128*a-b* can vary between zero voltage and the sum of rectified input supply voltage $U_{C1}$ (i.e., the voltage on the smoothing capacitor 2122) and voltage $U_{C3}$ (i.e., the voltage on the at least one charge storage device 2124).

In the third mode, V1 and V5 (i.e., the IGBTs with reference signs 2118*a* and 2118*e*) are permanently on and V3 (i.e., the IGBT with reference sign 2118*c*) is permanently off. V2 (i.e., the IGBT with reference sign 2118*b*) is driven by a PWM signal to control the voltage to the exciter field. Current flow through the control circuitry follows a path expressed by dotted lines: the path is designated with black arrows when V2 (i.e., the IGBT with reference sign 2118*b*) is on; with white arrows when V2 (i.e., the IGBT with reference sign 2118*b*) is off; and with black/white arrows when this path does not matter on state of V2 (i.e., the IGBT with reference sign 2118*b*).

Figure 21A:
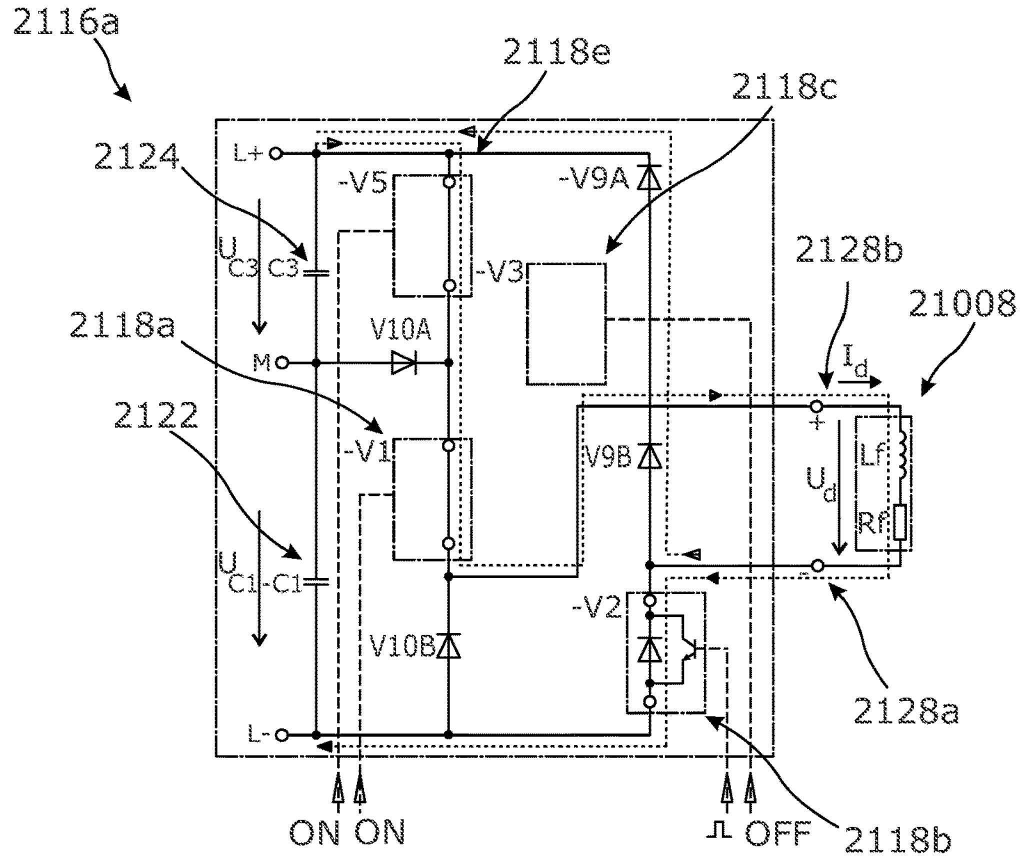
FIGS. 21*a-d* show part of the example exciter circuit of FIG. 17*a* in a third mode of operation.
Figure 21B:
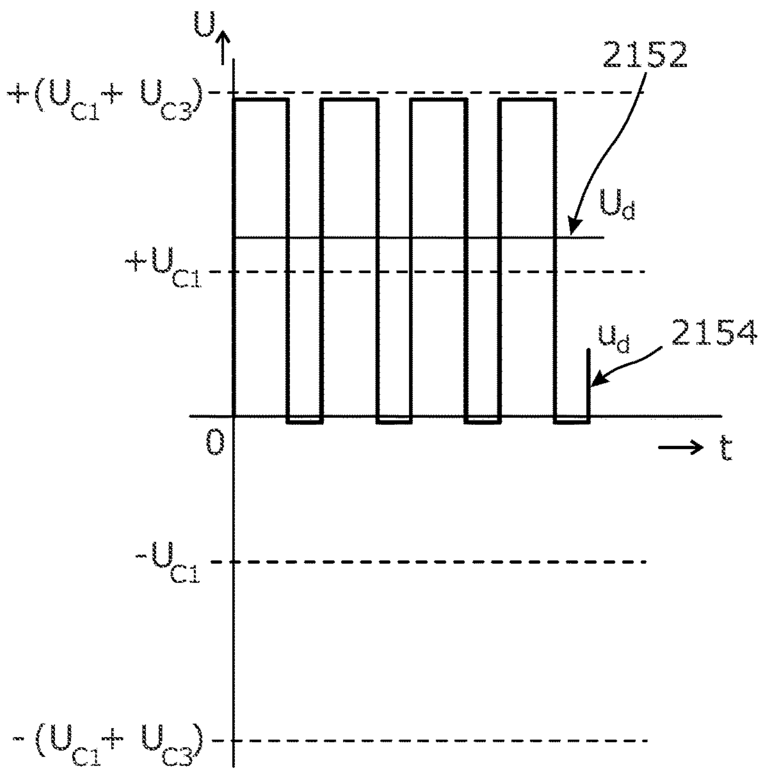

FIG. 21*b* shows the output voltage over time at the DC output terminals 2128*a-b* during the third mode of operation. The trace with reference sign 2154 represents immediate voltage (i.e., a pulse width modulated output voltage), while the trace with reference sign 2152 represents a mean output voltage.

Figure 21C:
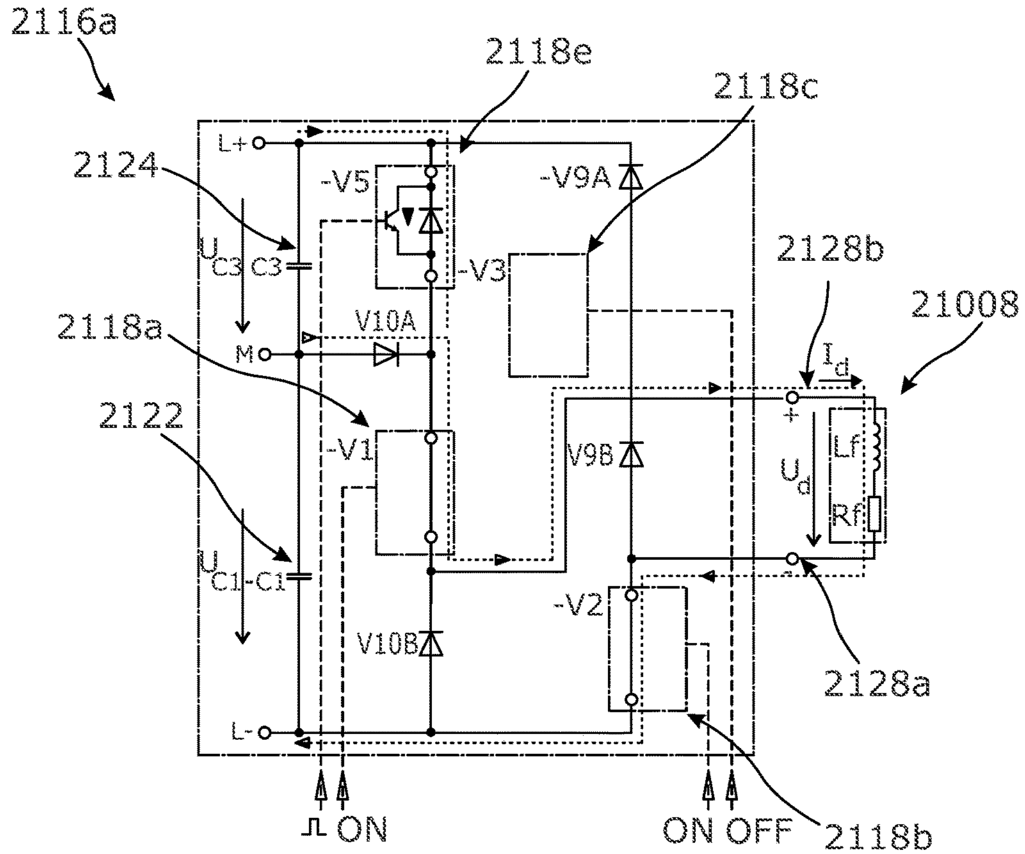
Figure 21D:
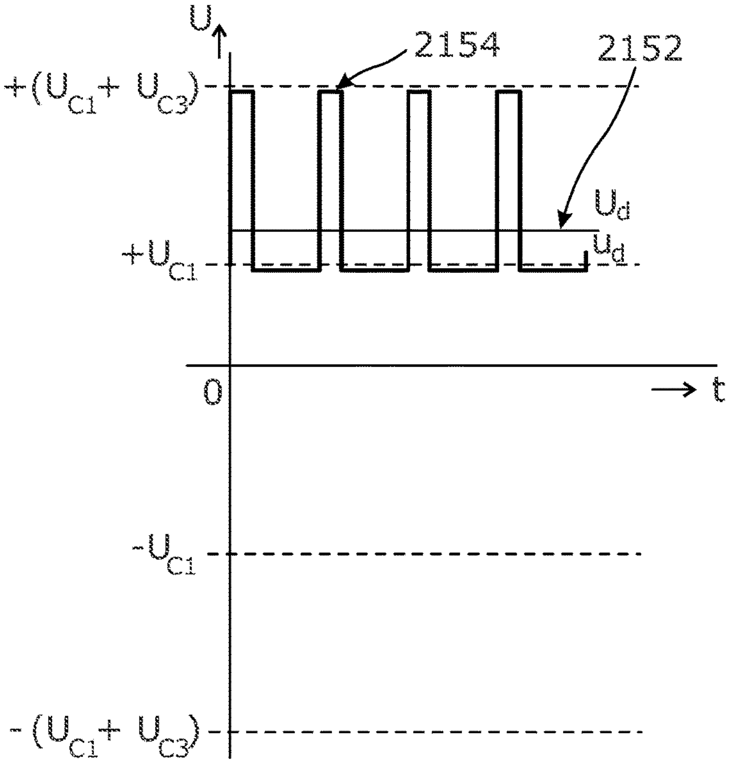

FIGS. 21*c-d* show part 2116*a* of the control circuitry of FIG. 17*a* in an alternative configuration for the third mode of operation, one that reduces ripple in the immediate (i.e., the pulse width modulated output voltage) voltage.

The alternative configuration for the third mode of operation is realised as follows. V1 and V2 (i.e., the IGBTs with reference signs 2118*a* and 2118*b*) are permanently on and V3 (i.e., the IGBT with reference sign 2118*c*) is permanently off. V5 (i.e., the IGBT with reference sign 2118*e*) is driven by a PWM signal to control the voltage to the exciter field. Current flow through the control circuitry follows a path expressed by dotted lines: the path is designated with black arrows when V5 (i.e., the IGBT with reference sign 2118*e*) is on; with white arrows when V5 (i.e., the IGBT with reference sign 2118*e*) is off; and with black/white arrows when this path does not matter on state of V5 (i.e., the IGBT with reference sign 2118*e*).

As for the output voltage over time shown in FIG. 21*b*, the trace—see FIG. 21*d*—with reference sign 2154 represents immediate voltage values (i.e., a pulse width modulated output voltage), while the trace with reference sign 2152 represents a mean value of output voltage. A comparison of output voltages shown in FIGS. 21*b* and 21*d* evidences the reduced ripple achieved by the alternative configuration.

Figure 22A:
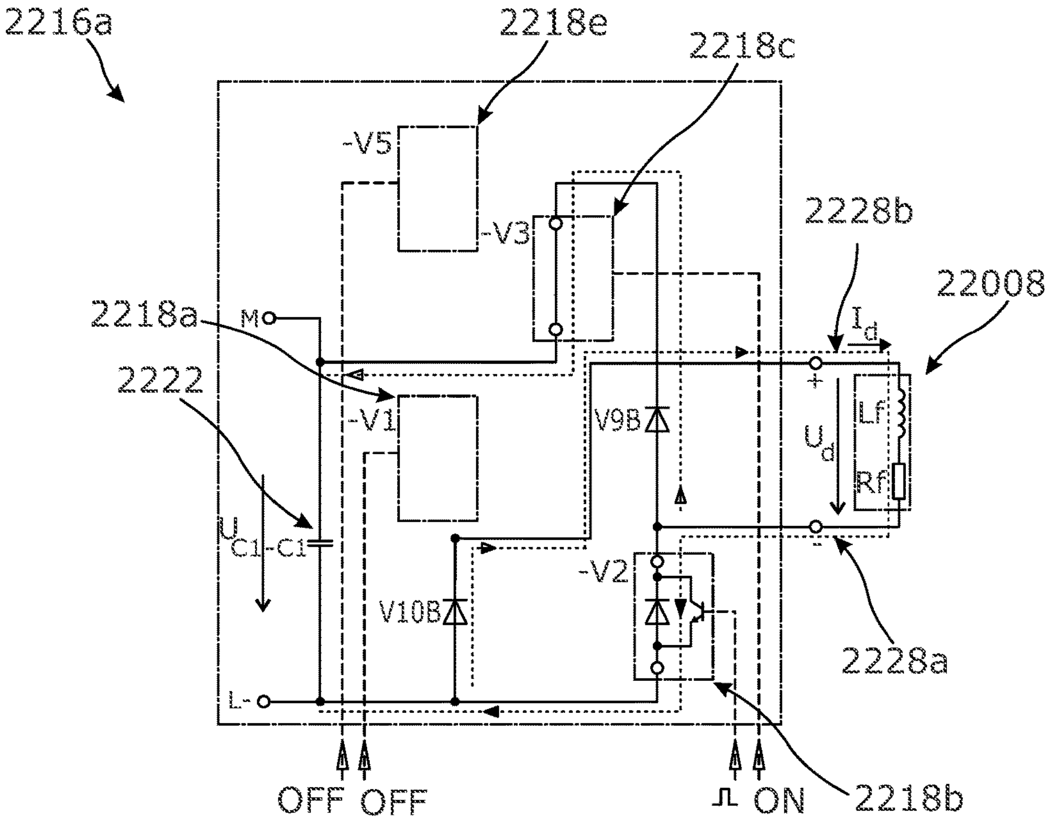
FIGS. 22*a-b* show part of the example exciter circuit of FIG. 17*a* in a fourth mode of operation.
Figure 22B:
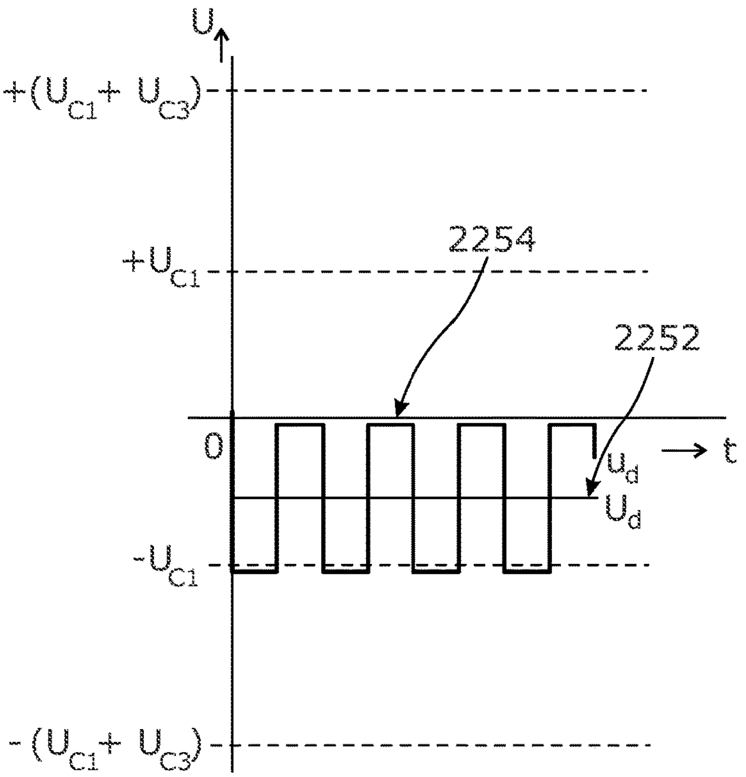

FIGS. 22*a-b* show part 2216*a* of the control circuitry of FIG. 17*a* in the fourth mode of operation, one that provides a negative DC voltage, via DC output terminals 2228*a-b*, onto the exciter field winding 22008 of the main exciter (i.e., wherein the at least one charge storage device is electrically isolated and a negative voltage is provided at the DC output). The output voltage provided can vary between 0 and the rectified negative input supply voltage $U_{C1}$ (i.e., the voltage on the smoothing capacitor 2022). In this mode the smoothing capacitor 2222 is charging via the path designated by dotted line with white arrow.

In this fourth mode, V3 (i.e., the IGBT with reference signs 2218*c*) is permanently on and V1 and V5 (i.e., the IGBTs with reference signs 2218*a* and 2218*e*) are permanently off. V2 (i.e., the IGBT with reference sign 2218*b*) is driven by a pulse width modulation (PWM) signal from the PWM unit to control the DC output voltage to the exciter field winding. Current flow through the control circuitry follows a path expressed by dotted lines: the path is designated with black arrows when V2 (i.e., the IGBT with reference sign 2218*b*) is on; with white arrows when V2 (i.e., the IGBT with reference sign 2218*b*) is off; and with black/white arrows when this path does not matter on state of V2 (i.e., the IGBT with reference sign 2218*b*).

FIG. 22*b* shows the output voltage over time at the DC output terminals 2228*a-b* during the fourth mode of operation. The trace with reference sign 2254 represents immediate voltage (i.e., a pulse width modulated output voltage), while the trace with reference sign 2252 represents a mean output voltage.

FIGS. 23*a-d* show part 2316*a* of the control circuitry of FIG. 17*a* in the fifth mode of operation, one that provides a negative boosted DC voltage, via DC output terminals 2328*a-b*, onto the exciter field winding 23008 of the main exciter (i.e., at least a portion of energy stored by the at least one charge storage device is supplied to the DC output to provide a larger negative voltage at the DC output). In this mode, the at least one charge storage device 2324 is switched by the control circuitry to the DC output to provide a larger negative voltage than is possible in the fourth mode of operation (i.e., even after taking the smoothing capacitor 2322 into consideration). The voltage provided to the DC output terminals 2328*a-b* can vary between zero volts and the sum of rectified input supply voltage $U_{C1}$ (i.e., voltage on the smoothing capacitor 2322) and voltage $U_{C3}$ (i.e., voltage on the at least one charge storage device 2324). The smoothing capacitor 2322 and the at least one charge storage device 2324 are charged via the path designated by a dotted line with white arrows.

In the fifth mode, V1, V3 and V5 (i.e., the IGBTs with reference signs 2318*a*, 2318*c* and 2318*e*) are permanently off. V2 (i.e., the IGBT with reference signs 2318*b*) is driven by a PWM signal to control the voltage to the exciter field. Current flow through the control circuitry follows a path expressed by dotted lines: the path is designated with black arrows when V2 (i.e., the IGBT with reference sign 2318*b*) is on; with white arrows when V2 (i.e., the IGBT with reference sign c) is off; and with black/white arrows when this path does not matter on state of V2 (i.e., the IGBT with reference sign 2318*b*)

Figure 23A:
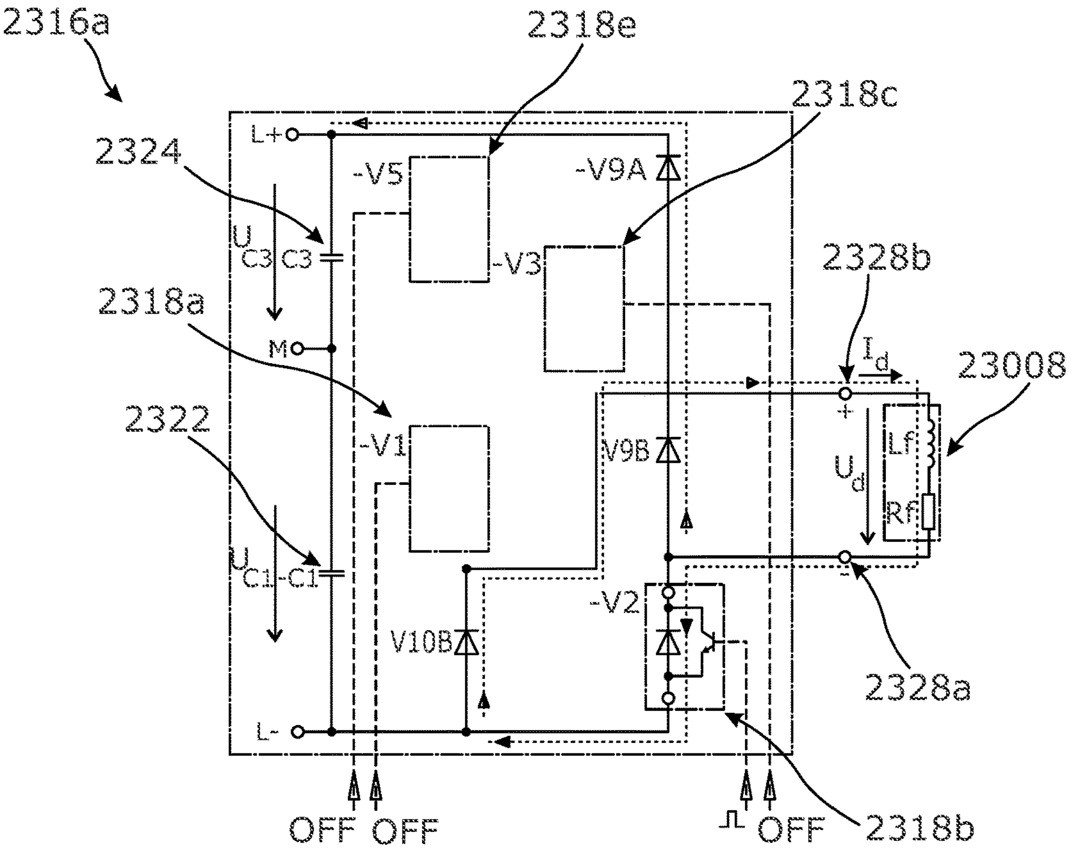
FIGS. 23*a-d* show part of the example exciter circuit of FIG. 176*a* in a fifth mode of operation.
Figure 23B:
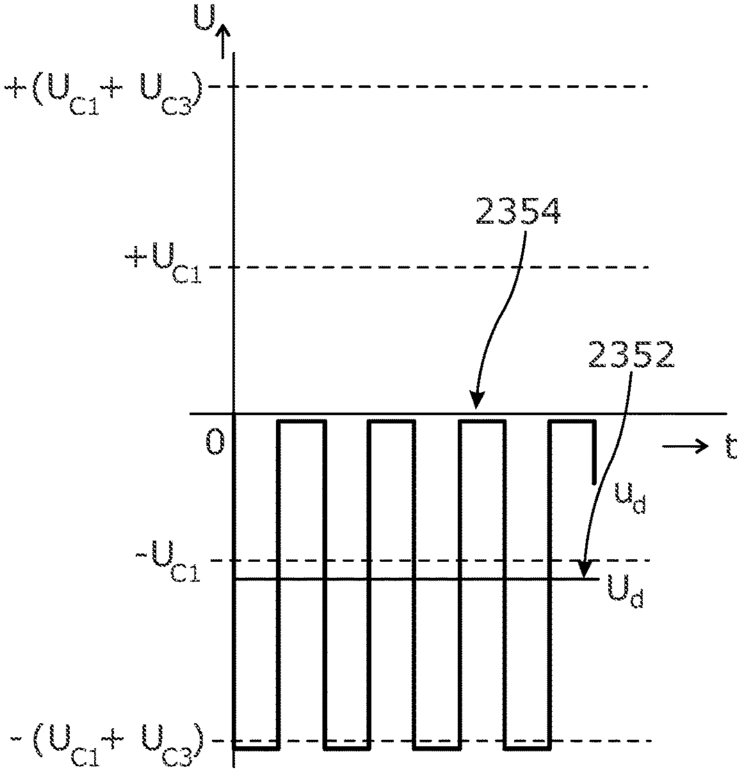

FIG. 23*b* shows the output voltage over time at the DC output terminals 2228*a-b* during the fifth mode of operation. The trace with reference sign 2354 represents immediate voltage (i.e., a pulse width modulated output voltage), while the trace with reference sign 2352 represents a mean output voltage.

Figure 23C:
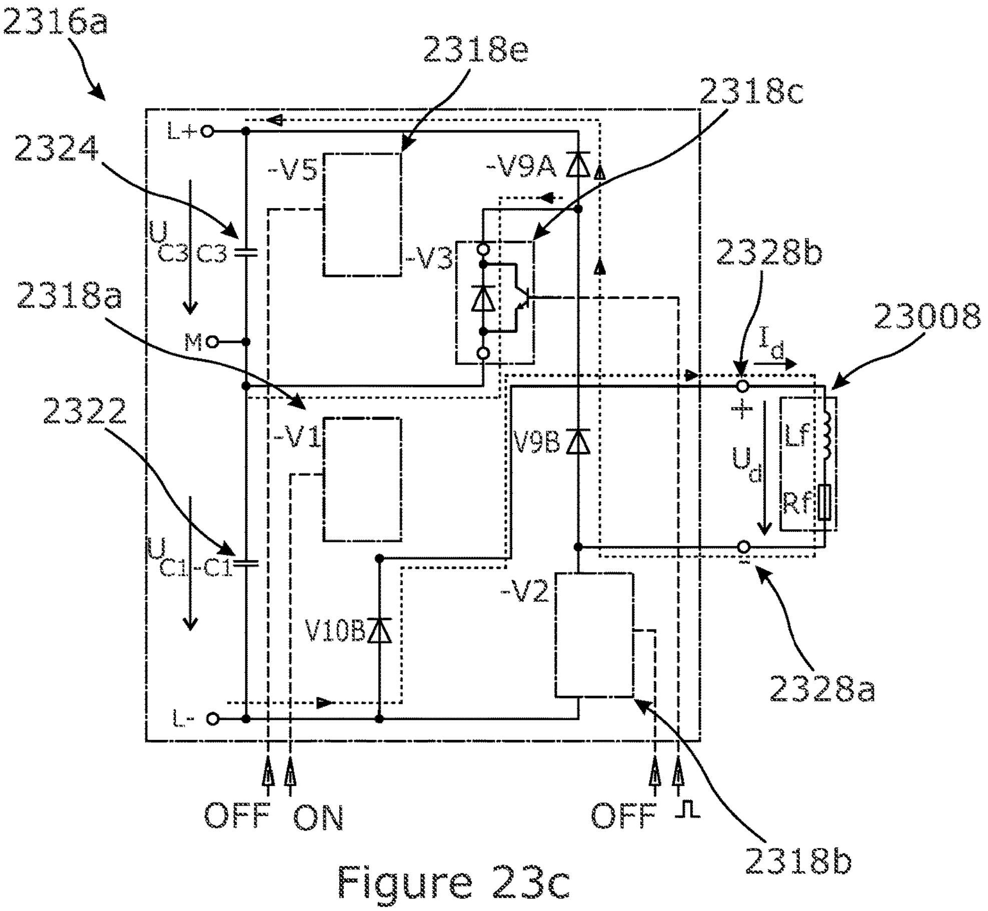
Figure 23D:
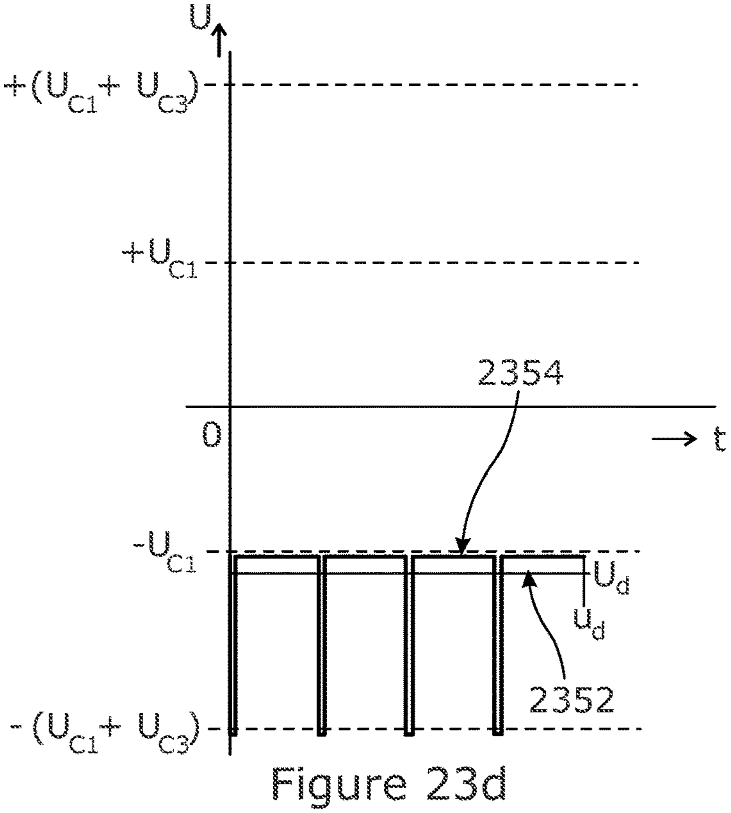

FIGS. 23*c-d* show part 2316*a* of the control circuitry of FIG. 17*a* in an alternative configuration for the fifth mode of operation, one that reduces ripple in the immediate (i.e., the pulse width modulated output voltage) voltage.

The alternative configuration for the fifth mode of operation is realised as follows. V1, V2 and V5 (i.e., the IGBTs with reference signs 2318*a*, 2318*b* and 2318*e*) are permanently off. V3 (i.e., the IGBT with reference signs 2318*c*) is driven by a PWM signal to control the voltage to the exciter field. Current flow through the control circuitry follows a path expressed by dotted lines: the path is designated with black arrows when V3 (i.e., the IGBT with reference sign 2318*c*) is on; with white arrows when V3 (i.e., the IGBT with reference sign 2318*c*) is off; and with black/white arrows when this path does not matter on state of V3 (i.e., the IGBT with reference sign 2318*c*).

As for the output voltage over time shown in FIG. 23*b*, the trace—see FIG. 23*d*—with reference sign 2354 represents immediate voltage values (i.e., a pulse width modulated output voltage), while the trace with reference sign 2352 represents a mean value of output voltage. A comparison of output voltages shown in FIGS. 23*b* and 23*d* evidences the reduced ripple achieved by the alternative configuration.

One or more IGBTs may be replaced by an alternative transistor or electronic switch to achieve the same functionality in each mode of operation. Alternative exciter circuit designs (in particular, the layout and choice of supplementary components comprised by the control circuitry) may also be used to achieve the same overall purpose, namely, to supply energy from the at least one charge storage device according to the rules and conditions described herein.

The response characteristics of an exciter comprising the exciter circuit of FIG. 16*a* or FIG. 17*a* mirror those shown in FIG. 9 (that shows measured responses of the exciter circuits of FIGS. 3 and 5). Accordingly, the exciter circuit of FIG. 17*a* also provides for a voltage 'boost' compared to the exciter circuit of FIG. 16*a* and by this a faster rise and fall time of exciter field current that determines the generator field voltage.

Advantages of the example exciter circuits according to FIGS. 4, 5, 7, 12, 13 and 17 may include one or more of:

1) Suitability for excitation systems with rotating exciters, because in these systems a rotating exciter is situated between a power converter and a generator field winding and has a significant (i.e., relatively long) time constant. The rotating exciter delays regulation in comparison with static excitation systems where a power converter is directly coupled into a generator field winding. Systems with rotating exciters commonly use a brushless excitation system. By enabling a reduction of the influence of rotating exciter time constant, the excitation system response is consequently improved.
2) In comparison with a conventional power converter, a higher positive and negative DC output voltage can be provided to achieve a higher generator ceiling voltage (positive or negative) in a relatively short (sub-second, typically 10 ms to 100 ms) time while relying on the same power supply (a PMG). Consequently:
   - Using a HDC power converter, a generator of a synchronous machine can be still equipped with the same standard PMG and yet provide a better excitation response.
   - A HDC power converter can be also used to improve the response of an existing synchronous machine without the need for specific modifications (the synchronous machine itself does not need to be modified).
3) The energy required for an exciter response improvement is stored inside the at least one charge storage device and is therefore limited. Any potential damage to a synchronous machine in the unlikely case of a HDC power converter failure is, therefore, also limited.
4) Where PWM modulation is used, standard ways of AVR tuning remain applicable because the use of PWM modulation allows for control of the output voltage of a HDC power converter to be linearly dependent on the AVR output signal ($U_r$) over its whole range.

Furthermore:

- The level of power converter output current is limited by the automatic voltage regulator (AVR) to $I_{Max}<U_{C1}/R_f$, where $U_{C1}$ is the voltage on the smoothing capacitor fed by the rectified PMG output voltage and $R_f$ is the resistance of the exciter field winding including interconnection wiring. Under this condition the energy stored in the at least one charge storage device is used only for a relatively short (sub-second) time, providing a boosting voltage to reduce the time constant of a rotating exciter.
- For pre-charging of the at least one charge storage device no additional power supply is used, rather pre-charging is performed by a function of the power converter itself by means of its inductive load (exciter field winding). Even with a PMG having a significant internal reactance, the level of voltage is maintained by means of a pulse width modulation (PWM) unit control. This voltage level is set by a programmable parameter.
- To increase the positive output voltage above the value available from feeding by the PMG itself, energy from the at least one charge storage device can be added in a controlled way using PWM modulation. To decrease the negative output voltage below the value available from feeding by the PMG itself, energy can be moved in a controlled way from the load into the at least one charge storage device using PWM modulation.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description, it will be evident to a person skilled in the art that various modifications may be made within the scope of the disclosure.

The invention claimed is:

1. An exciter circuit for a synchronous machine, the exciter circuit comprising:

at least one charge storage device configured to supply energy to a DC output of the exciter circuit that is coupled to the synchronous machine; and control circuitry configured to:

receive a first signal indicative of an operating state of the synchronous machine, receive a second signal indicative of an electrical demand for the synchronous machine, and supply at least a portion of energy stored by the at least one charge storage device for excitation of the synchronous machine to satisfy the electrical demand indicated by the second signal when:

the electrical demand indicated by the second signal exceeds a threshold capability of the synchronous machine that would otherwise exist if the at least one charge storage device was not present, and the synchronous machine is in an appropriate operating state that enables the use of the at least one storage device to supply the at least a portion of the energy stored by the at least one storage device as derived from the first signal;

wherein the first signal is indicative of a measured parameter of the operating state of the synchronous machine, the measured parameter comprising at least one of a voltage output, current output and power output of the synchronous machine, and one or more of a voltage demand, current demand, power demand, inductance demand and power factor from a load connected to the synchronous machine; and wherein the second signal is indicative of a parameter requirement of the electrical demand for the synchronous machine, the parameter requirement comprising at least one of a field voltage and/or a field current of an exciter of the synchronous machine, an input, output and/or one or more internal values of an automatic voltage regulator configured to control the synchronous machine, a voltage and/or current provided by a generator of the synchronous machine, a real or complex inductance demand of the synchronous machine, and a power factor from a load connected to the synchronous machine.

2. The exciter circuit of claim 1, further comprising rectifier circuitry configured to convert an AC input to the DC output.

3. The exciter circuit of claim 1, wherein the control circuitry is configured to:

initiate charging of the at least one charge storage device by the DC output when the electrical demand indicated by the second signal is associated with a removal of energy from the synchronous machine.

4. The exciter circuit of claim 3, wherein the control circuitry is configured to:

receive a third signal indicative of an amount of charge stored by the at least one charge storage device; and initiate charging of the at least one charge storage device by the AC input when the amount of stored charge indicated by the third signal is below a predefined threshold and the operating state indicated by the first signal satisfies the control electrical demand indicated by the second signal.

5. The exciter circuit of claim 1, wherein the first signal is indicative of a measured parameter of the operating state of the synchronous machine, wherein the control circuitry is configured to supply at least a portion of energy stored by the at least one charge storage device when the operating state indicated by the first signal does not satisfy the electrical demand indicated by the second signal by a predefined amount.

6. The exciter circuit of claim 5, wherein the predefined amount is an absolute or relative amount.

7. The exciter circuit of claim 1, wherein the first signal is indicative of a measured parameter of the operating state of the synchronous machine, wherein the control circuitry is configured to supply at least a portion of energy stored by the at least one charge storage device when the operating state indicated by the first signal does not satisfy the electrical demand indicated by the second signal for a predefined period of time.

8. The exciter circuit of claim 1, wherein the control circuitry is configured to electrically isolate the at least one charge storage device from the DC output to provide a pre-defined voltage ceiling at the DC output when the operating state indicated by the first signal satisfies the electrical demand indicated by the second signal.

9. The exciter circuit of claim 1, wherein the DC output is a positive or negative voltage.

10. The exciter circuit of claim 2, wherein the AC input is a three-phase signal or a single-phase signal.

11. The exciter circuit of claim 1, wherein the threshold capacity is based on an output voltage of an automatic voltage regulator configured to control the synchronous machine, wherein the automatic voltage regulator comprises a smoothing capacitor and the threshold capacity is limited by a voltage on the smoothing capacitor.

12. A method of using the exciter circuit of claim 1, the method comprising:

receiving a first signal indicative of an operating state of the synchronous machine;

receiving a second signal indicative of an electrical demand for the synchronous machine; and supplying at least a portion of energy stored by the at least one charge storage device to satisfy the electrical demand indicated by the second signal when:

the electrical demand indicated by the second signal exceeds a threshold capability of the synchronous machine that would otherwise exist if the at least one charge storage device was not present, and the synchronous machine is in an appropriate operating state that enables the use of the at least one storage device to supply the at least a portion of the energy stored by the at least one storage device as derived from the first signal;

wherein the first signal is indicative of a measured parameter of the operating state of the synchronous machine, the measured parameter comprising at least one of a voltage output, current output and power output of the synchronous machine, and one or more of a voltage demand, current demand, power demand, inductance demand and power factor from a load connected to the synchronous machine; and wherein the second signal is indicative of a parameter requirement of the electrical demand for the synchronous machine, the parameter requirement comprising at least one of a field voltage and/or a field current of an exciter of the synchronous machine, an input, output and/or one or more internal values of an automatic voltage regulator configured to control the synchronous machine, a voltage and/or current provided by a generator of the synchronous machine, a real or complex inductance demand of the synchronous machine, and a power factor from a load connected to the synchronous machine.

13. A computer program comprising computer code configured to perform the method of claim 12.

14. An exciter circuit for a synchronous machine, the exciter circuit comprising:

at least one charge storage device configured to supply energy to a DC output of the exciter circuit that is coupled to the synchronous machine; and control circuitry configured to:

receive a first signal indicative of an operating state of the synchronous machine, receive a second signal indicative of an electrical demand for the synchronous machine, and supply at least a portion of energy stored by the at least one charge storage device for excitation of the synchronous machine to satisfy the electrical demand indicated by the second signal when:

the electrical demand indicated by the second signal exceeds a threshold capability of the synchronous machine that would otherwise exist if the at least one charge storage device was not present, and the synchronous machine is in an appropriate operating state that enables the use of the at least one storage device to supply the at least a portion of the energy stored by the at least one storage device as derived from the first signal;

wherein the control circuitry comprises one or more transistors, and an automatic voltage regulator configured to control the one or more transistors to discharge the at least one charge storage device to the DC output, wherein the one or more transistors are insulated-gate bipolar transistors, and wherein the control circuitry comprises a capacitor configured to protect the insulated-gate bipolar transistors from circuit inductance when the insulated-gate bipolar transistors are switched from an on-state to an off-state by the automatic voltage regulator.

* * * * *